(12) United States Patent
McCall

(10) Patent No.: US 11,863,546 B2
(45) Date of Patent: Jan. 2, 2024

(54) METHOD FOR SECURE COMMUNICATIONS AND STRUCTURE THEREFOR

(71) Applicant: Eberle Design, Inc., Phoenix, AZ (US)

(72) Inventor: Timothy McCall, Phoenix, AZ (US)

(73) Assignee: Eberle Design, Inc., Phoenix, AZ (US)

( * ) Notice: Subject to any disclaimer, the term of this patent is extended or adjusted under 35 U.S.C. 154(b) by 526 days.

(21) Appl. No.: 16/865,308

(22) Filed: May 2, 2020

(65) Prior Publication Data

US 2020/0259820 A1  Aug. 13, 2020

Related U.S. Application Data

(63) Continuation-in-part of application No. 16/670,018, filed on Oct. 31, 2019, now Pat. No. 11,521,486.

(60) Provisional application No. 62/977,121, filed on Feb. 14, 2020, provisional application No. 62/758,485, filed on Nov. 9, 2018.

(51) Int. Cl.
| | |
|---|---|
| G01C 21/00 | (2006.01) |
| G01C 21/20 | (2006.01) |
| H04L 9/40 | (2022.01) |
| H04W 4/40 | (2018.01) |
| H04W 4/021 | (2018.01) |
| G08B 13/22 | (2006.01) |

(52) U.S. Cl.
CPC .......... *H04L 63/0823* (2013.01); *G08B 13/22* (2013.01); *H04W 4/021* (2013.01); *H04W 4/40* (2018.02)

(58) Field of Classification Search
CPC ............. H04L 63/0823; H04L 2209/84; H04L 9/0852; H04L 9/3239; H04L 9/3263; H04L 9/50; H04L 2463/082; G08B 13/22; H04W 4/021; H04W 4/40; H04W 12/069
USPC ........................................................ 340/146.2
See application file for complete search history.

(56) References Cited

U.S. PATENT DOCUMENTS

| | | | |
|---|---|---|---|
| 2007/0223702 A1 | 9/2007 | Tengler et al. | |
| 2015/0256534 A1* | 9/2015 | Goudy | H04W 12/033 713/156 |
| 2016/0323715 A1* | 11/2016 | Leroux | H04W 4/029 |
| 2017/0186257 A1 | 6/2017 | Gerlach | |
| 2018/0146471 A1* | 5/2018 | Xu | H04W 4/08 |
| 2019/0057557 A1 | 2/2019 | Wang et al. | |
| 2019/0238343 A1 | 8/2019 | Racklyeft et al. | |
| 2019/0381189 A1* | 12/2019 | Xu | A61K 47/6939 |

* cited by examiner

*Primary Examiner* — Tanmay K Shah
(74) *Attorney, Agent, or Firm* — Weiss & Moy, PC; Jeffrey D. Moy

(57) ABSTRACT

In accordance with an embodiment, a method for delivering a certificate to a vehicle comprising transmitting the certificate to the vehicle via near field coupling is provided. The near field coupling can be accomplished by transmitting data using a near field coupled antenna to a receiver. The near field coupled antenna can also be used for content delivery such as for example, a streaming video signal, a streaming webcast signal, non-streaming transfer of information, etc. The method can be used for location validation of land vehicles, marine vehicles, and pedestrians as well as content delivery, and payment mechanisms. In accordance with another embodiment a traffic control system is configured to control vehicles and pedestrians in an intelligent transportation system.

7 Claims, 33 Drawing Sheets

METHOD FOR SECURE COMMUNICATIONS AND STRUCTURE THEREFOR

The present invention relates, in general, to secure communications and, more particularly, to secure communications between vehicles and between vehicles and traffic infrastructure.

Traffic control systems are designed to ensure the safety of vehicular and pedestrian traffic. In the past, these systems have included, for example, traffic signal control, malfunction management units, vehicle pre-emption and prioritization devices, data aggregation devices, vehicle detection systems, time synchronization receivers and signal generators, and variable, dual, and multi-mode power supplies operatively coupled together, and enclosed and protected by a control cabinet. These components and assemblies can communicate with traffic signals, other traffic control systems, or with a central command center through hard-wired interconnects, through one or more cloud-based or locally deployed servers, or combinations thereof to control intersections, crosswalks, railroad crossings, or the like.

More recently, with the advent of the Internet of Things, and the Internet of Vehicles, automobile manufacturers and traffic control system manufacturers have begun incorporating digital signaling and communication technologies in their products for the implementation of, for example, Vehicle-to-Vehicle ("V2V"), Vehicle-to-Pedestrian ("V2P"), and Vehicle-to-Infrastructure ("V2I") communications. It should be noted that Vehicle-to-Vehicle ("V2V"), Vehicle-to-Pedestrian ("V2P"), and Vehicle-to-Infrastructure ("V2I") communications are collectively referred to as Vehicle-to-Everything ("V2X") or Cellular V2X communications. Because these systems are based on digital and analog communications technologies for information transmission, cryptographic and network security systems are used to provide secure V2X communications. A common technique used in these systems to verify the authenticity of the devices that are sending and receiving information involves certificate-based authentication using a public key and a private key. In this approach, a server generates a public key and a private key and transmits this information in a certificate signing request to a Certificate Authority for validation. It should be noted that the keys can be generated by an e-mail client or other enabled device. After validation, the Certificate Authority issues a digital certificate that allows parties to recognize each other. In the case of V2V protocols, the certificate facilitates secure communication between two or more vehicles, or traffic infrastructure. In V2I protocols, these certificates may facilitate communications between one or more vehicles and a traffic control system.

Although certificate-based authentication provides a measure of security, these types of systems can still be compromised. For example, the digital certificates may be intercepted and de-encrypted, which would compromise the integrity of the communication.

Accordingly, it would be advantageous to have an improved traffic system and methods that increase the security and integrity of the signal transmission. It would be of further advantage for the improved traffic system and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
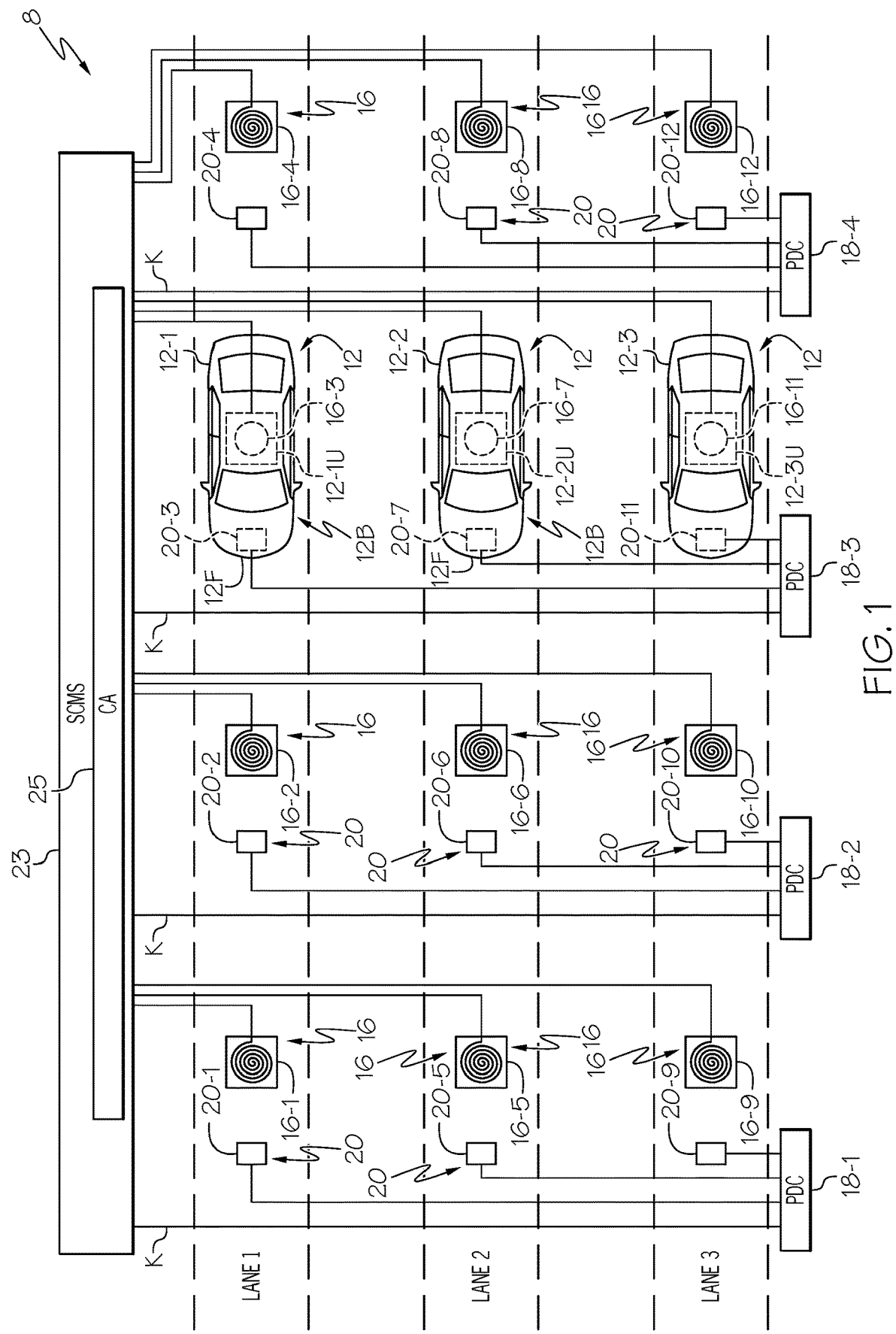
FIG. 1 is a top view of a vehicle production line in accordance with an embodiment of the present invention.

It will be appreciated by those skilled in the art that the words during, while, and when as used herein are not exact terms that mean an action takes place instantly upon an initiating action but that there may be some small but reasonable delay, such as a propagation or processing delay, between the reaction that is initiated by the initial action and the initial action. The use of the word approximately, about, or substantially means that a value of an element has a parameter that is expected to be very close to a stated value or position. However, as is well known in the art there are always minor variances that prevent the values or positions from being exactly as stated.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected," if used herein, means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions, in space. The term "exemplary" is used in the sense of "example," rather than "ideal."

DETAILED DESCRIPTION

The following detailed description is merely exemplary in nature and is not intended to limit the range of possible embodiments, implementations, and applications. Furthermore, there is no intention to be bound by any theory presented in the preceding background or the following detailed description.

For simplicity and clarity of illustration, the drawing figures depict the general topology, structure and/or manner of construction of the various embodiments. Descriptions and details of well-known features and techniques may be omitted to avoid unnecessarily obscuring other features. For example, conventional techniques and components related to traffic control devices are not described in detail herein. Elements in the drawing figures are not necessarily drawn to scale, i.e., the dimensions of some features may be exaggerated relative to other elements to assist understanding of the example embodiments.

FIG. 1 is a top view of a vehicle production line 8 at a vehicle manufacturing facility during a step in manufacturing vehicles 12 in accordance with an embodiment of the present invention. Vehicle production line 8 includes three production lanes: LANE 1, LANE 2, and LANE 3. LANE 1 includes inductive loops 16-1, 16-2, 16-3, and 16-4. LANE 1 further includes a sensor 20-1 connected to a Position Detection Circuit ("PDC") 18-1, a sensor 20-2 connected to a PDC 18-2, a sensor 20-3 connected to a PDC 18-3, and a sensor 20-4 connected to a PDC 18-4. PDC 18-1, PDC 18-2, PDC 18-3, and PDC 18-4 are connected to a Security Credential Management System ("SCMS") 23 by K interconnects, where K is an integer. It should be noted that SCMS 23 includes, among other things, a Certificate Authority ("CA") 25, which CA 25 is configured for or capable of delivering one or more certificates to vehicles 12. The number of certificates per vehicle that can be delivered by CA 25 of SCMS 23 is not a limitation. It should be noted that inductive loop 16-3 is shown as a circle whose boundary is denoted by a broken line because it is under vehicle 12-1 and thus is blocked from view by vehicle 12-1 and that sensor 20-3 is shown as a square whose boundary is denoted by a broken line because it is under vehicle 12-1 and also blocked from view by vehicle 12-1. It should be further noted that: vehicles are collectively identified by reference character 12, but for the sake of clarity may be identified by reference character 12 followed by a hyphen and a number, e.g., 12-1, 12-2, 12-3, etc.; inductive loops are collectively identified by reference character 16, but for the sake of clarity may be identified by reference character 16 followed by a hyphen and a number, e.g., 16-1, 16-2, 16-3, etc.; sensors are collectively identified by reference character 20, but for the sake of clarity may be identified by reference character 20 followed by a hyphen and a number, e.g., 20-1, 20-2, 20-3, etc.

LANE 2 includes inductive loops 16-5, 16-6, 16-7, and 16-8. Inductive loop 16-7 is shown as a circle whose boundary is denoted by a broken line because it is under vehicle 12-2 and thus is blocked from view by vehicle 12-2. LANE 2 further includes a sensor 20-5 connected to PDC 18-1, a sensor 20-6 connected to PDC 18-2, a sensor 20-7 connected to PDC 18-3, and a sensor 20-8 connected to PDC 18-4. It should be noted that inductive loop 16-7 is shown as a circle whose boundary is denoted by a broken line because it is under vehicle 12-2 and thus is blocked from view by vehicle 12-2 and that sensor 20-7 is shown as a square whose boundary is denoted by a broken line because it is under vehicle 12-2 and also blocked from view by vehicle 12-2.

LANE 3 includes inductive loops 16-9, 16-10, 16-11, and 16-12. Inductive loop 16-11 is shown as a circle whose boundary is denoted by a broken line because it is under vehicle 12-3 and thus is blocked from view by vehicle 12-3. LANE 3 further includes a sensor 20-9 connected to PDC 18-1, a sensor 20-10 connected to PDC 18-2, a sensor 20-11 connected to PDC 18-3, and a sensor 20-12 connected to PDC 18-4. Sensors 20-3, 20-7, and 20-11 are illustrated as boxes whose boundaries are denoted by broken lines because they are hidden from view by vehicles 12-1, 12-2, and 12-3, respectively. It should be noted that inductive loop 16-11 is shown as a circle whose boundary is denoted by a broken line because it is under vehicle 12-3 and thus is blocked from view by vehicle 12-3 and that sensor 20-11 is shown as a square whose boundary is denoted by a broken line because it is under vehicle 12-3 and also blocked from view by vehicle 12-3.

Vehicles 12 each possess many features known to those skilled in the art, including, but not limited to, a body, a roof, tires, windows, and engine, etc. Because these features are commonly known they have not been specifically identified. Each vehicle 12 also have an On-Board Unit ("OBU"). For example, vehicles 12-1, 12-2, and 12-3 include OBU's 12-1U, 12-2U, and 12-3U, respectively. OBUs 12-1U, 12-2U, and 12-3U are illustrated as boxes bounded by broken lines because they are built into vehicles 12 and are hidden from view. It should be noted that only three vehicles 12-1, 12-2, and 12-3 have been shown, but typically more than three vehicles would be present in a production facility.

Sensors 20-1, 20-5, and 20-9 sense whether a vehicle is over inductive loops 16-1, 16-5, and 16-9, respectively, and transmit signals to PDC 18-1 indicating whether vehicles are or are not present over one or more of inductive loops 16-1, 16-5, and 16-9. PDC 18-1 transmits a signal to SCMS 23 indicating whether any vehicles are present in LANES 1, 2, and 3, and which of inductive loops 16-1, 16-5, and 16-9 the vehicle or vehicles are in position to communicate with SCMS 23. More particularly, PDC 18-1 indicates whether a vehicle 12 is positioned to be able to communicate with inductive loop 16-1, a vehicle 12 is positioned to be able to communicate with inductive loop 16-5, and a vehicle 12 is positioned to be able to communicate with inductive loop 16-9.

Similarly, sensors 20-2, 20-6, and 20-10 sense whether a vehicle is over inductive loops 16-2, 16-6, and 16-10, respectively, and transmit signals to PDC 18-2 indicating whether a vehicle is or is not present over one or more of inductive loops 16-2, 16-6, and 16-10. PDC 18-2 transmits a signal to a SCMS 23 indicating whether any vehicles are present in LANES 1, 2, and 3, and which of inductive loops 16-2, 16-6, and 16-10 the vehicle or vehicles are in position to communicate with SCMS 23. More particularly, PDC 18-2 indicates whether a vehicle 12 is positioned to be able to communicate with inductive loop 16-2, a vehicle 12 is positioned to be able to communicate with inductive loop 16-6, and a vehicle 12 is positioned to be able to communicate with inductive loop 16-10.

Sensors 20-3, 20-7, and 20-11 sense whether a vehicle 12 is over inductive loops 16-3, 16-7, and 16-11, respectively, and transmit signals to PDC 18-3 indicating whether a vehicle is or is not present over one or more of inductive loops 16-3, 16-7, and 16-11. PDC 18-3 transmits a signal to SCMS 23 indicating whether any vehicles are present in LANES 1, 2, and 3, and which of inductive loops 16-3, 16-7, and 16-11 the vehicle or vehicles are in position to communicate with SCMS 23. More particularly, PDC 18-3 indicates whether a vehicle 12 is positioned to be able to communicate with inductive loop 16-3, a vehicle 12 is positioned to be able to communicate with inductive loop 16-7, and a vehicle 12 is positioned to be able to communicate with inductive loop 16-11. It should be noted that inductive loops 16 operate as near field coupled loop antennas that communicate with the onboard units of vehicles 12.

Sensors 20-4, 20-8, and 20-12 sense whether a vehicle is over inductive loops 16-4, 16-8, and 16-12, respectively, and transmit signals to PDC 18-4 indicating whether a vehicle is or is not present over one or more of inductive loops 16-4, 16-8, and 16-12. PDC 18-4 transmits a signal to a SCMS 23 indicating whether a vehicle is present in LANES 1, 2, and 3, and which of inductive loops 16-4, 16-8, and 16-12 the vehicle or vehicles are in position to communicate with SCMS 23. More particularly, PDC 18-4 indicates whether a vehicle 12 is positioned to be able to communicate with inductive loop 16-4, a vehicle 12 is positioned to be able to communicate with inductive loop 16-8, and a vehicle 12 is positioned to be able to communicate with inductive loop 16-12. It should be noted that for the sake of clarity only three vehicles are shown as being present in vehicle production facility 8 and that vehicles may be present over one or all inductive loops 16-1 to 16-12. Although the production facility is shown and described as including sensors and position detection circuits, this is not a limitation. For example, vehicle production facility 8 can be configured so that the vehicles are moved along LANES 1, 2, and 3 using a conveyor system that is programmed to stop the vehicles at the desired positions above inductive loops 16-1 to 16-12.

It should be appreciated that the term vehicles is not limited to automobiles, but can refer to trucks, motorcycles, trains, boats, airplanes, drones, autonomous vehicles, semi-autonomous vehicles, or the like.

In operation, vehicles 12 are positioned over corresponding inductive loops 16. In the example of FIG. 1, three vehicles 12-1, 12-2, and 12-3 are positioned in LANE 1, LANE 2, and LANE 3, respectively, so that vehicle 12-1 is positioned over inductive loop 16-3, vehicle 12-2 is positioned over inductive loop 16-7, and vehicle 12-3 is positioned over inductive loop 16-11. Once positioned, sensors 20-3, 20-7, and 20-11 transmit signals to PDC 18-3, which sends position verification signals to SCMS 23 to verify that vehicles 12-1, 12-2, and 12-3 are ready to receive digital certificates from CA 25. Accordingly, in response to the verification signals from PDC 18-3, SCMS 23 instructs CA 25 to issue at least one digital certificate to each of vehicles 12-1, 12-2, and 12-3. CA 25 can issue one or more digital certificates to each or vehicles 12-1, 12-2, and 12-3. For example, CA 25 may issue ten thousand digital certificates to each of vehicles 12-1, 12-2, and 12-3. It should be noted that CA 25 may issue the same number of digital certificates to each of the vehicles 12 or CA 25 may issue a different number of digital certificates to each vehicle 12. Thus, CA 25 may issue five thousand digital certificates to vehicle 12-1, seven thousand digital certificates to vehicle 12-2, and ten thousand digital certificates to vehicle 12-3 or the same number of digital certificates to each of vehicles 12-1, 12-2, and 12-3.

One set of digital certificates may be transmitted to inductive loop 16-3, which serves as a near field coupled loop antenna that transmits the digital certificates to OBU 12-1U of vehicle 12-1. Another set of digital certificates may be transmitted to inductive loop 16-7, which serves as a near field coupled loop antenna that transmits the digital certificates to OBU 12-2U of vehicle 12-2. Another set of digital certificates may be transmitted to inductive loop 16-11, which serves as a near field coupled loop antenna that transmits the digital certificates to OBU 12-3U of vehicle 12-3. The signal from inductive loop 16-11 is received by OBU 12-3U. Thus, the signal from inductive loop 16-3 is received by OBU 12-1U; the signal from inductive loop 16-7 is received by OBU 12-2U; and the signal from inductive loop 16-11 is received by OBU 12-3U. Accordingly, vehicle manufacturers securely load digital certificates into vehicles at the factory that allow the vehicles to securely communicate with the traffic infrastructure, such as, for example, traffic control devices, other vehicles, autonomous vehicles, or the like.

In accordance with embodiments in which inductive loops 16 serve as near field transmitter antennas, they transmit electromagnetic waves whose characteristics vary in accordance with their distance from each inductive loop 16. The region close to the inductive loops 16 at which a signal can be received is referred to as the near field region. Thus, for a vehicle to receive a signal from an inductive loop 16 it has to be within the near field region. The near field region ("NFR") is given by Equation 1 ("EQT. 1"):

$$NFR < 2*D^2/\lambda \qquad \text{EQT. 1}$$

where

D is the maximum linear dimension of the antenna; and λ is the wavelength of the electromagnetic waves.

In accordance with alternative embodiments, vehicle production line 8 may be configured to use a hardwired system to deliver digital certificates to each OBU 12U of a vehicle 12 or it may be configured to use a hybrid wired/wireless system to deliver digital certificates to each OBU 12U of a vehicle 12.

For that sake of security, SCMS 23 and CA 25 can use quantum key certificate generation and distribution, which is an application of quantum cryptography, to transmit the digital certificates to vehicles 12. An advantage of this encryption technique is that it reduces the probability of a third party being able to eavesdrop on the communication between RSU 150, SCMS 23, and data aggregator 122 (shown in FIG. 6). The use of a shared key allows the use of symmetric-key algorithms for secure cryptographic communication.

Alternatively, SCMS 23 and CA 25 use a blockchain technique to transfer digital certificates to the onboard units of vehicles 12.

Figure 2:
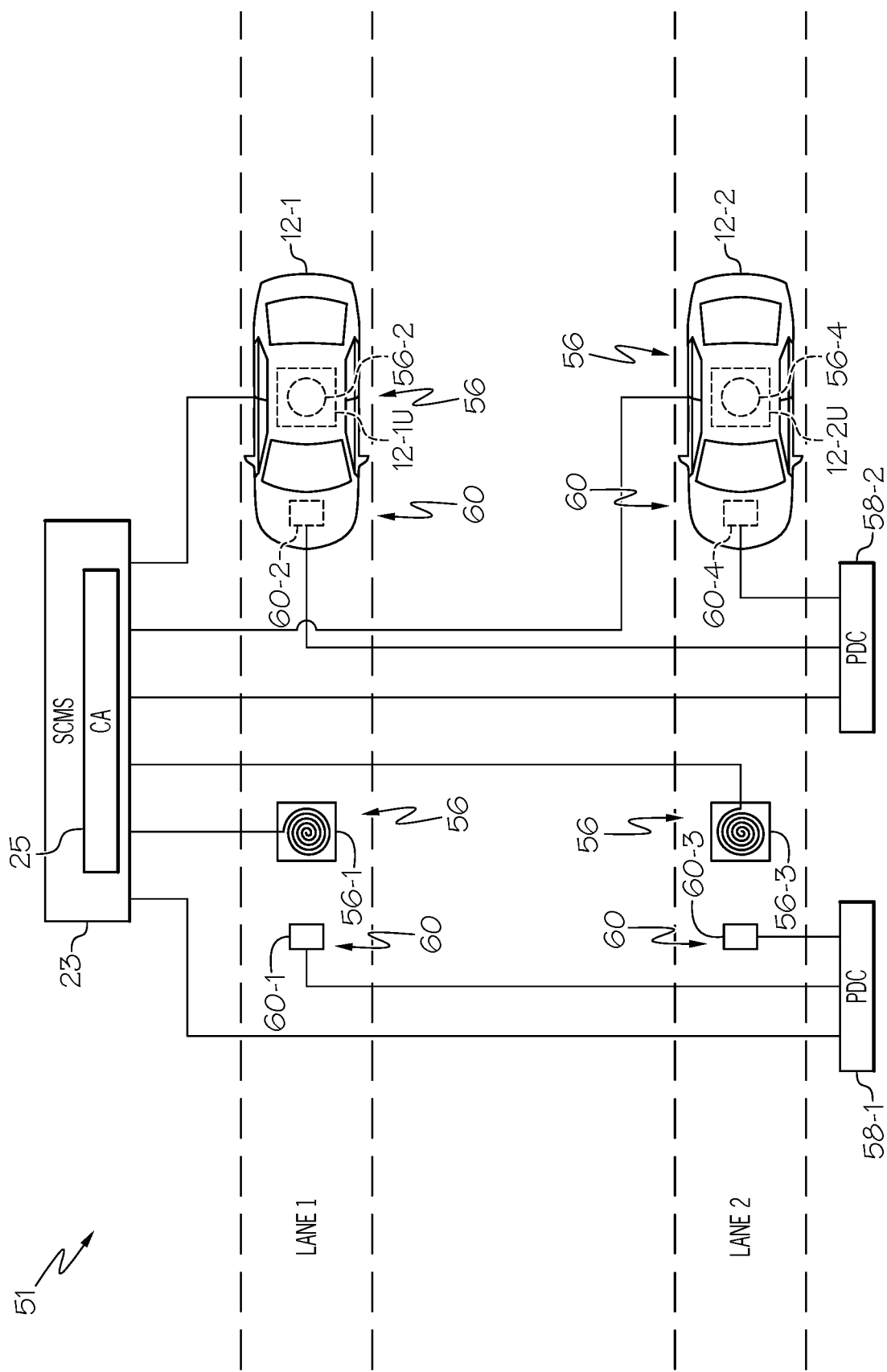
FIG. 2 is a top view of, for example, a vehicle dealership in accordance with another embodiment of the present invention.

FIG. 2 is a top view of a portion of, for example, a vehicle dealership 51 in accordance with another embodiment of the present invention. Vehicle dealership 51 receives vehicles from a vehicle manufacturer or customer whose digital certificates have been exhausted. The vehicles received from the manufacturer may or may not come pre-loaded with digital certificates. In instances when the vehicle dealership receives vehicles from the manufacturer with pre-loaded digital certificates, the vehicle dealer can prepare the vehicles for sale without loading digital certificates. In instances in which the vehicle manufacture has not pre-loaded vehicles with digital certificates, the vehicle dealership can load digital certificates into the vehicles, e.g., load the digital certificates into the OBU's of the vehicles. FIG. 2 illustrates an embodiment in which a vehicle dealership has two certificate loading lanes: LANE 1 and LANE 2. The number of certificate loading lanes is not limited to two, i.e., there can be one, two, three, or more certificate loading lanes. LANE 1 includes inductive loops 56-1 and 56-2. Inductive loop 56-2 is shown as a circle bounded by a broken line because it is under vehicle 12-1 and thus is blocked from view by vehicle 12-1.

LANE 1 further includes a sensor 60-1 connected to a Position Detection Circuit ("PDC") 58-1 and a sensor 60-2 connected to a PDC 58-2. PDC 58-1 is connected to a Security Credential Management System ("SCMS") 23. Sensor 60-2 is shown as a square bounded by a broken line because it is under vehicle 12-1 and thus blocked from view by vehicle 12-1. It should be noted that SCMS 23 includes, among other things, a Certificate Authority ("CA") 25, which CA 25 is configured for or capable of delivering one or more certificates to vehicles 12. The number of certificates per vehicle that can be delivered by CA 25 of SCMS 23 is not a limitation.

LANE 2 includes inductive loops 56-3 and 56-4. LANE 2 further includes a sensor 60-3 connected to PDC 58-1 and a sensor 60-4 connected to PDC 58-2. Inductive loop 56-4 is shown as a circle bounded by a broken line because it is under vehicle 12-2 and thus blocked from view by vehicle 12-2 and sensor 60-4 is shown as a square bounded by a broken line because it is under vehicle 12-2 and thus blocked from view by vehicle 12-2.

Sensors 60-1 and 60-3 sense whether a vehicle is over inductive loops 56-1 and 56-3, respectively, and transmit a signal to PDC 58-1 indicating whether a vehicle is or is not present over one or more of inductive loops 56-1 and 56-3. Sensors 60-2 and 60-4 transmit signals to PDC 58-2 indicating whether a vehicle is or is not present over one or more of inductive loops 56-2 and 56-4. PDC 58-1 transmits a signal to SCMS 23 indicating whether a vehicle is present in LANES 1 and 2, and which of inductive loops 56-1 and 56-3 the vehicle is in position to communicate with. More particularly, PDC 58-1 indicates whether vehicles 12 are positioned to be able to communicate with corresponding inductive loops 56-1 and 56-3.

Similarly, sensors 60-2 and 60-4 sense whether a vehicle is over inductive loops 56-2 and 56-4, respectively, and transmit signals to PDC 58-2 indicating whether a vehicle is or is not present over one or more of inductive loops 56-2 and 56-4. PDC 58-2 transmits a signal to SCMS 23 indicating whether a vehicle is present in LANES 1 and 2, and which of inductive loops 56-2 and 56-4 the vehicle or vehicles are in position to communicate with. More particularly, PDC 58-2 indicates whether vehicles 12 are positioned to be able to communicate with corresponding inductive loops 56-2 and 56-4.

It should be further noted that: inductive loops are collectively identified by reference character 56, but for the sake of clarity may be identified by reference character 56 followed by a hyphen and a number, e.g., 56-1, 56-2, 56-3, etc.; sensors are collectively identified by reference character 60, but for the sake of clarity may be identified by reference character 60 followed by a hyphen and a number, e.g., 60-1, 60-2, 60-3, etc.

In operation, vehicles 12 are positioned over corresponding inductive loops 56. In the example of FIG. 2, a vehicle 12-1 is positioned in LANE 1 and a vehicle 12-2 is positioned in LANE 2, so that vehicle 12-1 is positioned over inductive loop 56-2, and a vehicle 12-2 is positioned over inductive loop 56-4. Once positioned, sensors 60-2 and 60-4 transmit signals to PDC 58-2, which sends verification signals to SCMS 23 to verify that vehicles 12-1 and 12-2 are ready to receive digital certificates issued by CA 25. Accordingly, in response to the verification signals from PDC 58-2, SCMS 23 instructs CA 25 to issue at least one digital certificate to each of vehicles 12-1 and 12-2. By way of example, CA 25 issues ten thousand digital certificates to each of vehicles 12-1 and 12-2. It should be noted that CA 25 may issue the same number of digital certificates to each of the vehicles 12 or CA 25 may issue a different number of digital certificates to each vehicle 12. Thus, CA 25 may issue five thousand digital certificates to vehicle 12-1, ten thousand digital certificates to vehicle 12-2, etc.

One set of digital certificates may be transmitted to inductive loop 56-2, which serves as a near field transmitter antenna that transmits the digital certificates to OBU 12-1U. Another set of digital certificates may be transmitted to inductive loop 56-4, which serves as a near field transmitter antenna that transmits the digital certificates to OBU 12-2U. Thus, the signal from inductive loop 56-2 is received by OBU 12-1U and the signal from inductive loop 56-4 is received by OBU 12-2U. Accordingly, vehicle dealers or dealerships load digital certificates into vehicles at their dealership that allow the vehicles to securely communicate with the traffic infrastructure, such as, for example, traffic control devices, other vehicles, autonomous vehicles, or the like.

In accordance with embodiments in which inductive loops 56 serve as near field transmitter antennas, they transmit electromagnetic waves whose characteristics vary in accordance with their distance from inductive loops 56. The region close to the inductive loops 56 is referred to as the near field region and is given by EQT. 1. As discussed above, a vehicle should be within the near field region to receive a signal, and thus a digital certificate from inductive loops 56.

In accordance with another embodiment, the OBU's in vehicles 12 are programmed to activate a warning light in the vehicle or send a notification to the vehicle's operator when the number of unused digital certificates falls to a predetermined number. In response to the warning light or a notification, the owner of the vehicle can take it to a dealership such as, for example, vehicle dealership 51, and re-supply the vehicle with digital certificates using a method like the one described with reference to FIG. 2. Alternatively, a vehicle maintenance facility could read the number of digital certificates that are available during routine maintenance of the vehicle, and the maintenance facility could alert the owner of the vehicle to have additional digital certificates downloaded to the vehicle's OBU.

In accordance with another embodiment, prior to certificate delivery the vehicles OBUs transmit their GPS coordinates which are compared to known GPS coordinates of inductive loops 16 or 56 to validate the vehicle's location. Thus, the particular vehicle is identified prior to certificate delivery.

For that sake of security, SCMS 23 and CA 25 use quantum key distribution, which is an application of quantum cryptography, to transmit the digital certificates to vehicles 12. An advantage of this encryption technique is that it reduces the probability of a third party being able to eavesdrop on the communication between RSU 150, SCMS 23, and data aggregator 122 (shown in FIG. 6). The use of a shared key allows the use of symmetric-key algorithms for secure cryptographic communication.

Alternatively, SCMS 23 and CA 25 use a blockchain technique to transfer digital certificates to the onboard units of vehicles 12.

Figure 3:
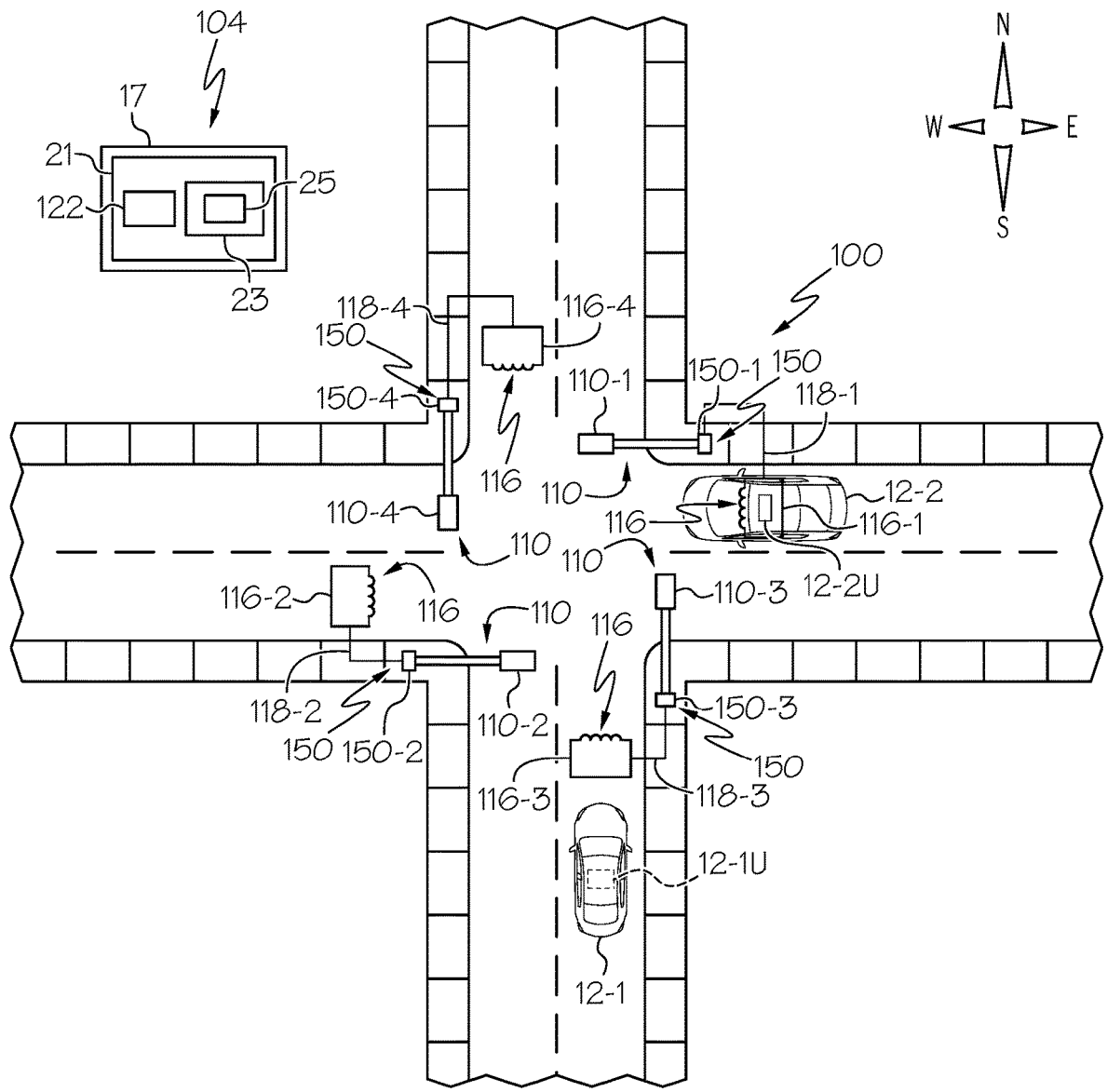
FIG. 3 is a diagram of a roadway intersection that includes a traffic monitoring system in accordance with an embodiment of the present invention.

FIG. 3 is a top view of a four-way intersection 100 controlled by a traffic control system 21 within a controller cabinet 17. Traffic control system 21 may include a data aggregator 122 and an SCMS 23, which SCMS 23 includes a CA 25. Controller cabinet 17 may be referred to as a traffic control cabinet. It should be noted that an SCMS 23 and CA25 may not be present in controller cabinets 17 in which a jurisdiction does not want digital certificates loaded into vehicles 12 at an intersection such as, for example, intersection 100. In the example shown in FIG. 3, traffic control system 21 within controller cabinet 17 controls four signal heads 110. To distinguish individual signal heads 110, the signal head at the north location of intersection 100 is identified by reference character 110-1, the signal head at the south location of intersection 100 is identified by reference character 110-2, the signal head at the east location of intersection 100 is identified by reference character 110-3, and the signal head at the west location of intersection 100 is identified by reference character 110-4. By way of example, signal heads 110-1 and 110-2 may control traffic flow in a north-south direction, including traffic turning into the east-west direction, and signal heads 110-3 and 110-4 may control traffic flow in an east-west direction, including traffic turning into the north-south direction. Cabinet 17 houses a traffic control system, e.g., traffic control system 21, configured for controlling traffic. Traffic control system 21 may also serve as a traffic monitoring system.

Road side units ("RSU's") 150 are mounted to the support structures to which signal heads 110 are mounted. To distinguish RSU's 150, the RSU at the northeast location of intersection 100 is identified by reference character 150-1, the RSU at the southwest location of intersection 100 is identified by reference character 150-2, the RSU at the southeast location of intersection 100 is identified by reference character 150-3, and the RSU at the northwest location of intersection 100 is identified by reference character 150-4. Inductive loops 116 are formed in the roadway and are associated with corresponding signal heads 110 and road side units 150. Inductive loop 116-1 is electrically connected to RSU 150-1 through an electrical interconnect 118-1, inductive loop 116-2 is electrically connected to RSU 150-2 through an electrical interconnect 118-2, inductive loop 116-3 is electrically connected to RSU 150-3 through an electrical interconnect 118-3, and inductive loop 116-4 is electrically connected to RSU 150-4 through an electrical interconnect 118-4 for communicating with SCMS 23 and CA 25. Although inductive loops 116-1, 116-2, 116-3, and 116-4 are shown as being connected to RSU's 150-1, 150-2, 150-3, and 150-4, respectively, through electrical interconnects, this is not a limitation and they may be electrically coupled through wireless connections. It should be noted that in an alternative embodiment, inductive loops 116-1, 116-2, 116-3, and 116-4 can be connected to data aggregator 122 and data aggregator 122 can be connected to RSU 150 either wirelessly or through hardwired connections.

To distinguish inductive loops 116, the inductive loop at the northeast location of intersection 100 is identified by reference character 116-1, the inductive loop at the southwest location of intersection 100 is identified by reference character 116-2, the inductive loop at the southeast location of intersection 100 is identified by reference character 116-3, and the inductive loop located at the northwest location of intersection 100 is identified by reference character 116-4.

Although roadside units are shown and described as being mounted to the support structures to which signal heads 110 are mounted, this is not a limitation. For example, roadside units can be placed at any desired location alongside a roadway, above or below the pavement, underground with exposed antennas, in a cabinet, etc.

FIG. 3 further illustrates a vehicle 12-1 carrying an OBU 12-1U traveling in a northerly direction and a vehicle 12-2 carrying an OBU 12-2U traveling in a westerly direction. For the sake of clarity, vehicles 12-1 and 12-2 may be referred to collectively as vehicles 12.

In accordance with an embodiment, the owner of a vehicle ready to receive additional digital certificates may take the vehicle to a dealership to obtain additional digital certificates as described with reference to FIG. 2. Alternatively, the vehicle may be configured to request additional digital certificates at an intersection such as intersection 100. For example, if vehicle 12-2 needs additional digital certificates its OBU 12-2U may transmit a request to traffic control system 21 for the additional digital certificates using inductive loop 116-1 and RSU 150-1. Inductive loop 116-1 is electrically connected to RSU 150-1 by an electrical interconnect 118-1. In response to the request, SCMS 23 validates the request and CA 25 of traffic control system 21 generates the digital certificates and transmits them to inductive loop 116-1, which operates as a near field antenna and securely transmits the digital certificates to OBU 12-2U of vehicle 12-2.

Alternatively, SCMS 23 and CA 25 may generate an inquiry to a vehicle in response to the vehicle being in proximity to an inductive loop in the roadway. The vehicle may respond to the request by indicating that the vehicle does not need additional digital certificates or by indicating that it desires additional digital certificates and sends an enable signal to CA 25 to send the digital certificates. In response to the enable signal from vehicle 12-2, CA 25 sends the digital certificates to inductive loop 116-1, which operates as a near field antenna and securely transmits the digital certificates to OBU 12-2U of vehicle 12-2.

For the sake of security, SCMS 23 and CA 25 use quantum key distribution, which is an application of quantum cryptography, to transmit the digital certificates to vehicles 12. An advantage of this encryption technique is that it reduces the probability of a third party being able to eavesdrop on the communication between RSU 150, SCMS 23, data aggregator 122, and vehicle 12. The use of a shared key allows the use of symmetric-key algorithms for secure cryptographic communication.

Alternatively, SCMS 23 and CA 25 use a blockchain technique to transfer digital certificates to the onboard units of vehicles 12.

Figure 4:
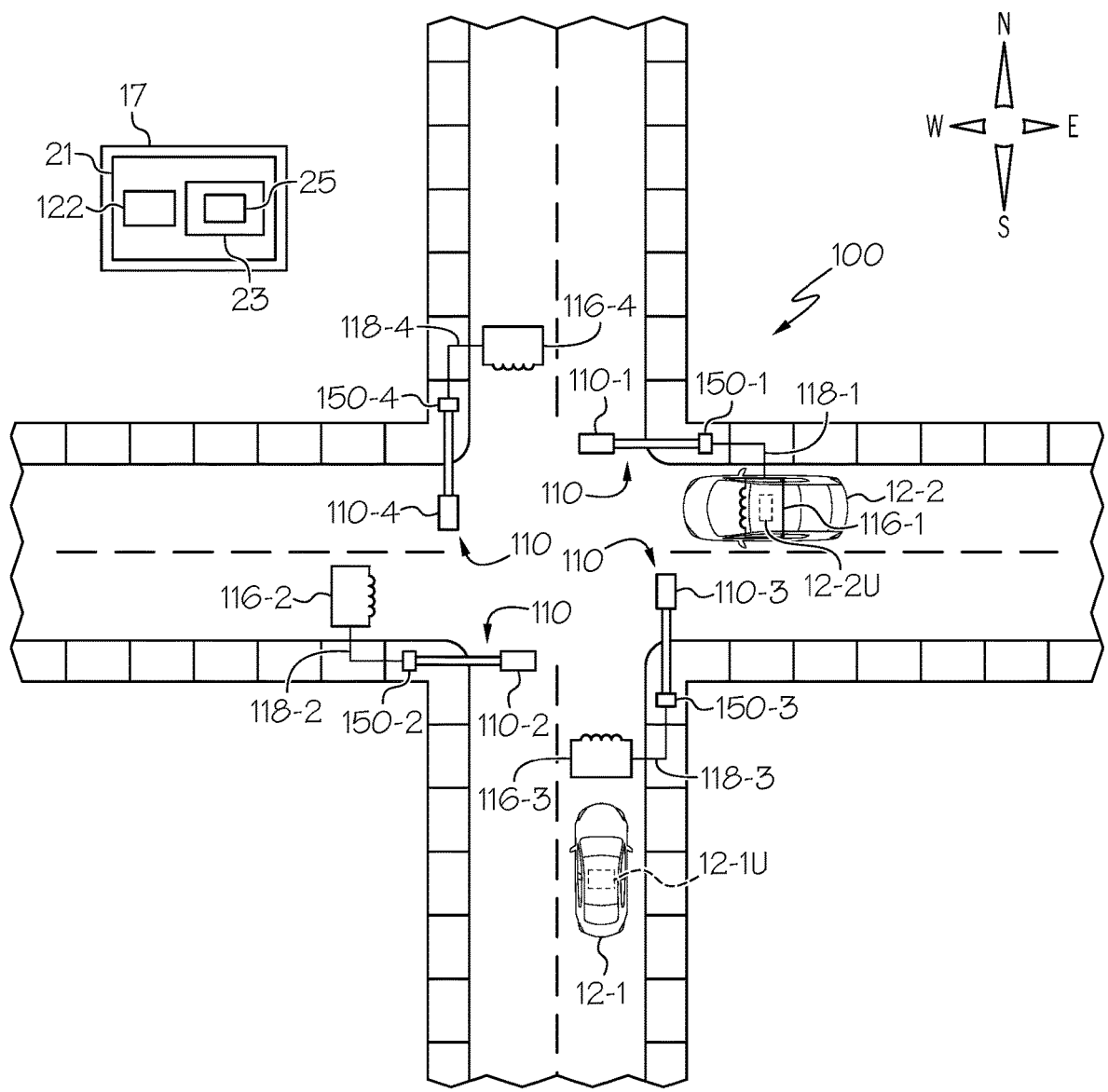
FIG. 4 is a diagram of a roadway intersection that includes a traffic monitoring system in accordance with another embodiment of the present invention.

FIG. 4 is a top view of a four-way intersection 100 controlled by a traffic control system 21 within a controller cabinet 17 in accordance with another embodiment of the present invention. The vehicle may be configured to request additional digital certificates at an intersection such as, for example, intersection 100. For example, if vehicle 12-2 needs additional digital certificates its OBU 12-2U may transmit a request to traffic control system 21 for the additional digital certificates using inductive loop 116-1 and RSU 150-1. The request also includes additional identifying information such as, for example, the Vehicle Identification Number ("VIN") of the vehicle. Other identifying information may include cellular subscriber identification module ("SIM") card information, WiFi media access control ("MAC") address, personably identifiable information, or the like. Inductive loop 116-1 is electrically connected to RSU 150-1 by an electrical interconnect 118-1. In response to the request, SCMS 23 validates the request and confirms the identification of the vehicle using the VIN of the vehicle. Once verified, CA 25 of traffic control system 21 generates the digital certificates and transmits them to inductive loop 116-1, which operates as a near field antenna and securely transmits the digital certificates to OBU 12-2U of vehicle 12-2. In accordance with an embodiment RSU 150, e.g., RSU's 150-1, 150-2, 150-3, and 150-4, communicate with traffic control system 21 wirelessly. Alternatively, RSU's can be electrically coupled to traffic control system 21 in a hard wired configuration using electrically conductive interconnects such as, for example, copper wires, optical fibers, etc.

Figure 5:
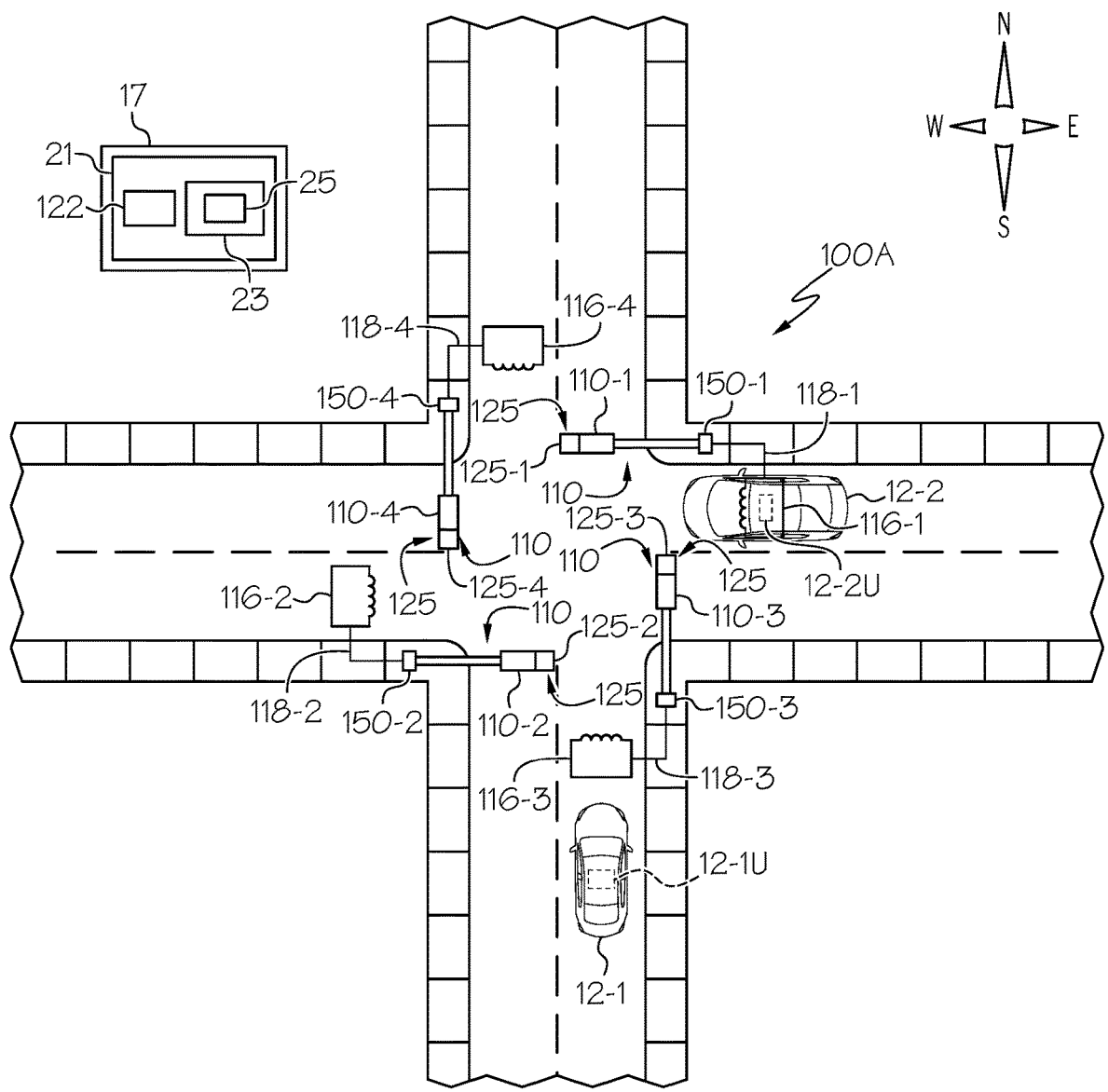
FIG. 5 is a diagram of a roadway intersection that includes a traffic monitoring system in accordance with another embodiment of the present invention.

FIG. 5 is a top view of a four-way intersection 100A controlled by a traffic control system 21 within a controller cabinet 17. Traffic control system 21 has been described with reference to FIG. 3. Intersection 100A differs from intersection 100 in that a verification system 125 is coupled to signal heads 110. More particularly, verification system 125-1 is coupled to signal head 110-1, verification system 125-2 is coupled to signal head 110-2, verification system 125-3 is coupled to signal head 110-3, and verification system 125-4 is coupled to signal head 110-4. It should be appreciated that verification systems 125-1, 125-2, 125-3, and 124-4 are collectively referred to as verification system 125. In accordance with an embodiment, verification system 125 comprises cameras that are used to verify the identity and location of vehicles 12. By way of example, verification system 125 comprises cameras that take pictures of the license plates of vehicles 12 approaching intersection 100A. Cameras 125 may be hard wire connected to data aggregator 122 via metallic interconnects, optical fibers, or the like or they may be wirelessly connected to data aggregator 122 via, for example, a radio frequency transmitter. Cameras 125 may be still cameras, video cameras, or a combination thereof and cameras 125 may be configured to transmit DSRC signals, V2V signals, V2X signals, C-V2X signals, 3G signals, 4G signals, 5G signals, GPS signals, or the like. The number of cameras 125-1, 125-2, 125-3, and 125-4 connected to the traffic control system is not limited to four. There may be one, two, three, four, or more cameras connected to the traffic control system.

Accordingly, in response to OBU 12-2U requesting that traffic control system 21 provide additional digital certificates, camera 125-2 takes a picture of the license plate of vehicle 12-2, transmits the image to traffic control system 21, which then verifies the identity of vehicle 12-2 through a central database and the license plate number and validate the global position system ("GPS") location. After vehicle verification and location validation, SCMS 23 validates the request and CA 25 of traffic control system 21 generates the digital certificates and transmits them to inductive loop 116-1, which operates as a near field antenna and securely transmits the digital certificates to OBU 12-2U of vehicle 12-2. It should be noted that the camera may be configured to take a picture of other attributes, rather than the license plate number, including the VIN number, the color of the vehicle, the make and model of the vehicle, facial recognition of the driver of the vehicle, the MAC address of the driver's phone, the MAC address of the vehicle, other personal identification information, or the like.

For that sake of security, SCMS 23 and CA 25 use quantum key distribution, which is an application of quantum cryptography, to transmit the digital certificates to vehicles 12. An advantage of this encryption technique is that it reduces the probability of a third party being able to eavesdrop on the communication between RSU 150, SCMS 23, data aggregator 122, and vehicles 12. The use of a shared key allows the use of symmetric-key algorithms for secure cryptographic communication.

Alternatively, SCMS 23 and CA 25 use a blockchain technique to transfer digital certificates to the onboard units of vehicles 12.

Figure 6:
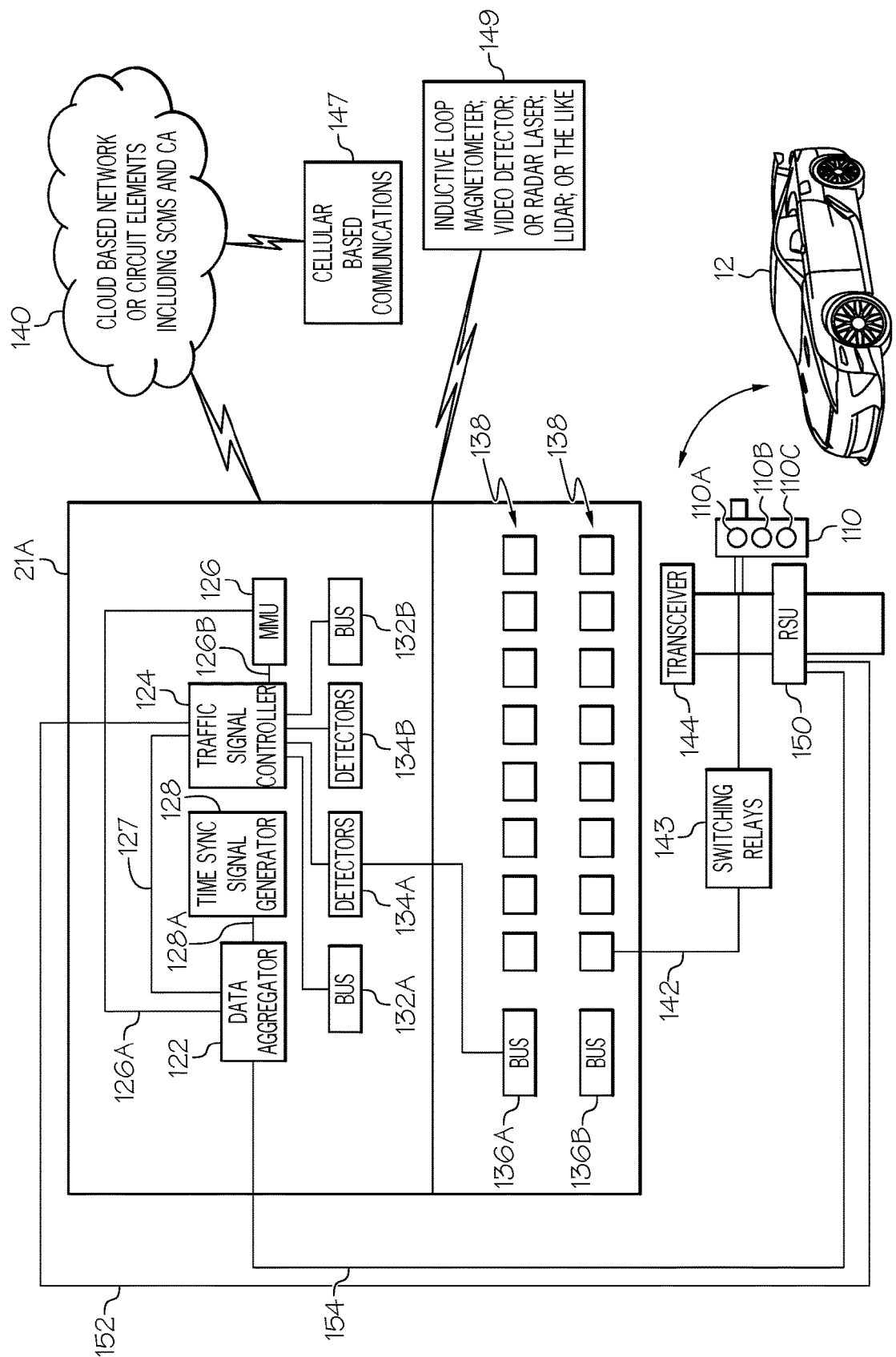
FIG. 6 is a block diagram of a traffic monitoring system in accordance with another embodiment of the present invention.

FIG. 6 illustrates another embodiment of a traffic control system 21 that may be within controller cabinet 17 as shown in FIGS. 3, 4, and 5. What is shown in FIG. 6 is traffic control system 21 that includes, for example, a data aggregator 122, a traffic signal controller 124, a Malfunction Management Unit ("MMU") 126, and a time sync signal generator 128. Traffic signal controller 124 may be referred to as a traffic signal generator and is connected to data aggregator 122 through an electrical interconnect 127. Malfunction management unit 126 is connected to data aggregator 122 by an electrical interconnect 126A and to traffic signal controller 124 by an electrical interconnect 126B. Time sync signal generator 128 is connected to data aggregator 122 by an electrical interconnect 128A. Traffic control system 21 further includes internal bus interface units 132A and 132B, detectors 134A and 134B, back panel bus interface units 136A and 136B and back panel load switches 138. Bus interface unit 136A is connected to detectors 134A. Bus interface units 132A and 132B and detectors 134A and 134B are connected to traffic signal controller 124.

Components in controller cabinet 17 such as, for example, data aggregator 122 may be connected to a cloud-based network of circuit elements 140 such as processors, logic circuits, memory elements, etc. It should be noted that a cloud-based network of circuit elements may be comprised of an internet service based data storage and analysis system and may include a cloud-based server. The cloud-based network of circuit elements may be referred to as a cloud-based computing structure and may be connected to an SCMS 23 and a CA 25.

FIG. 6 further illustrates that traffic control system 21 may be connected to a traffic signal head such as, for example, signal head 110, via wiring 142 and switches 143 or via a Dedicated Short Range Communications (DSRC) radio transceiver or a C-V2X radio transceiver 144 via the Ethernet and switches 143. Switches 143 may be referred to as relays or switching relays and may include solid state relays or electromechanical relays. Transceiver 144 is capable of transmitting signals to a traffic signal head and to cloud-based network of circuit elements 140 and receiving signals from cloud-based network of circuit elements 140. Alternatively, traffic control system 21 may be connected to a traffic signal head, such as, for example, signal head 110 and to cloud-based network of circuit elements 140 through a cellular based communications system 147 with options of 3G, 4G, 5G, GSM, GPRS, or the like. It should be noted that 3G refers to the third generation of cellular based communications systems, 4G refers to the fourth generation of cellular based communications systems, 5G refers to the fifth generation of cellular based communications systems, GSM refers to a Global System for Mobile Communications, and GPRS refers to a General Packet Radio Service.

Traffic signal head 110 may include lamps 110A, 110B, and 110C, where lamp 110A emits light in the red spectrum, lamp 110B emits light in the yellow spectrum, and lamp 110C emits light in the green spectrum.

In addition, a DSRC radio transceiver or a C-V2X radio transceiver in vehicle 12 may transmit to or receive information from data aggregator 122 via a DSRC radio transceiver or a C-V2X radio transceiver or the cellular based communications system 147. It should be noted that vehicle 12 shown in FIG. 6 may represent one or all of vehicles 12-1, 12-2, and 12-3 shown in FIG. 1 and one or both of vehicles 12-1 and 12-2 shown in FIG. 3. It should be further noted that vehicles 12 may be the same type of vehicles or different types of vehicles, i.e., vehicle 12-1 shown in FIGS. 3, 4, and 5 may be a car and vehicles 12-2 may be a car, a truck, a delivery truck, a motorcycle, a bus, a van, or the like.

Data aggregator 122 transmits and receives real time intersection status signals and may pass signals such as, for example, Bluetooth signals, cellular based signals, Wireless Fidelity ("WiFi") signals, or the like to a cloud-based server through, for example, a cellular modem. Data aggregator 122 is suitable for mounting in traffic control cabinet 17 or other locations associated with the traffic infrastructure and may include antenna ports for a Global Positioning System ("GPS"), Wireless Fidelity ("WiFi"), and Cellular ("Cell") modems; Ethernet input/output ports; input/output ports suitable for use with a Synchronous Data Link Control ("SDLC") communications protocol or an Electronic Industries Alliance ("EIA") 232 communication protocol; a plurality of auxiliary input/output ports, and a power indicator signal. In addition, data aggregator 122 can receive signals from one or more of an inductive loop, a magnetometer, a video detector, a radar system, laser system, Light Detection and Ranging ("LIDAR") system, or the like as illustrated by reference character 149.

It should be noted that the traffic control system housed in intersection cabinet 17 may communicate with signal heads 110-1, 110-2, 110-3, and 110-4 via metal cables, fiber optic cables, via wireless communications, or the like. Likewise, the traffic control system housed in intersection cabinet 17 may communicate with RSU's 150-1, 150-2, 150-3, and 150-4. The number of signal heads and RSU's connected to cabinet 17 is not limited to four. There may be one, two, three, four, or more signal heads 110 and RSU's 150 connected to traffic control system 21.

In accordance with an embodiment, RSU's 150 are connected to traffic signal control system 21 within intersection cabinet 17 in a hardwired electrical interconnection configuration. Thus, RSU's 150 are connected to the traffic signal control circuit by electrical connections such as copper wires, aluminum wires, or the like. Still referring to FIG. 6, an RSU 150 is shown as being connected to data aggregator 122 of traffic control system 21 by an electrical interconnect 154 and to traffic signal controller 124 by another electrical interconnect 152. Thus, RSU 150 is shown as being hardwired to traffic control system 21. By way of example, electrical interconnects 152 are copper wires. It should be noted that an RSU 150 may be connected to traffic control system 21 of FIGS. 3, 4, 5, and 6 in a hardwired configuration.

In accordance with another embodiment, RSU's 150 are connected to traffic signal control system 21 within intersection cabinet 17 in an optical interconnection configuration. RSU's 150 are connected to the traffic signal control circuit by electrical connections where the electrical connections are optical fibers. Thus, RSU's 150 are hardwired to intersection cabinet 17 by optical fibers.

Figure 7:
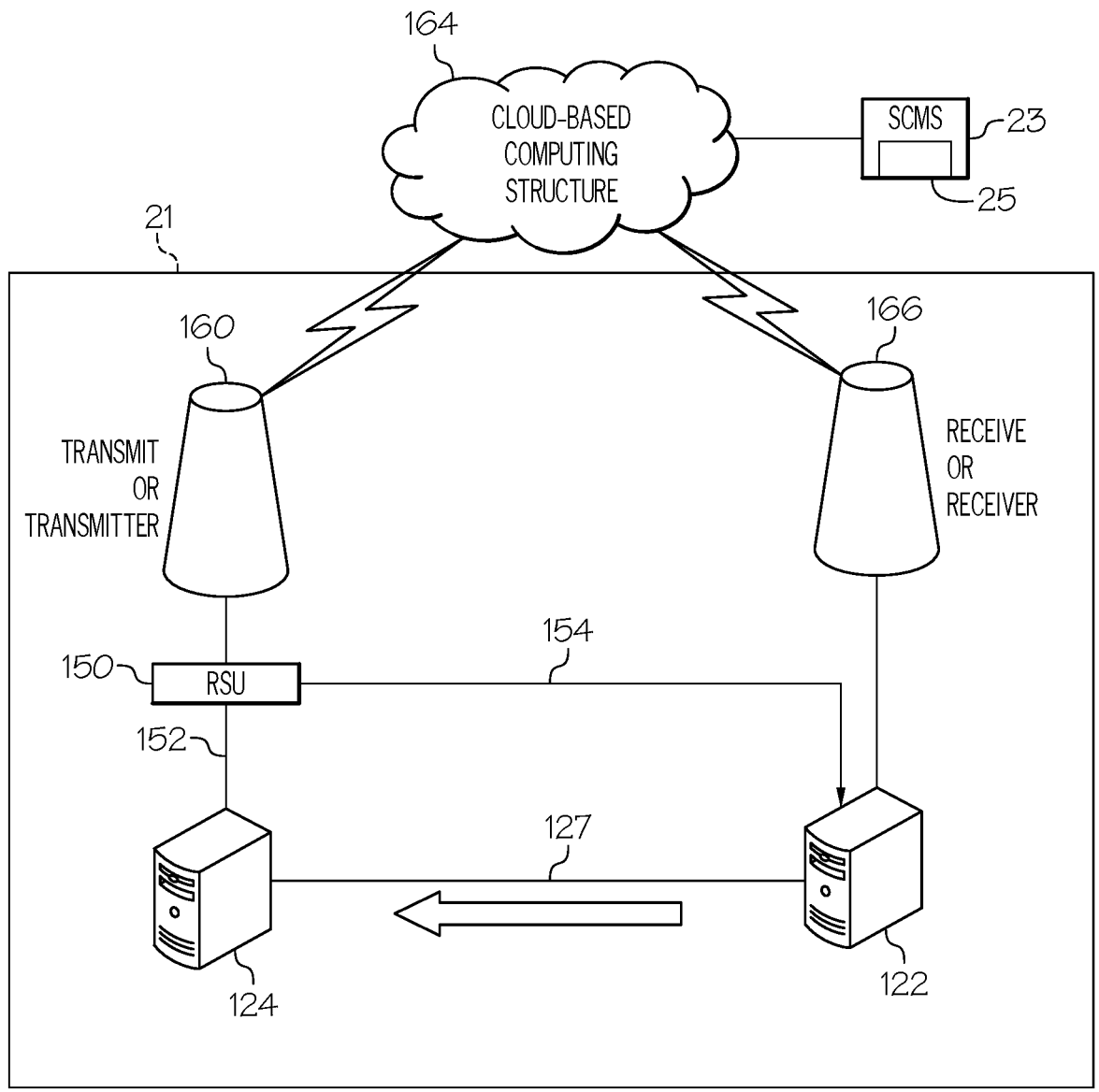
FIG. 7 is a diagram of a traffic monitoring system in accordance with another embodiment of the present invention.

Referring now to FIG. 7, a high level diagram of a traffic control system such as, for example, traffic control system 21 is shown. What is shown in FIG. 7 is a traffic controller, such as, for example, traffic signal controller 124 shown in FIG. 6 coupled to a data aggregator such as, for example, data aggregator 122 also shown in FIG. 6. In this example, traffic signal controller 124 is hardwired to data aggregator 122 by an electrical interconnect 127 such as, for example, a copper wire, an aluminum wire, an optical fiber, or the like. Traffic signal controller 124 is coupled to a Road Side Unit ("RSU") such as for example, RSU 150 shown in FIGS. 3, 4, 5, and 6. In accordance with an embodiment, traffic signal controller 124 is hardwired to RSU 150 through an electrical interconnect 152 and to data aggregator 122 through an electrical interconnect 154. Thus, RSU 150 may be hardwired to data aggregator 122 through a metal interconnect, an optical interconnect, or the like or RSU 150 and data aggregator 122 may also be configured to communicate wirelessly.

RSU 150 has an antenna 160 configured for transmitting a signal through the cloud based computing structure 164 to a receiving antenna 166 that is connected to data aggregator 122. In accordance with another embodiment antenna 160 is a portion of a transmitter and antenna 166 is a portion of a receiver. It should be noted that the cloud may include a server system configured to communicate with a central control facility, automobiles, buses, drones, other traffic signal controllers, other data aggregators, etc.

Cloud based computing structure 164 is communicably coupled to a Security Credential Management System ("SCMS") 23, which SCMS 23 includes a Certificate Authority ("CA") 25 that can create, distribute, and revoke digital certificates. In a public key infrastructure ("PKI")-based approach, chain-validation of certificates may be used to ensure the integrity of the transmitted signal and communication path.

In accordance with an embodiment, traffic signal controller 124 transmits a dedicated short range communication ("DSRC") global position system ("GPS") signal or a C-V2X signal to RSU 150. In response to the DSRC signal or the C-V2X signal, RSU 150 generates a Certificate Signing Request ("CSR") that is transmitted via cloud based computing structure 164 to SCMS 23. RSU 150 or other elements of the traffic control system can generate the shared key.

SCMS 23 generates a digital certificate and transmits a signal including the digital certificate to cloud based computing structure 164, which transmits a signal to receiver 166, which receiver 166 transmits the signal to data aggregator 122. Data aggregator 122 transmits the digital certificate to RSU 150, which can transmit the digital certificate to the on-board unit 12U of a vehicle 12.

For that sake of security, SCMS 23 and CA 25 use quantum key distribution, which is an application of quantum cryptography, to transmit the digital certificates to vehicles 12. An advantage of this encryption technique is that it reduces the probability of a third party being able to eavesdrop on the communication between RSU 150, SCMS 23, and data aggregator 122. The use of a shared key allows the use of symmetric-key algorithms for secure cryptographic communication.

Alternatively, SCMS 23 and CA 25 use a blockchain technique to transfer digital certificates to the onboard units of vehicles 12.

Figure 8:
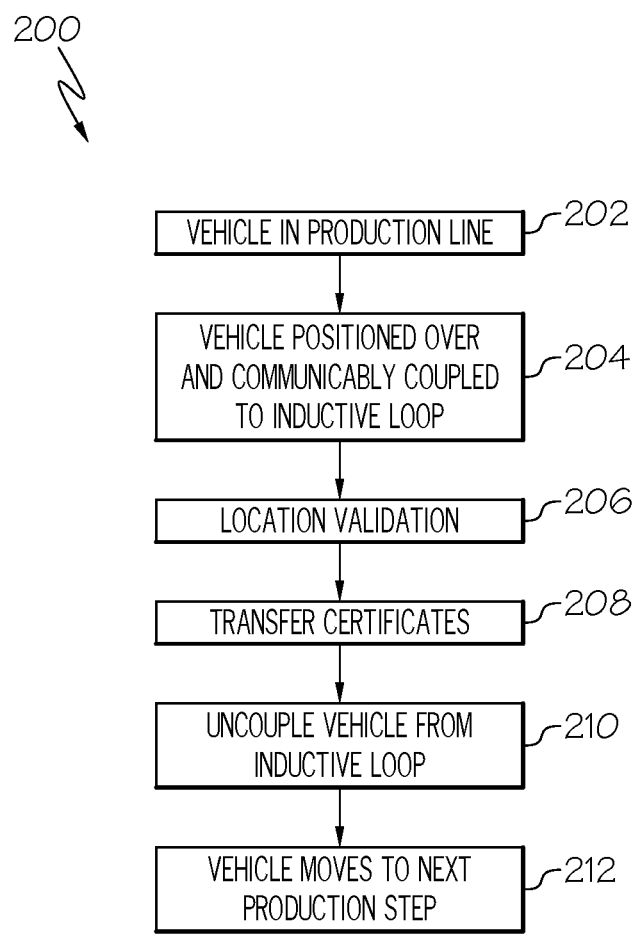
FIG. 8 is a flow diagram of a method for location validation and transfer of digital certificates in accordance with an embodiment of the present invention.

FIG. 8 is a flow diagram 200 of a method for validating the location of a vehicle such as, for example vehicles 12-1, 12-2, and 12-3 described with reference to FIG. 1. The method may also be used to validate an identity of the vehicle. Vehicle 12-1 is in production LANE 1, vehicle 12-2 is in production LANE 2, and vehicle 12-3 is in production LANE 3 (identified by box 202). Vehicle 12-1 is positioned to be over inductive loop 16-3, vehicle 12-2 is positioned to be over inductive loop 16-7, and vehicle 12-3 is positioned to be over inductive loop 16-11 (identified by box 204). SCMS 23 transmits a signal to vehicles 12-1, 12-2, and 12-3 via inductive loops 16-3, 16-7, and 16-11, respectively, to couple inductive loops 16-3, 16-7, and 16-11 to vehicles 12-1, 12-2, and 12-3, respectively, and to verify that vehicle 12-1 is in LANE 1 and over inductive loop 16-3, vehicle 12-2 is in LANE 2 and over inductive loop 16-7, and vehicle 12-3 is in LANE 3 and over inductive loop 16-11. Vehicles 12-1, 12-2, and 12-3 send verification signals to SCMS 23 confirming their identity and that they are over inductive loops 16-3, 16-7, and 16-11, respectively (identified by box 206), i.e., SCMS 23 validates the location or identity of vehicles 12-1, 12-2, and 12-3. Vehicles 12-1, 12-2, and 12-3 provide their GPS coordinates to SCMS 23, which SCMS 23 then compares the coordinates of inductive loops 16-3, 16-7, and 16-11, i.e., known coordinates or defined, with the coordinates from vehicles 12-1, 12-2, and 12-3, respectively, to verify that they match. Thus, inductive loops 16 are communicably coupled to vehicles 12. After SCMS 23 verifies or validates the positions and locations of vehicles 12-1, 12-2, and 12-3, certificate authority 25 transfers digital certificates to vehicles 12-1, 12-2, and 12-3 to via inductive loops 16-3, 16-7, and 16-11, respectively (identified by box 208). After the digital certificates have been delivered, vehicles 12-1, 12-2, and 12-3 are uncoupled from inductive loops 16-3, 16-7, and 16-11, respectively (identified by box 210). Vehicles 12-1, 12-2, and 12-3 are moved to the next step in the production process (identified by reference character 212).

Figure 9:
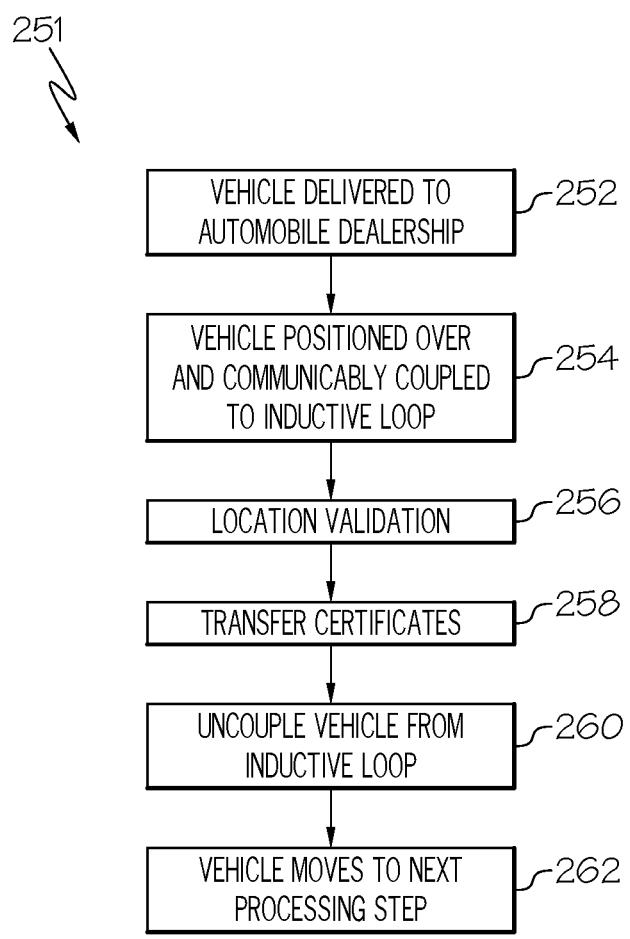
FIG. 9 is a flow diagram of a method for location validation and transfer of digital certificates in accordance with an embodiment of the present invention.

FIG. 9 is a flow diagram 251 of a method for validating the location of a vehicle such as, for example vehicles 12-1 and 12-2 described with reference to FIG. 2. The method may also be used to validate an identity of the vehicle or vehicles. Vehicles are delivered to, for example, an automobile dealership and positioned so that vehicle 12-1 is in LANE 1 and vehicle 12-2 is in LANE 2 (identified by box 252). Vehicle 12-1 is positioned to be over inductive loop 56-2 and vehicle 12-2 is positioned to be over inductive loop 56-4 (identified by box 254). SCMS 23 transmits a signal to vehicles 12-1 and 12-2 via inductive loops 56-2 and 56-4, respectively, to couple inductive loops 56-1 and 56-4 to vehicles 12-1 and 12-2, respectively, and to verify their identity and location and that vehicle 12-1 is in LANE 1 and over inductive loop 56-2 and vehicle 12-2 is in LANE 2 and over inductive loop 56-4. Vehicles 12-1 and 12-2 send verification signals to SCMS 23 confirming their identity and location and that they are over inductive loops 56-2 and 56-4, respectively (identified by box 256), i.e., validate the location of vehicles 12-1 and 12-2. Thus, inductive loops 56 are communicably coupled to vehicles 12. Vehicles 12-1 and 12-2 provide their GPS coordinates to SCMS 23, which SCMS 23 then compares the coordinates of inductive loops 56-2 and 56-4, i.e., known coordinates or defined location, with the coordinates from vehicles 12-1 and 12-2, respectively, to verify that they match. After SCMS 23 verifies or validates the positions and locations of vehicles 12-1 and 12-2, certificate authority 25 transfers digital certificates to vehicles 12-1 and 12-2 via inductive loops 56-2 and 56-4, respectively (identified by box 258), which inductive loops 56-2 and 56-4 are communicatively coupled to vehicles 12-1 and 12-2, respectively. After the digital certificates have been delivered, vehicles 12-1 and 12-2 are uncoupled from inductive loops 56-2 and 56-4, respectively (identified by box 260). Vehicles 12-1 and 12-2, are moved to the next step in the inventory process (identified by reference character 262).

Figure 10:
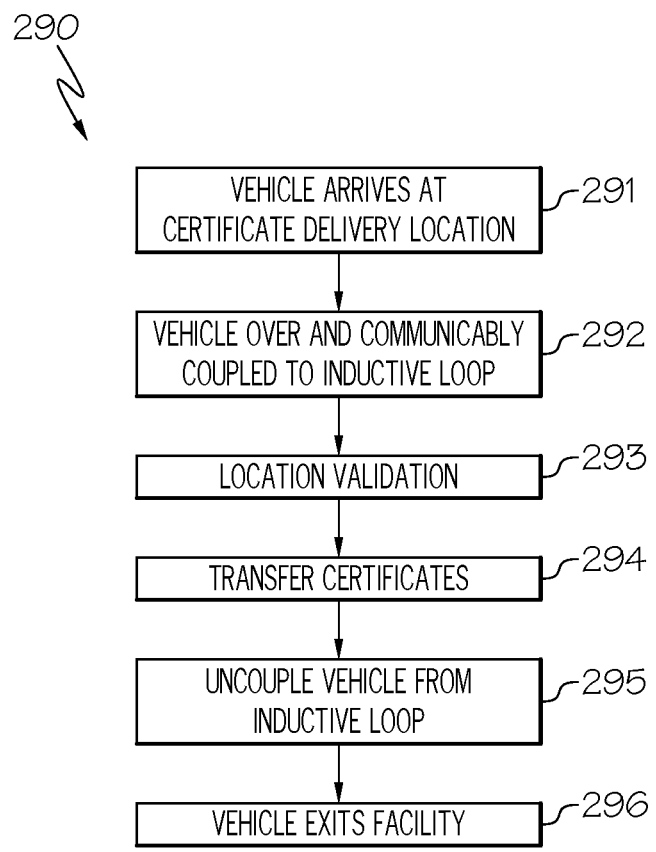
FIG. 10 is a flow diagram of a method for location validation and transfer of digital certificates in accordance with an embodiment of the present invention.

Although FIG. 9 describes the digital certificates being delivered at a vehicle dealership 51, this is not a limitation of the present invention. For example, the element identified by reference character 51 may be a facility licensed to deliver digital certificates such as a government licensing facility, e.g., a department of motor vehicles, or it may be a repair shop, a shop having a permit to inspect vehicles, a special lane at a toll road that is configured with an inductive loop capable of delivering digital certificates, or the like. For the sake of completeness, FIG. 10 is a flow diagram 290 of a method for validating the location of a vehicle such as, for example vehicle 12-1, at a facility licensed to issue digital certificates. A vehicle 12-1 arrives at a location licensed to issue a certificate of authority and is positioned to be in a lane configured with an inductive loop (identified by box 291). Vehicle 12-1 is positioned to be over the inductive loop (identified by box 292). The licensed facility has a server that transmits a signal to vehicle 12-1 via the inductive loop to couple the inductive loop to vehicle 12-1, and to verify the identity of vehicle 12-1 and that vehicle 12-1 is present, in the lane, and over the inductive loop. Vehicle 12-1 sends a verification signal to the server confirming or validating the identity of vehicle 12-1 and that it is over the inductive loop (identified by box 293). After the server verifies that vehicle 12-1 is present and in position, the certificate authority associated with the server transfers a digital certificate to vehicle 12-1 via the inductive loop (identified by box 294). After the digital certificates have been delivered, vehicle 12-1 is uncoupled from the inductive loop (identified by box 295). Vehicle 12-1 exits the facility (identified by reference character 296).

Although, a plurality of digital certificates has been described as being transferred, it should be understood that a single digital certificate may be transferred.

Figure 11:
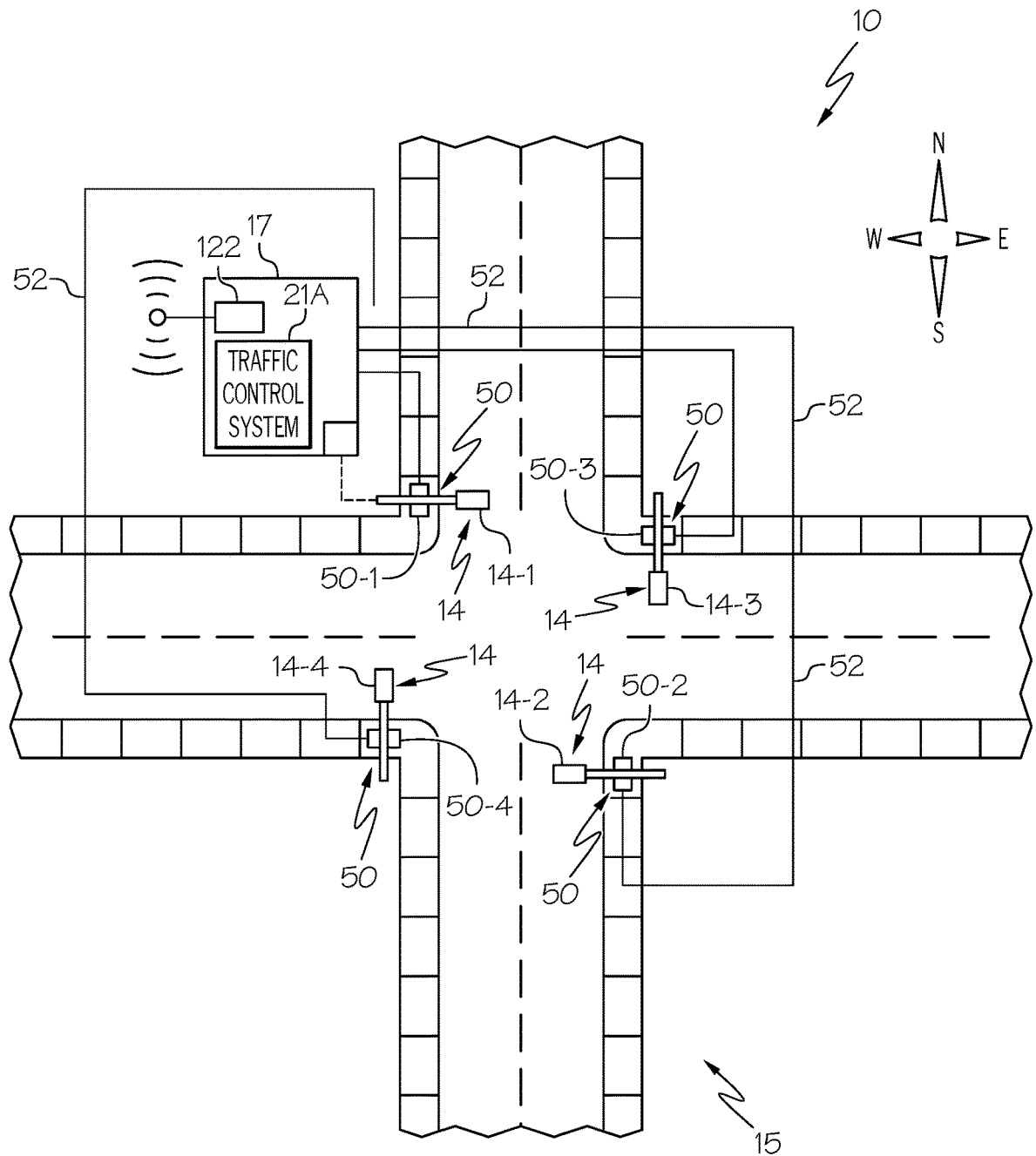
FIG. 11 is a diagram of a roadway intersection that includes a traffic monitoring system in accordance with an embodiment of the present invention.
Figure 12:
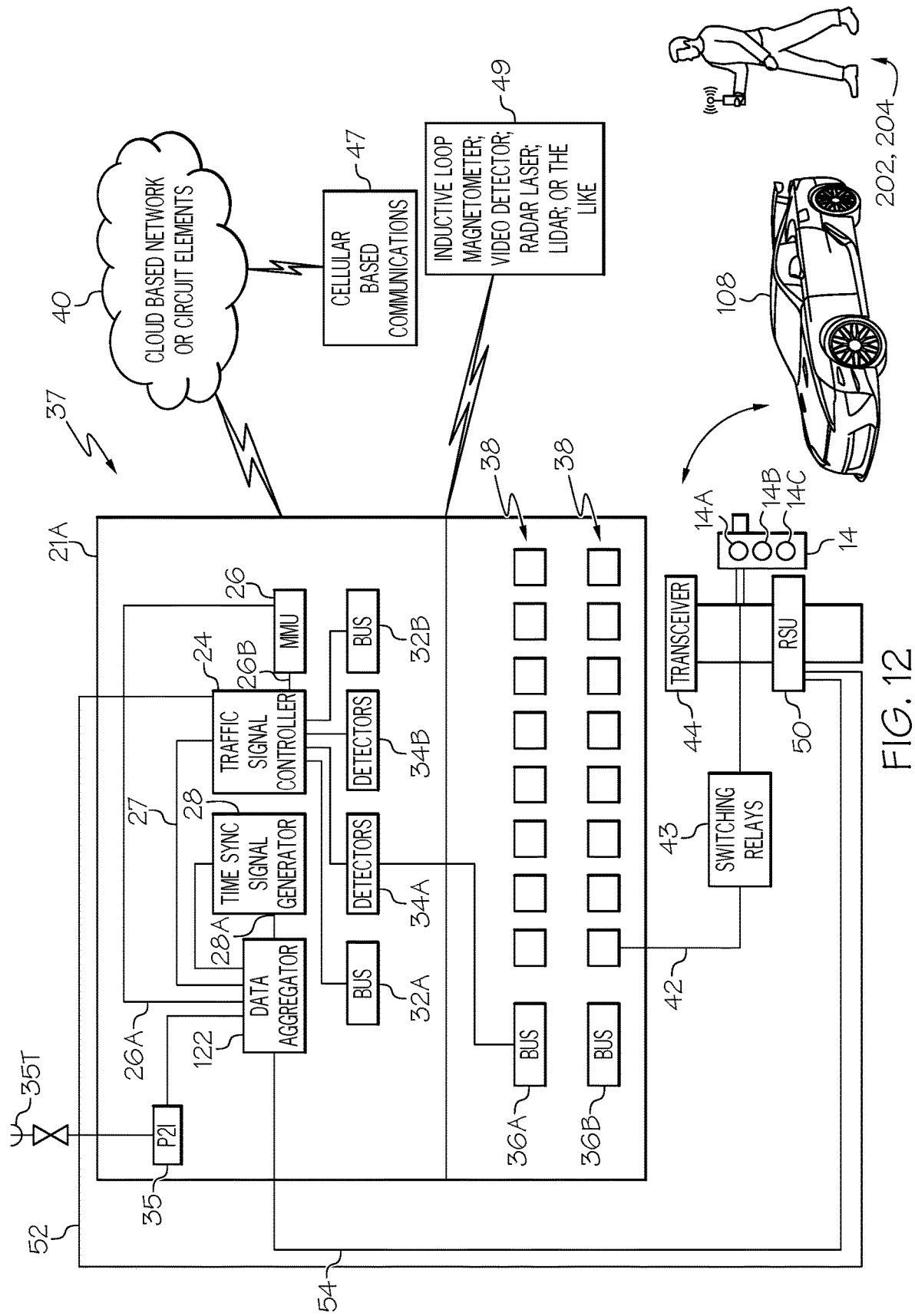
FIG. 12 is a block diagram of a traffic monitoring system in accordance with an embodiment of the present invention.

FIG. 11 is a top view of a four-way intersection 10 controlled by a traffic control system 21A that is within a controller cabinet 17 (shown in FIG. 12). Alternatively, the traffic control system can be like traffic control system 21 shown in controller cabinet 17 or a traffic control system 21 shown in FIG. 6. Traffic control system 21 and 21A are typically part of an Intelligent Transportation System ("ITS") 15 that includes a Vehicle-to-Infrastructure ("V2I") sub-system and a Pedestrian-to-Infrastructure ("P2I") sub-system 35. In the example shown in FIG. 11, traffic control system 21 within controller cabinet 17 controls four signal heads 14. To distinguish individual signal heads 14, the signal head at the north location of intersection 10 is identified by reference character 14-1, the signal head at the south location of intersection 10 is identified by reference character 14-2, the signal head at the east location of intersection 10 is identified by reference character 14-3, and the signal head at the west location of intersection 10 is identified by reference character 14-4. By way of example, signal heads 14-1 and 14-2 may control traffic flow in a north-south direction, including traffic turning into the east-west direction, and signal heads 14-3 and 14-4 may control traffic flow in an east-west direction, including traffic turning into the north-south direction. Cabinet 17 houses a traffic control system, e.g., traffic control system 21A of FIG. 11, configured for controlling traffic. Traffic control system 21A may also serve as a traffic monitoring system.

Referring to FIGS. 11 and 12, an example of a traffic control system 21A that may be within controller cabinet 17 is shown. Controller cabinet 17 is configured to support and protect traffic control system 21A. What is shown in FIG. 12 is traffic control system 21A that includes, for example, a data aggregator 122, a traffic signal controller 24, a Malfunction Management Unit (MMU) 26, and a time sync signal generator 28. Traffic signal controller 24 may be referred to as a traffic signal generator and is connected to data aggregator 122 through an electrical interconnect 27. Malfunction management unit 26 is connected to data aggregator 122 by an electrical interconnect 26A and to traffic signal controller 24 by an electrical interconnect 26B. Time sync signal generator 28 is connected to data aggregator 122 by an electrical interconnect 28A. Traffic control system 21A further includes internal bus interface units 32A and 32B, detectors 34A and 34B, back panel bus interface units 36A and 36B, and back panel load switches 38. Bus interface unit 36A is connected to detectors 34A and bus interface units 32A and 32B and detectors 34A and 34B are connected to traffic signal controller 24.

Components in controller cabinet 17 such as, for example, data aggregator 122 may be connected to a cloud-based network of circuit elements 40 such as processors, logic circuits, memory elements, etc. It should be noted that a cloud-based network of circuit elements may be comprised of an internet service based data storage and analysis system and may include a cloud-based server 40.

For the sake of completeness, FIG. 12 further illustrates that controller cabinet 17 may be connected to a traffic signal head such as, for example, signal head 14, via wiring 42 and switches 43 or via a Dedicated Short Range Communications (DSRC) radio transceiver 44 or a C-V2X radio transceiver via the Ethernet and switches 43. Switches 43 may be referred to as switching relays or relays and may include solid state relays or electromechanical relays. Transceiver 44 is capable of transmitting signals to a traffic signal head and cloud-based network of circuit elements 40 and receiving signals from cloud-based network of circuit elements 40. Alternatively, controller cabinet 17 may be connected to a traffic signal head, such as, for example, signal head 14 and to cloud-based network of circuit elements 40 through a cellular based communications system 47 with options of 3G, 4G, 5G, GSM, GPRS, or the like. It should be noted that 3G refers to the third generation of cellular based communications systems, 4G refers to the fourth generation of cellular based communications systems, 5G refers to the fifth generation of cellular based communications systems, GSM refers to a Global System for Mobile Communications, and GPRS refers to a General Packet Radio Service.

A Pedestrian-to-Infrastructure ("P2I") sub-system 35 cooperates with data aggregator 122 and with other sections of an intelligent transportation system through, for example, DSRC radio transceiver 44, a C-V2X radio transceiver, or a transceiver 35T to monitor and communicate with pedestrian and vehicular traffic. P2I sub-system 35 can provide advisories to a pedestrian, the driver of a vehicle, or other traffic control units regarding environmental conditions, safety issues, traffic accidents, etc. Traffic control system 21A, cloud based network 40, RSU 50, and signal head 14 may form a V2I sub-system 37 or a portion of a V2I sub-system. It should be noted that traffic control system 21A differs from traffic control system 21 of FIGS. 3, 4, 5, and 6 by the presence of P2I sub-system 35 and the absence of SCSM 23 and CA 25.

Traffic signal head 14 may include lamps 14A, 14B, and 14C, where lamp 14A emits light in the red spectrum, lamp 14B emits light in the yellow spectrum, and lamp 14C emits light in the green spectrum.

In addition, a DSRC radio transceiver or a C-V2X radio transceiver in a vehicle 108 may transmit information to or receive information from data aggregator 122 via a DSRC radio transmitter or the cellular based communications system 47. A pedestrian that is identified by reference character 102 or 104 is shown near vehicle 108

Data aggregator 122 transmits and receives real time intersection status and may pass signals such as, for example, Bluetooth signals, cellular based signals, Wireless Fidelity (WiFi) signals, or the like to a cloud-based server through, for example, a cellular modem. Data aggregator 122 is suitable for mounting in traffic control cabinet 17 and may include antenna ports for a Global Positioning System (GPS), Wireless Fidelity (WiFi) and Cellular (Cell) modems; Ethernet input/output ports; input/output ports suitable for use with a Synchronous Data Link Control (SDLC) communications protocol or an Electronic Industries Alliance (EIA) 232 communication protocol; a plurality of auxiliary input/output ports, and a power indicator signal. In addition, data aggregator 122 can receive signals from one or more of an inductive loop, a magnetometer, a video detector such as for example a video camera, a still camera, a radar system, laser system, LiDAR (light detection and ranging) system, or the like as illustrated by reference character 49.

In addition, road side units (RSU's) 50 are mounted to the support structures to which signal heads 14 are mounted. To distinguish RSU's 50, the RSU at the north location of intersection 10 is identified by reference character 50-1, the RSU at the south location of intersection 10 is identified by reference character 50-2, the RSU at the east location of intersection 10 is identified by reference character 50-3, and the RSU at the west location of intersection 10 is identified by reference character 50-4. It should be noted that the traffic control system housed in intersection cabinet 17 may communicate with signal heads 14-1, 14-2, 14-3, and 14-4 via metal cables, fiber optic cables, via wireless communications, or the like. Likewise, the traffic control system housed in intersection cabinet 17 may communicate with RSU's 50-1, 50-2, 50-3, and 50-4. The number of signal heads and RSU's connected to cabinet 17 is not limited to four. There may be one, two, three, four, or more signal heads and RSU's connected to intersection cabinet 17.

In accordance with an embodiment, RSU's 50 are connected to traffic signal control system 21A within intersection cabinet 17 in a hardwired electrical interconnection configuration. Thus, RSU's 50 are connected to the traffic signal control circuit by electrical connections 52 such as copper wires, aluminum wires, or the like. Briefly referring to FIG. 12, an RSU 50 is shown as being connected to data aggregator 122 of traffic control system 21A by an electrical interconnect 54 and to traffic signal controller 24 by another electrical interconnect 52. Thus, RSU 50 is shown as being hardwired to traffic control system 21A. Electrical interconnects 52 and 54 may be copper wires, aluminum wires, fiber optic cables, etc.

In accordance with another embodiment, RSU's 50 are connected to traffic signal control system 21A within intersection cabinet 17 in an optical interconnection configuration. Accordingly, RSU's 50 are connected to the traffic signal control circuit by electrical connections where the electrical connections are optical fibers. Thus, RSU's 50 are hardwired to intersection cabinet 17 by optical fibers.

Figure 13:
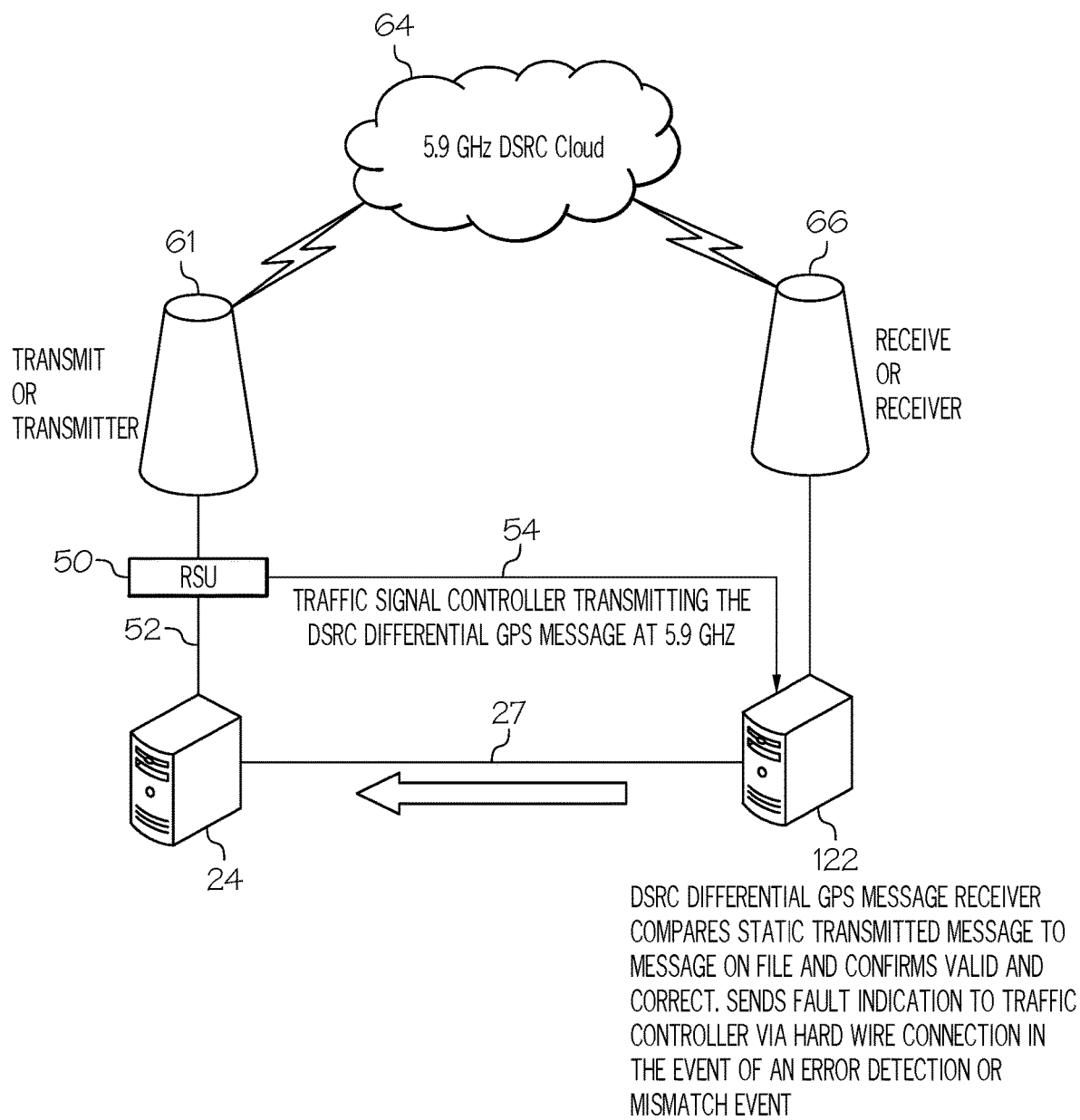
FIG. 13 is a diagram of a traffic control system in accordance with another embodiment of the present invention.

Referring now to FIG. 13, a high level diagram of a traffic control system such as, for example, traffic control system 21A is shown. What is shown in FIG. 13 is a traffic controller, such as, for example, traffic signal controller 24 shown in FIG. 12 coupled to a data aggregator such as, for example, data aggregator 122 shown in FIG. 12. In this example, traffic signal controller 24 is hardwired to data aggregator 122 by an electrical interconnect 27 such as, for example, a copper wire, an aluminum wire, an optical fiber, or the like. Traffic signal controller 24 is coupled to a road side unit (RSU) such as for example, RSU 50 shown in FIGS. 11 and 12. In accordance with an embodiment, traffic signal controller 24 is hardwired to RSU 50 through an electrical interconnect 52 and to data aggregator 122 through an electrical interconnect 54. Thus, RSU 50 is hardwired to data aggregator 122 through a metal interconnect, an optical interconnect, or the like.

RSU 50 has an antenna 61 configured for transmitting a signal through the cloud 64 to a receiving antenna 66 that is connected to data aggregator 122. In accordance with another embodiment antenna 61 is a portion of a transmitter and antenna 66 is a portion of a receiver. It should be noted that the cloud may include a server system configured to communicate with a central control facility, automobiles, buses, drones, other traffic signal controllers, other data aggregators, etc.

In operation in accordance with an embodiment, traffic signal controller 24 transmits a dedicated short range communication (DRSC) global position system (GPS) signal or a C-V2X signal to RSU 50, which in response, transmits a signal to the cloud 64, which transmits a signal to receiver 66, which receiver 66 transmits the signal to data aggregator 122. RSU 50 also transmits the signal to aggregator 122 in a hardwired feedback configuration through electrical interconnect 54. Data aggregator 122 compares the hardwired feedback signal with the wireless signal transmitted from RSU 50 to the cloud. If there is a mismatch between the hardwired signal received by data aggregator 122 and the wireless signal received by data aggregator 122, data aggregator 122 generates a comparison signal indicating the mismatch or error or a fault output. The comparison signal may serve as a fault indicator signal or an error signal or it may cause the traffic signal controller 24 to generate the fault indicator signal or the error signal. The fault indicator signal is transmitted to traffic signal controller 24 to indicate that an error detection or event mismatch has occurred.

In accordance with this embodiment, the traffic signal controller 24 transmits a DSRC signal or C-V2X signal to the cloud 64 at 5.9 GigaHertz (GHz) indicating the intersection should be placed in flash mode, where all the traffic signals indicate a flashing red signal so ensure the safety of the intersection.

Thus, data aggregator 122 serves as a DSRC differential GPS message receiver that compares a static transmitted message to a message on file and confirms whether the signal is valid and correct. Data aggregator 122 sends a fault indication signal to traffic controller 24 via a hard wire connection in the event of an error detection or mismatch event so that traffic controller 24 can issue an appropriate control signal.

Figure 14:
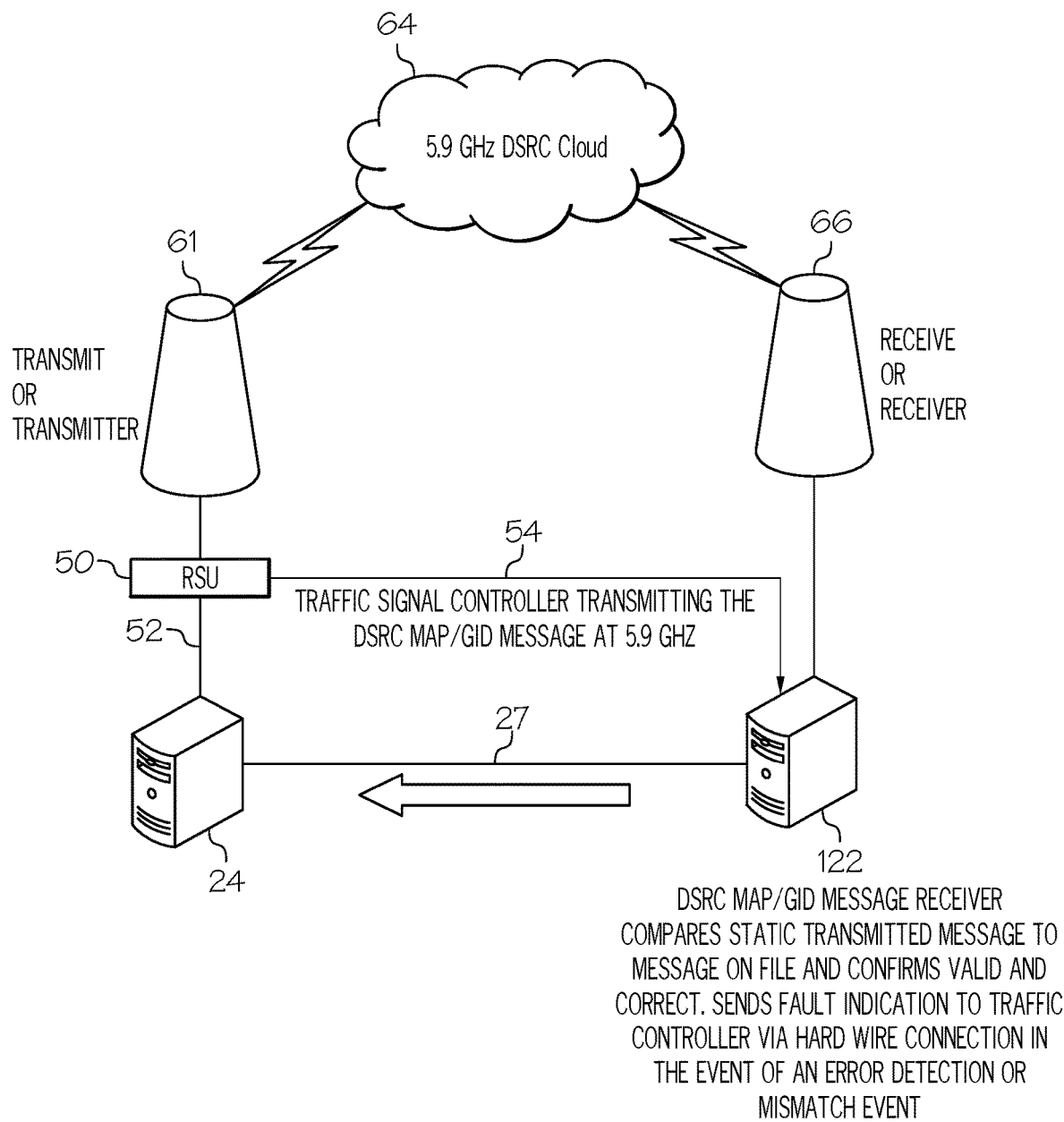
FIG. 14 is a diagram of a traffic control system in accordance with another embodiment of the present invention.

FIG. 14 is a high level diagram of a traffic control system such as, for example, traffic control system 21A. What is shown in FIG. 14 is a traffic controller, such as, for example, traffic signal controller 24 shown in FIG. 12 coupled to a data aggregator such as, for example, data aggregator 122 shown in FIG. 12. In this example, traffic signal controller 24 is hardwired to data aggregator 122 by an electrical interconnect 27. Electrical interconnect 27 can be, for example, a copper wire, an aluminum wire, an optical fiber, or the like. Traffic signal controller 24 is coupled to a road side unit (RSU) such as, for example, RSU 50 shown in FIGS. 11 and 12. In accordance with an embodiment, traffic signal controller 24 is hardwired to RSU 50 through an electrical interconnect 52. In addition, RSU 50 is electrically connected to, for example, data aggregator 122 through an electrical interconnect 54. Thus, RSU 50 is hardwired to data aggregator 122 through a metal interconnect, an optical interconnect, or the like.

RSU 50 has an antenna 61 configured for transmitting a signal through the cloud 64 to a receiving antenna 66 that is connected to data aggregator 122. It should be noted that the cloud may include a server system configured to communicate with a central control facility, automobiles, buses, drones, other traffic signal controllers, other data aggregators, etc.

In operation in accordance with an embodiment, traffic signal controller 24 transmits a dedicated short range communication (DRSC) MAP/GID signal or a C-V2X signal to RSU 50, which in response, transmits a signal to the cloud 64 and in a hardwired feedback configuration to data aggregator 122. Data aggregator 122 compares the hardwired feedback signal with the wireless signal transmitted from RSU 50 to the cloud, which is then received by data aggregator 122 via receiver antenna 66 to generate a comparison signal. If there is a mismatch between the hardwired signal received by data aggregator 122 and the wireless signal received by data aggregator 122, data aggregator 122 generates a comparison signal indicating the mismatch. The comparison signal may serve as a fault indicator signal or an error signal or it may cause the traffic signal controller 24 to generate the fault indicator signal or the error signal. The fault indicator signal is transmitted to traffic signal controller 24 to indicate that an error detection or event mismatch has occurred.

In accordance with this embodiment, the traffic signal controller 24 transmits a DSRC signal or C-V2X signal to the cloud 64 at 5.9 GigaHertz (GHz) indicating the intersection should be placed in flash mode, where all the traffic signals indicate a flashing red signal so ensure the safety of the intersection.

It should be noted that the frequency at which traffic signal controller 24 transmits signals is not a limitation. For example, it can transmit at 5.8 GHz or some other desired frequency.

In accordance with this embodiment, data aggregator 122 serves as a DSRC MAP/GID message receiver that compares a static transmitted message to a message on file and confirms whether the signal is valid and correct. Data aggregator 122 sends a fault indication signal to traffic controller 24 via a hard wire connection in the event of an error detection or mismatch event so that traffic controller 24 can issue an appropriate control signal.

Figure 15:
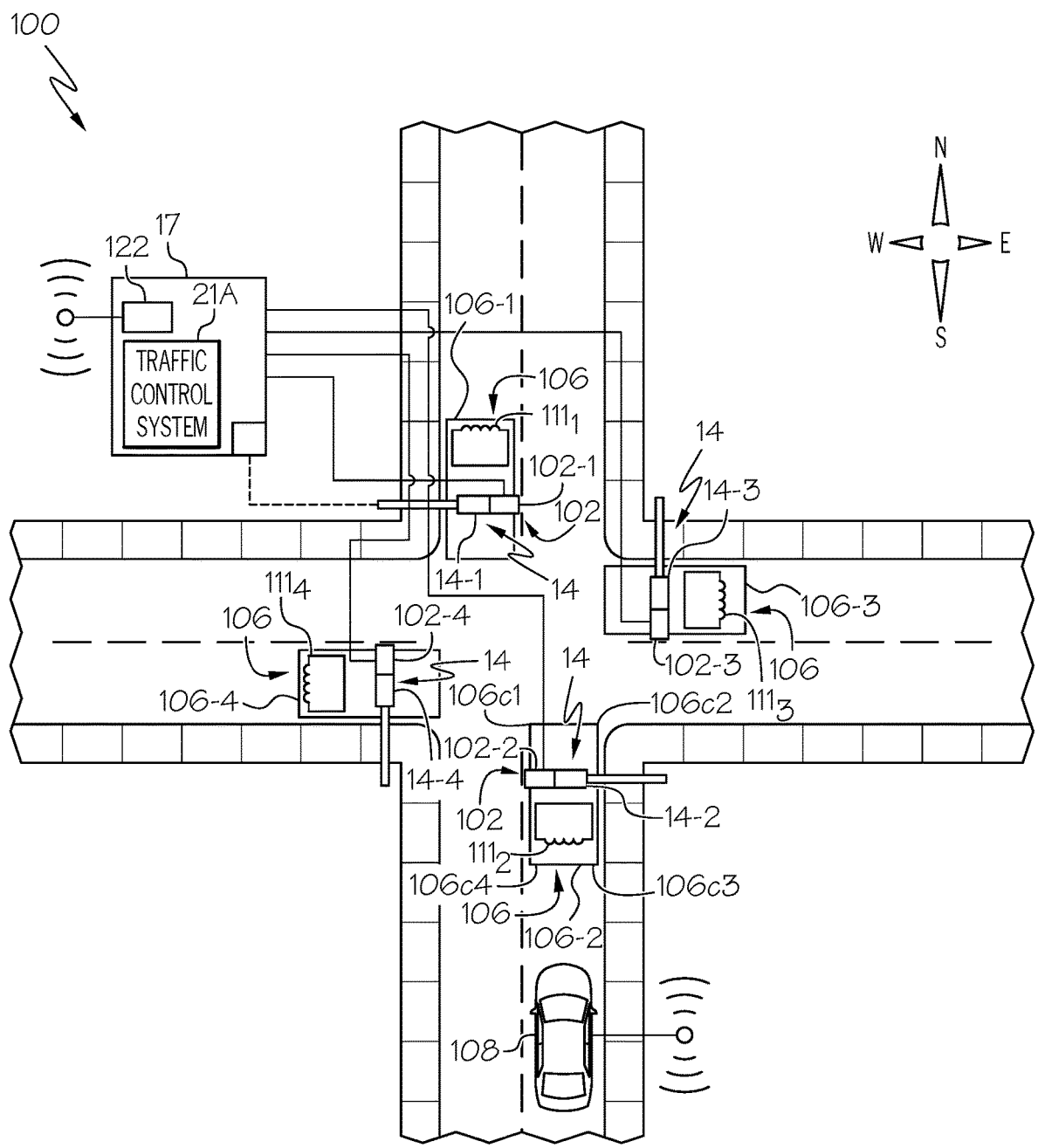
FIG. 15 is a diagram of a roadway intersection that includes a traffic monitoring system in accordance with another embodiment of the present invention.

FIG. 15 is diagram of a roadway intersection 100 that includes a traffic control system 21A in accordance with an embodiment of the present invention. Common elements of roadway intersections 10 and 100 have been described with reference to FIGS. 11 and 12. Roadway intersection 100 further includes one or more image recorders 102 such as, for example, still cameras, video cameras, or a combination of still and video cameras. The cameras are collectively identified by reference character 102, however, to distinguish individual cameras 102, the camera associated with signal head 14-1 is identified by reference character 102-1, the camera associated with signal head 14-2 is identified by reference character 102-2, the camera associated with signal head 14-3 is identified by reference character 102-3, and the camera associated with signal head 14-4 is identified by reference character 102-4. Cameras 102 may be hard wire connected to data aggregator 122 via metallic interconnects, optical fibers, or the like or they may be wirelessly connected to data aggregator 122 via, for example, a radio frequency transmitter.

In addition, each intersection includes a vehicle detection zone 106 from which information regarding the presence or absence of a vehicle 108 can be detected. The vehicle detection zones are collectively identified by reference character 106, however, to distinguish vehicle detection zones 106, the vehicle detection zone associated with or adjacent to signal head 14-1 is identified by reference character 106-1, the vehicle detection zone associated with or adjacent to signal head 14-2 is identified by reference character 106-2, the vehicle detection zone associated with or adjacent to signal head 14-3 is identified by reference character 106-3, and the vehicle detection zone associated with or adjacent to signal head 14-4 is identified by reference character 106-4. Each vehicle detection zone 106-1, 106-2, 106-3, and 106-4 has GPS location boundaries at their corners 106$c$1, 106$c$2, 106$c$3, and 106$c$4 that cooperate to form a rectangular vehicle detection zone. A vehicle detection zone 106 may be referred to as a geofence or a geographic boundary. Vehicle detection zones 106 may have a square shape, a rectangular shape, a circular shape, an elliptical shape, a polygonal shape, or the like. In addition, the vehicle detection zones at an intersection may be different. For example, vehicle detection zone 106-1 may be rectangular, vehicle detection zone 106-2 may be hexagonal, vehicle detection zone 106-3 may be elliptical, and vehicle detection zone 106-4 may be rectangular. Inductive loops 111 are formed in the road and communicate with, for example, data aggregator 122 to indicate the absence or presence of a vehicle 108. By way of example, inductive loops 111 are hard wire connected to data aggregator 122 via, for example, copper wires, aluminum wires, optical fibers, or the like. Alternatively, inductive loops 111 can be wirelessly connected to data aggregator 122. Accordingly, inductive loops 111 are communicatively coupled to data aggregator 122. To distinguish individual vehicle detection devices 111, a vehicle detection device $111_1$ is adjacent or associated with signal head 14-1, a vehicle detection device $111_2$ is adjacent or associated with signal head 14-2, a vehicle detection device $111_3$ is adjacent or associated with signal head 14-3, and a vehicle detection device $111_4$ is adjacent or associated with signal head 14-4.

Cameras 102-1, 102-2, 102-3, and 102-4 may be mounted to the same support structures to which signal heads 14-1, 14-2, 14-3, and 14-4, respectively, are mounted. The traffic control system housed in intersection cabinet 17 may communicate with cameras 102-1, 102-2, 102-3, and 102-4 via metal cables, via fiber optic cables, via wireless communications, or the like. Cameras 102 may be configured to transmit DSRC signals, vehicle-to-vehicle (V2V) signals, vehicle-to-everything (V2X) signals, cellular vehicle-to-everything (C-V2X) signals, 3G signals, 4G signals, 5G signals, GPS signals, or the like. The number of cameras 102-1, 102-2, 102-3, and 102-4 connected to cabinet 17 is not limited to four. There may be one, two, three, four, or more cameras connected to intersection cabinet 17.

In operation in which cameras 102 are connected to data aggregator 122 through a wireless connection, a camera such as camera 102-2 monitors the intersection in which vehicle detection zone 106-2 is located. Data is wirelessly transmitted to data aggregator 122 from, for example, camera 102-2 indicating whether a vehicle 108 is present or absent from vehicle detection zone 106-2. As discussed above, the wireless signal may be a DSRC signal, a V2V signal, a V2X signal, a C-V2X signal, a 3G signal, a 4G signal, a 5G signal, a GPS signal, or the like. Vehicle 108 also transmits a signal to data aggregator 122 that includes GPS location information. Like the signal received by data aggregator 122 from camera 102-2, the wireless signal received from vehicle 108 may be a DSRC signal, a V2V signal, a V2X signal, a C-V2X signal, a 3G signal, a 4G signal, a 5G signal, a GPS signal, or the like.

Data aggregator 122 compares the signal from camera 102-2 with the wireless signal transmitted from vehicle 108 to generate a comparison signal. The signal from camera 102-2 can be a wireless signal or a hardwired signal. If there is a mismatch between the wireless signal received by data aggregator 122 from camera 102-2 and the wireless signal received by data aggregator 122 from vehicle 108, it generates a comparison signal. The comparison signal may serve as a fault indicator signal or an error signal indicating that at least one of the camera 102-2 and the vehicle 108 is transmitting a signal indicating that a vehicle is present in vehicle detection zone 106. The fault indicator signal is transmitted to traffic signal controller 24 to indicate that a location matching error detection or a location matching event mismatch has occurred.

Figure 16:
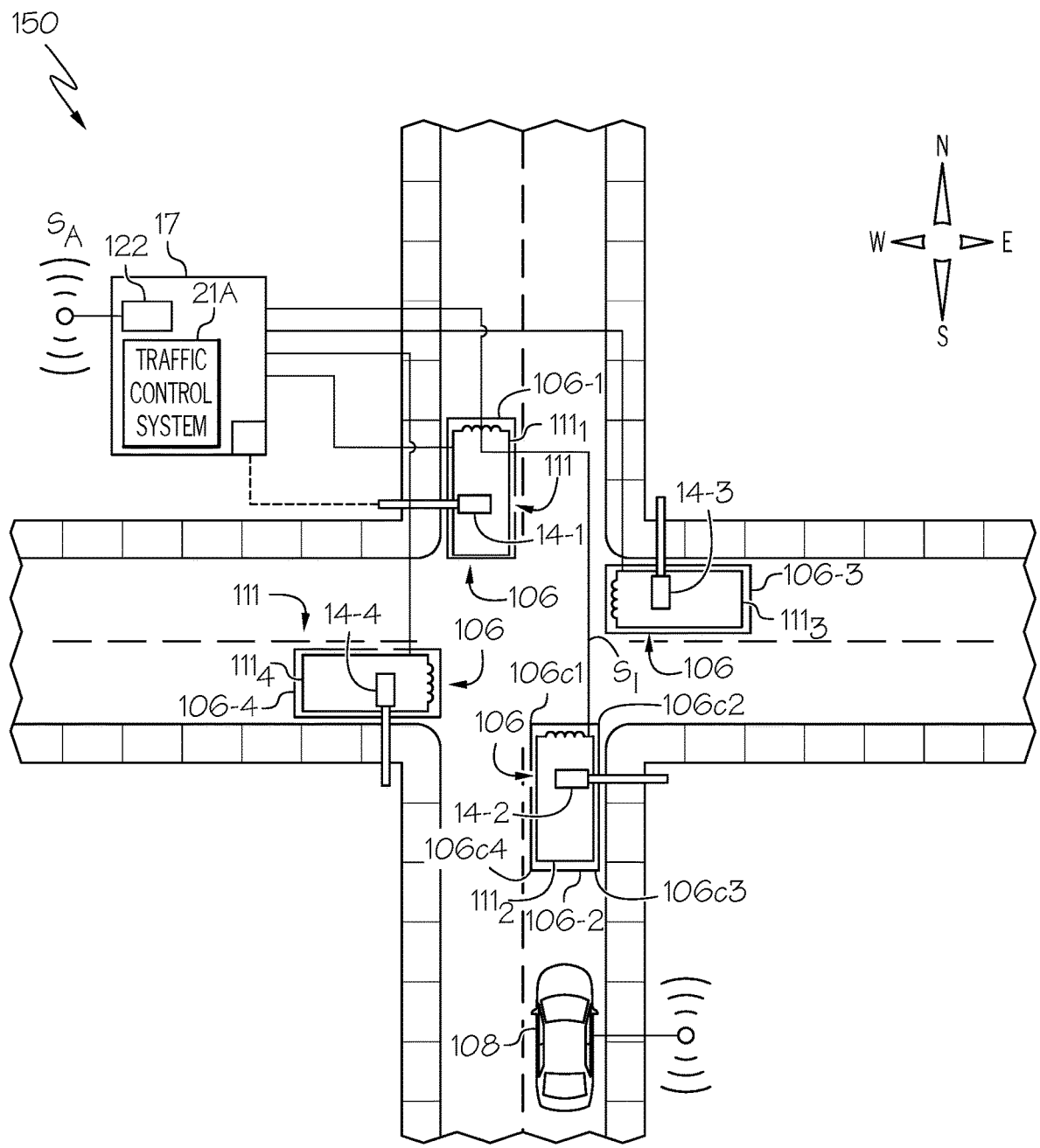
FIG. 16 is a diagram of a roadway intersection that includes a traffic monitoring system in accordance with another embodiment of the present invention.

FIG. 16 is diagram of a roadway intersection 150 that includes a traffic monitoring system 21A in accordance with an embodiment of the present invention. Common elements of roadway intersections 10 and 150 have been described with reference to FIGS. 11 and 12. Roadway intersection 150 further includes one or more vehicle detection devices 111. In accordance with an embodiment, vehicle detection devices 111 may be comprised of an inductive loop which serves as a receiving antenna. Thus, each lane of roadway intersection 150 may include an inductive loop. However, this is not a limitation and fewer than each lane may include a vehicle detection device 111. To distinguish individual vehicle detection devices 111, a vehicle detection device $111_1$ is adjacent or associated with signal head 14-1, a vehicle detection device $111_2$ is adjacent or associated with signal head 14-2, a vehicle detection device $111_3$ is adjacent or associated with signal head 14-3, and a vehicle detection device $111_4$ is adjacent or associated with signal head 14-4. As discussed with reference to FIG. 15, each intersection includes a vehicle detection zone 106-1, 106-2, 106-3, and 106-4 having GPS location boundaries at their corners 106c1, 106c2, 106c3, and 106c4 that cooperate to form, for example, a rectangular vehicle detection zone. The shape of vehicle detection zones 106 is not a limitation. Vehicle detection zones 106 may have a square shape, a rectangular shape, a circular shape, an elliptical shape, a polygonal shape, or the like. In addition, the vehicle detection zones at an intersection may be different. For example, vehicle detection zone 106-1 may be rectangular, vehicle detection zone 106-2 may be hexagonal, vehicle detection zone 106-3 may be elliptical, and vehicle detection zone 106-4 may be rectangular. Inductive loops 111 are formed in the road and communicate with, for example, data aggregator 122 to indicate the absence or presence of a vehicle 108. By way of example, inductive loops 111 are hard wire connected to data aggregator 122 via, for example, copper wires, aluminum wires, optical fibers, or the like.

In operation, inductive loops 111 are configured as receiving antennas that receive a signal ($S_I$) regarding the presence or absence of a vehicle in a vehicle detection zone 106. The data is transmitted to data aggregator 122 using for example, a hardwire connection. Vehicle 108 also transmits a signal ($S_A$) to data aggregator 122 that includes GPS location information. The wireless signal received from vehicle 108 may be a DSRC signal, a V2V signal, a V2X signal, a C-V2X signal, a 3G signal, a 4G signal, a 5G signal, a GPS signal, or the like.

Data aggregator 122 compares the wireless signal from inductive loop 111 with the wireless signal transmitted from vehicle 108 to generate a comparison signal. If there is a mismatch between the signal received by data aggregator 122 from inductive loop 111 and the wireless signal received by data aggregator 122 from vehicle 108, it generates a comparison signal. The comparison signal may serve as a fault indicator signal or an error signal indicating that at least one of inductive loop 111 and the vehicle 108 is transmitting a signal indicating that a vehicle is present in vehicle detection zone 106. The fault indicator signal is transmitted to traffic signal controller 24 to indicate that a location matching error detection or a location matching event mismatch has occurred.

Figure 17:
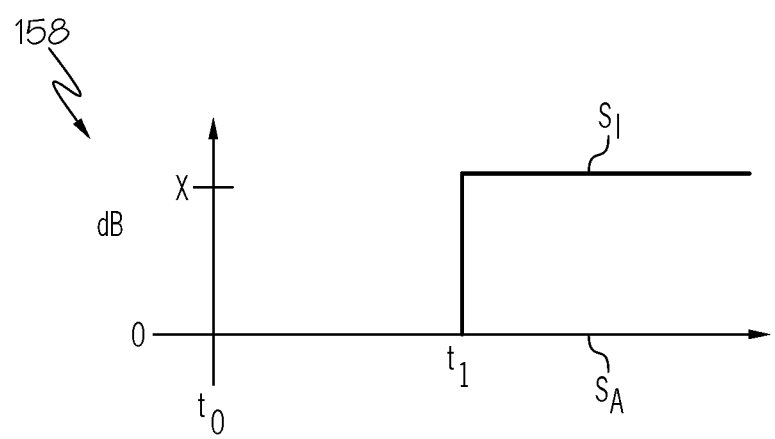
FIG. 17 is a timing diagram of signals of the traffic monitoring system of FIG. 16.

FIG. 17 is a plot 158 illustrating the signal ($S_A$) received by data aggregator 122 and the signal ($S_I$) transmitted by inductive loop 111. In accordance with the example shown in plot 158, from times $t_0$ to $t_1$, the signal strengths of both signals $S_A$ and $S_I$ are at 0 decibels (dB), indicating that data aggregator 122 receives a signal indicating the absence of vehicle 108 from vehicle detection zone 106 and a vehicle 108 is not over inductive loop 111. At time $t_1$, the signal from inductive loop 111 changes to a level that is greater than 0 dB, indicating that a vehicle is over inductive loop 111. However, the signal received by aggregator 122 indicates that a vehicle 108 is not present over inductive loop 111. Thus, there is a mismatch detected indicating a signal error. Data aggregator 122 compares signal $S_A$ and $S_I$ and generates a comparison signal indicating the mismatch. Data aggregator 122 may use the comparison signal to indicate that an error condition exists or generate an error signal in response to the comparison signal.

Figure 18:
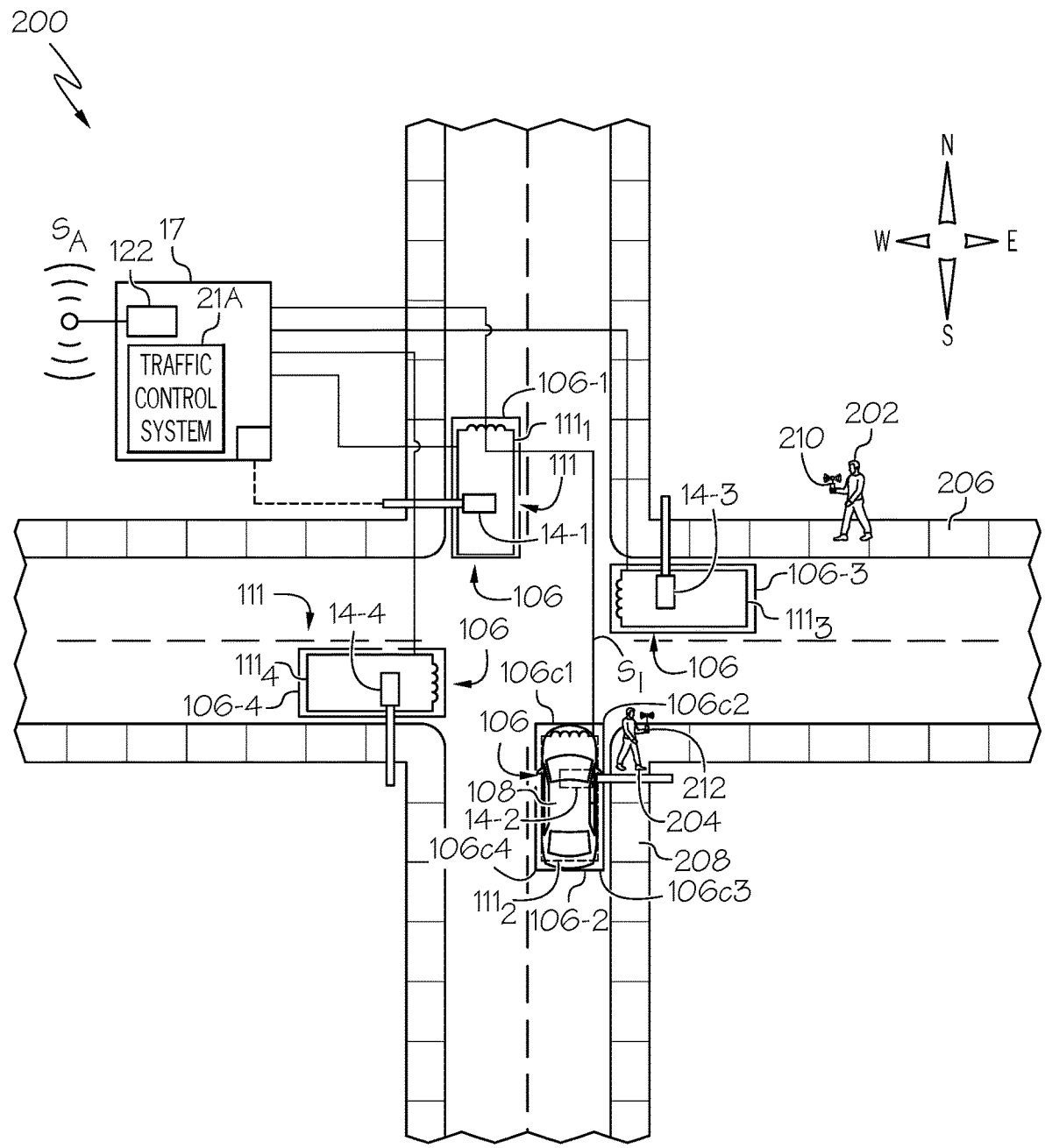
FIG. 18 is a diagram of a roadway intersection that includes a traffic monitoring system in accordance with an embodiment of the present invention.
Figure 19:
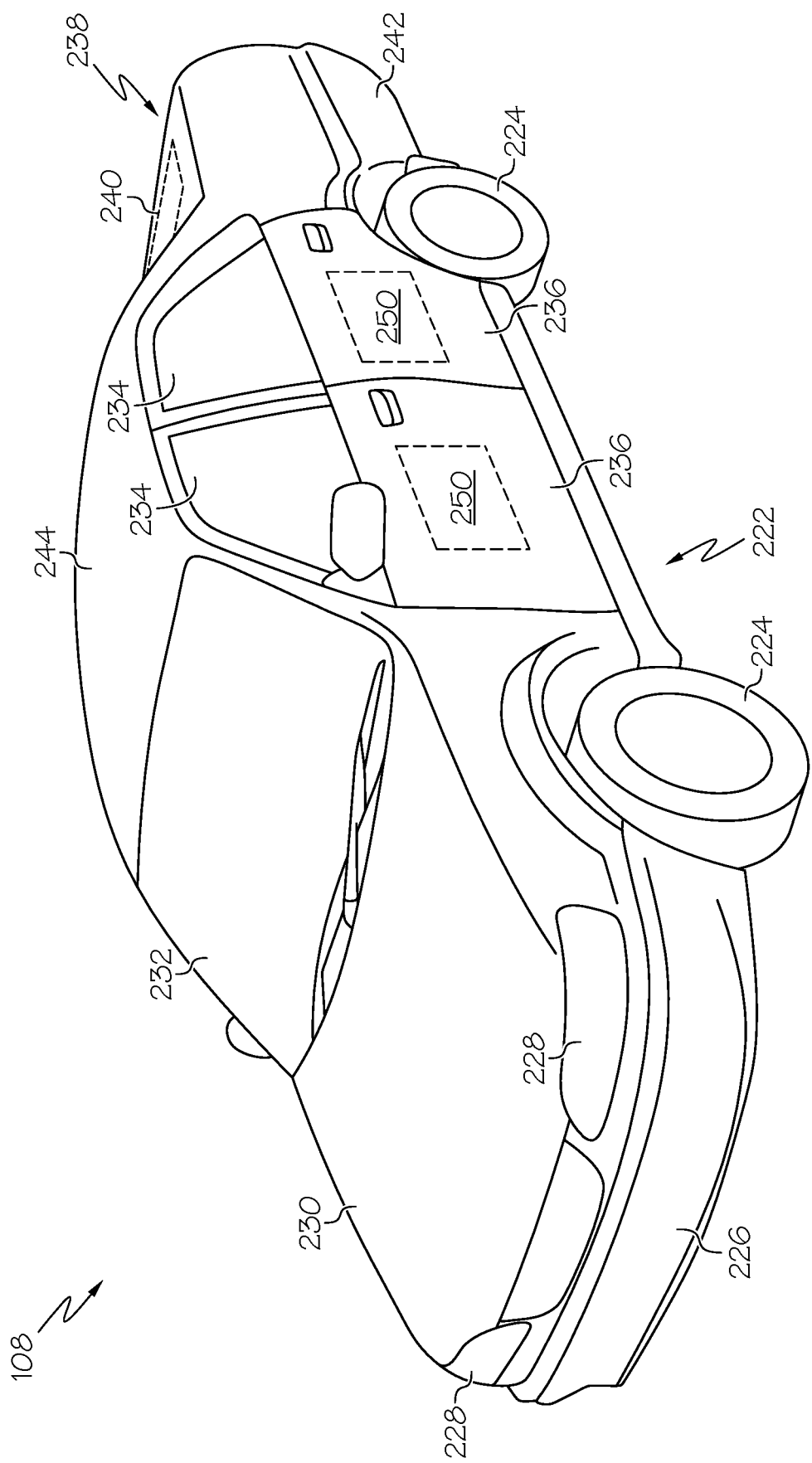
FIG. 19 is a perspective side view of a vehicle configured for cooperating with roadway intersection in accordance with an embodiment of the present invention.

FIG. 18 is a top view of a four-way intersection 200 controlled by a traffic control system 21A (shown in FIG. 12) that is within a controller cabinet 17 (shown in FIG. 11) and is part of an intelligent transportation system that includes a Pedestrian-to-Infrastructure ("P2I") sub-system 35. An intelligent transportation system may include sub-systems for managing vehicle navigation, traffic signal control, pedestrian monitoring and navigation systems, traffic control systems, vehicle parking systems, etc. FIG. 19 is a perspective side view of a vehicle 108 configured for cooperating with roadway intersection 200. Four-way intersection 200 is similar to four-way intersections 100 and 150 described with reference to FIGS. 15 and 16, respectively, wherein like reference characters designate like elements. Vehicle 108 shown in FIG. 12 is another example of a vehicle that may interact with an intersection such as, for example, four-way intersection 200. FIG. 18 illustrates pedestrians 202 and 204 walking on sidewalks 206 and 208, respectively. Pedestrians 202 and 204 are carrying GPS enabled mobile communications devices 210 and 212, respectively. By way of example GPS enabled mobile communications devices 210 and 212 are GPS enabled cellular phones. GPS enabled mobile communications devices are not limited to being cellular phones and may include pagers, personal digital assistants, notebooks, laptops, handheld communications devices, or the like. It should be noted that vehicle 108 is within geofence 106-2. FIG. 19 is perspective view of a vehicle 108 having a body 222, tires 224, a bumper 226, headlights 228, a hood, 230, a windshield 232, passenger windows 234, doors 236, a rear end 238, a trunk 240 (shown as broken lines because it is hidden from view), a rear bumper 242, and a top 244. It should be appreciated that the parts of vehicles are well known to those skilled in the art. The type of vehicle is not limited to being an automobile or car, but can be, for example, passenger vehicles, trucks, motorcycles, boats, airplanes, aerial vehicles, airships, and the like. FIG. 19 further illustrates a communications device 250 having Near Field Coupled ("NFC") antennas mounted in interior portions of vehicle 108. Communications devices 250 having NFC antennas are shown as being placed behind a sidewall of the driver side and a sidewall of the driver side rear passenger seat. The number and locations of communications devices 250 having NFC antennas is not a limitation of the present invention. For example, communications devices 250 having NFC antennas may be placed behind sidewalls on the driver side and the front passenger side and behind sidewalls on the front passenger side seat and the driver side rear passenger seat; or behind the sidewalls of the driver side and the front passenger side seats, but not behind the sidewalls of the rear passenger side seats; or behind the sidewalls of the rear passenger side seats, but not behind the sidewalls of the front side passenger seat and the driver side seat, etc.

Figure 20:
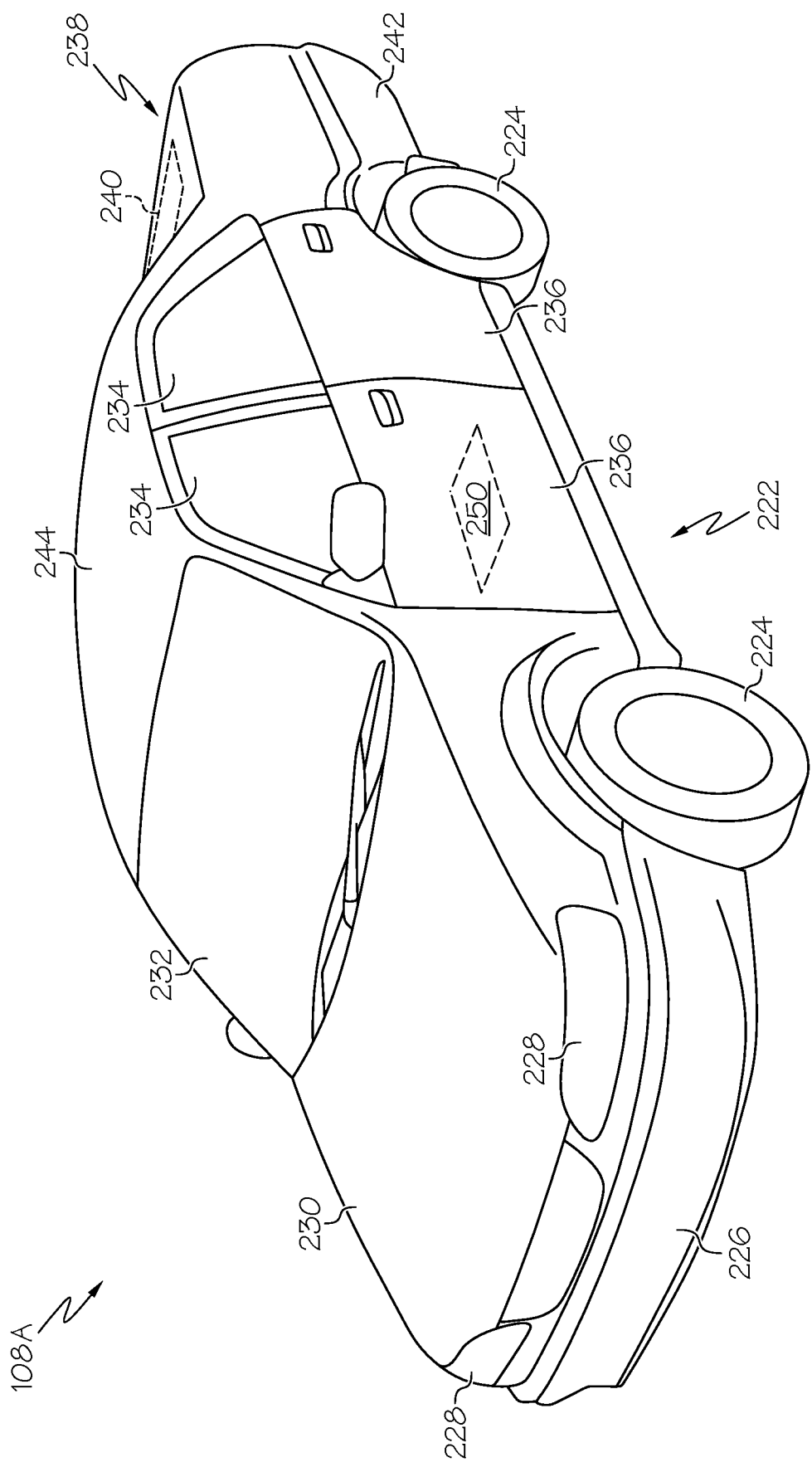
FIG. 20 is a perspective side view of a vehicle configured for cooperating with roadway intersection in accordance with an embodiment of the present invention.

Briefly referring to FIG. 20, a vehicle 108A is shown in which a communications devices 250 having an NFC antenna is shown as being below the driver seat. In accordance with another embodiment, communications devices 250 having NFC antennas can be placed below the driver's seat and below the front passenger side seat. In accordance with yet another embodiment, a communications device 250 having an NFC antenna can be placed beneath the front passenger side seat, but not the driver side seat. In accordance with yet another embodiment, a communications device 250 having NFC antennas is placed beneath the driver side seat, the front passenger side seat, and at least one of the back seats.

Figure 21:
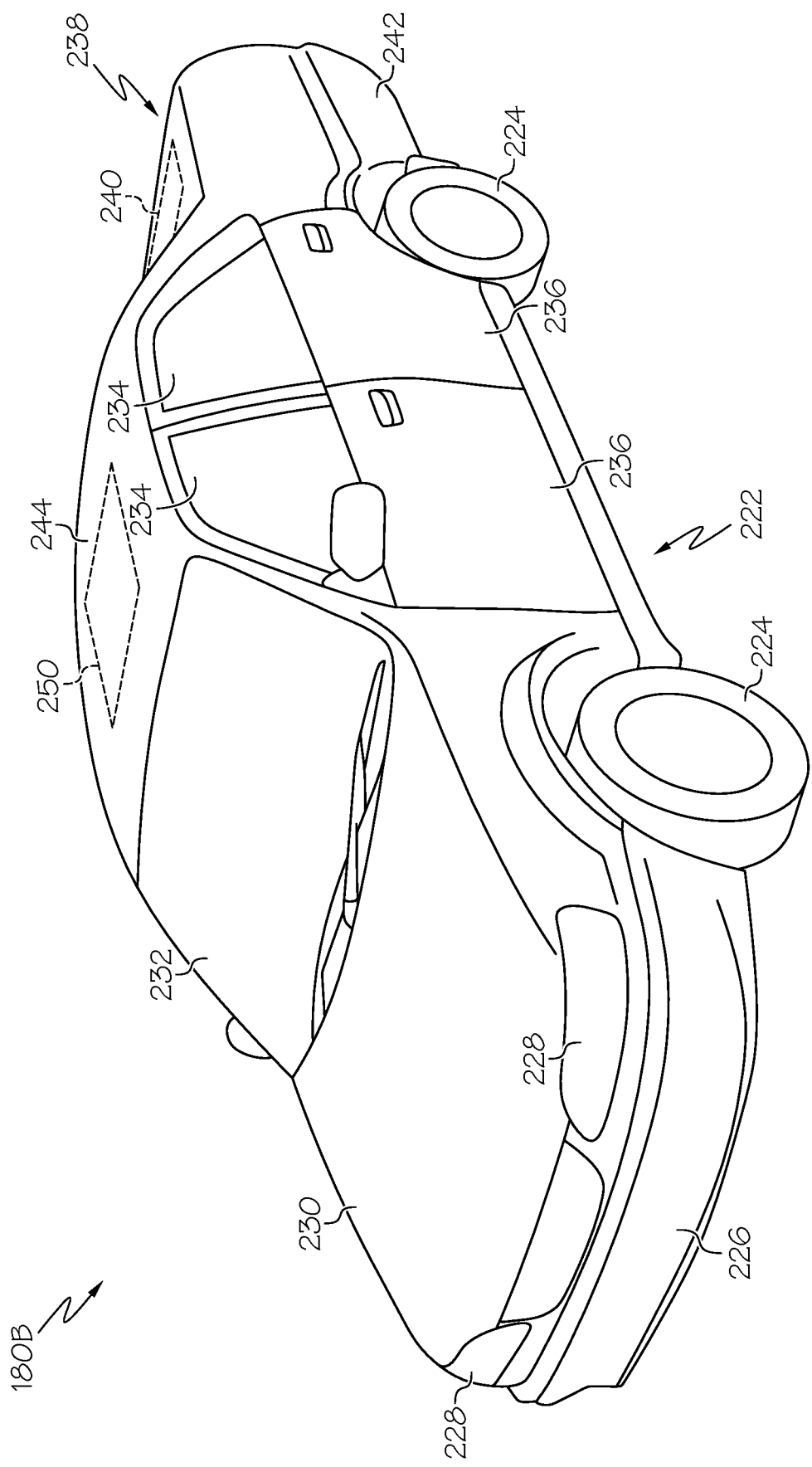
FIG. 21 is a perspective side view of a vehicle configured for cooperating with roadway intersection in accordance with an embodiment of the present invention.

Briefly referring to FIG. 21, a vehicle 108B is shown in which a communications device 250 having an NFC antenna is shown as being in roof area. It should be noted that the number and locations at which the communications device 250 having an NFC antenna is placed is not a limitation and that the communications device 250 having the NFC antenna may be placed in other locations of vehicle 108B such as, for example, below the floor, below one or more seats, etc.

Figure 22:
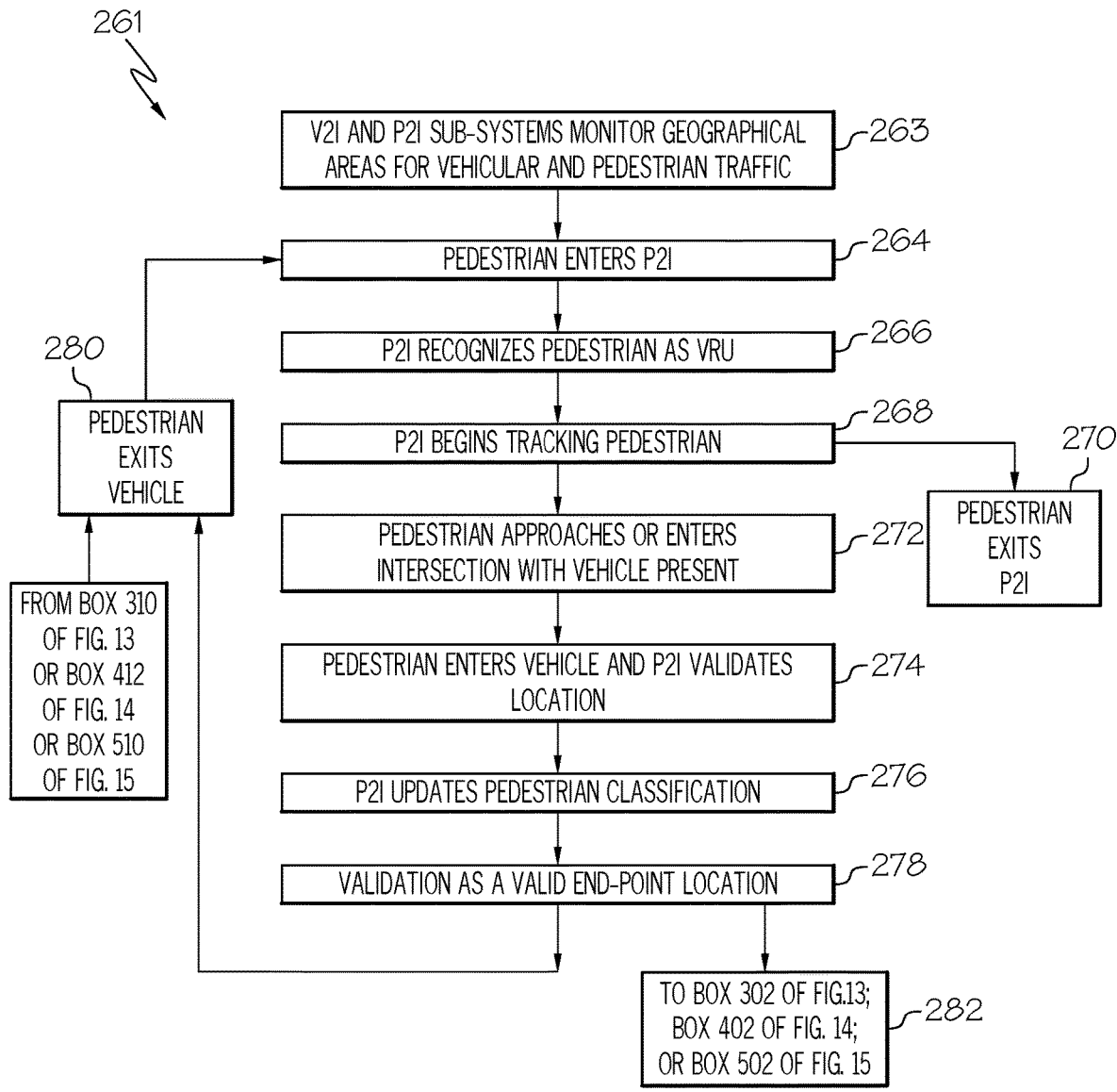
FIG. 22 is a flow diagram of a method for validating the location of a pedestrian in accordance with an embodiment of the present invention.

FIG. 22 is a flow diagram 261 of a method for validating the location of a pedestrian, such as pedestrians 202 and 204. For the sake of clarity, FIGS. 18-22 will be described together. In operation, the Pedestrian-to-Infrastructure ("P2I") sub-system 35 monitors geographical areas or regions for communications from Global Positioning System ("GPS") enabled mobile devices, such as, for example, cell phones 212 and 214. In addition, the intelligent transportation system includes a Vehicle-to-Infrastructure ("V2I") sub-system 37 that monitors vehicular traffic in the geographical areas or regions (identified by box 263 of flow diagram 261). In response to pedestrian 202 with a GPS enabled mobile device 212 being on or entering sidewalk 208 or a pedestrian on sidewalk 208 who activates their GPS enabled mobile device 212 (identified by box 264), P2I sub-system 35 establishes a communications link with GPS enabled mobile device 212 and assigns the GPS enabled cell mobile device 212 with an identifier including a status classification such as, for example, a Vulnerable Road User ("VRU") (identified by box 266). After pedestrian 202 has been identified and assigned a status classification, P2I sub-system 35 assigns an initial GPS location and begins tracking the location, speed, and bearing of pedestrian 202 to be able to generate a broadcast message if pedestrian 202 enters a geofenced location that has been classified as being dangerous or hazardous (identified by box 268). The pedestrian may exit the sidewalk or leave the geographic boundaries of P2I sub-system 35 (identified by box 270). Alternatively, the pedestrian could decide to leave the sidewalk and enter a vehicle such as, for example, GPS enabled vehicle 108 (shown in FIG. 18). It should be noted that four-way intersection 200 (shown in FIG. 18) has four geofenced locations identified by reference character 108. Geofenced locations 106 may be included in portions of the roadway where it may be dangerous for a pedestrian to walk in or stop. In this example, geofenced locations 106 are located at intersections where it may be unsafe for the pedestrian 202 to enter. However, the locations and the number of geofenced locations 106 are not limitations of the present invention. Pedestrians having GPS enabled mobile devices 212 approaching or entering geofenced locations 106 will trigger P2I sub-system 35 to issue a warning to GPS enabled vehicle 108 as it approaches or enters a geofenced location 106 and to GPS mobile device 212 (identified by box 272).

In yet another alternative, vehicle 108 approaches an intersection, enters and stops within a geofenced location such as, for example, geofenced location 106-2 (shown in FIG. 18). Vehicle 108 broadcasts its GPS location information to a Vehicle-to-Infrastructure ("V2I") sub-system 37 of an intelligent transportation system. In response to pedestrian 202 entering vehicle 108, communications device 250 having an NFC antenna in vehicle 108 detects and validates the location of pedestrian 102 and GPS enabled mobile device 112 as being inside vehicle 108. Communications device 250 having an NFC antenna transmits a signal to P2I sub-system 35 that pedestrian 202 having the VRU status classification is now inside vehicle 108 (identified by box 274). Communications device 250 having an NFC antenna transmits a signal to P2I sub-system 35 validating the location of pedestrian 202 and GPS enabled mobile device 212. In response to receiving the validation signal of the location of pedestrian 202, P2I sub-system 35, which has received the signal containing the location of vehicle 108 from V2I sub-system 37, updates or changes the status classification of pedestrian 202 from a VRU to being inside vehicle 108 (identified by box 276). Thus, P2I sub-system 35 notes the prior status classification of GPS enabled mobile device 212 as being VRU, that the device is within a MAP environment, de-notates the status classification, and reclassifies the GPS enabled mobile device 212, and hence passenger 202, as a mobile vehicle passenger. The GPS enabled mobile device 212 becomes coupled to vehicle 108 as a validated end-point location for security purposes (indicated by box 278).

In response to the passenger exiting vehicle 108 (identified by box 280), the GPS enabled mobile device 212 re-inters P2I sub-system 35, which is identified by returning to box 264.

An alternate embodiment is described with reference to FIG. 23. Thus, FIG. 22 indicates a subsequent step starting at box 302 of FIG. 23 (indicated by box 282). Another alternate embodiment is described with reference to FIG. 24. Thus, FIG. 22 also indicates a subsequent step starting at box 402 of FIG. 24 (indicated by box 282). Another alternate embodiment is described with reference to FIG. 25. Thus, FIG. 22 also indicates a subsequent step starting at box 502 of FIG. 25 (indicated by box 282).

Figure 23:
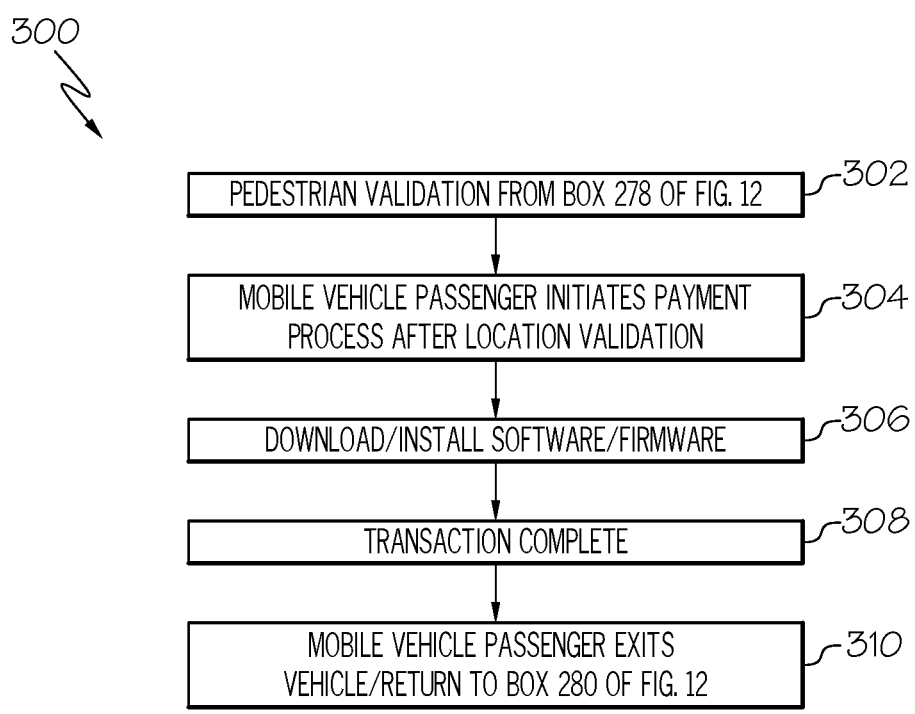
FIG. 23 is a flow diagram of a location validation and payment method in accordance with an embodiment of the present invention.

FIG. 23 is a flow diagram 300 of a method for operating a GPS enabled mobile device such as, for example, mobile devices 212 and 214 within P2I sub-system 35 in accordance with a location validation and payment embodiment of the present invention. A description of the location validation and payment embodiment continues from box 278 of FIG. 22, wherein the location of a pedestrian within a vehicle such as, for example, pedestrian 202 (in vehicle 108 of FIG. 18) has been validated (identified by box 302). Thus, the pedestrian enabled mobile device location validation and payment process incorporates end-point location validation as described with reference to FIG. 22 into a payment processing process.

After the location of pedestrian 102 within vehicle 108 has been validated and pedestrian 102 has been reclassified from a VRU to being a mobile vehicle passenger, vehicle 108 carrying pedestrian 102 travels along the intelligent transportation system. If one of the occupants of vehicle 108 decides to make a purchase, vehicle 108 stops at a business to purchase an item. In accordance with an embodiment, the vehicle occupants remain in the vehicle while making the purchase. Thus, the purchase can occur at a drive-thru window of a fast food restaurant, a take-out location at a fast food restaurant, a market, a grocery store, a pool store, any retail establishment that delivers the items purchased to vehicle 108, a fuel station, a financial institution, or the like. In response to vehicle 108, which is carrying former pedestrian 102, stopping at a business to purchase an item, GPS enabled mobile device 212 establishes a link with, for example, the cloud 40 followed by initiating a payment processing program (identified by box 304).

After the communications link has been established, the server for the business may download or install software or firmware onto GPS enabled mobile device 212 to provide additional security for the transaction (identified by box 306). The software may include an encryption mechanism such as, for example, asymmetric cryptography to ensure the security of the data being transmitted.

After the transaction is complete, the server associated with the business receives a message from GPS enabled mobile device 212 indicating completion of the transaction and termination of the transaction (indicated by box 308).

When the mobile vehicle passenger decides to exit the vehicle (identified by box 310), the vehicle stops to allow the mobile vehicle passenger to exit the vehicle 108 (identified by box 280 of FIG. 12) so that the GPS enabled mobile device 212 may re-inters P2I sub-system 35 (identified by return to box 264 of FIG. 12).

Figure 24:
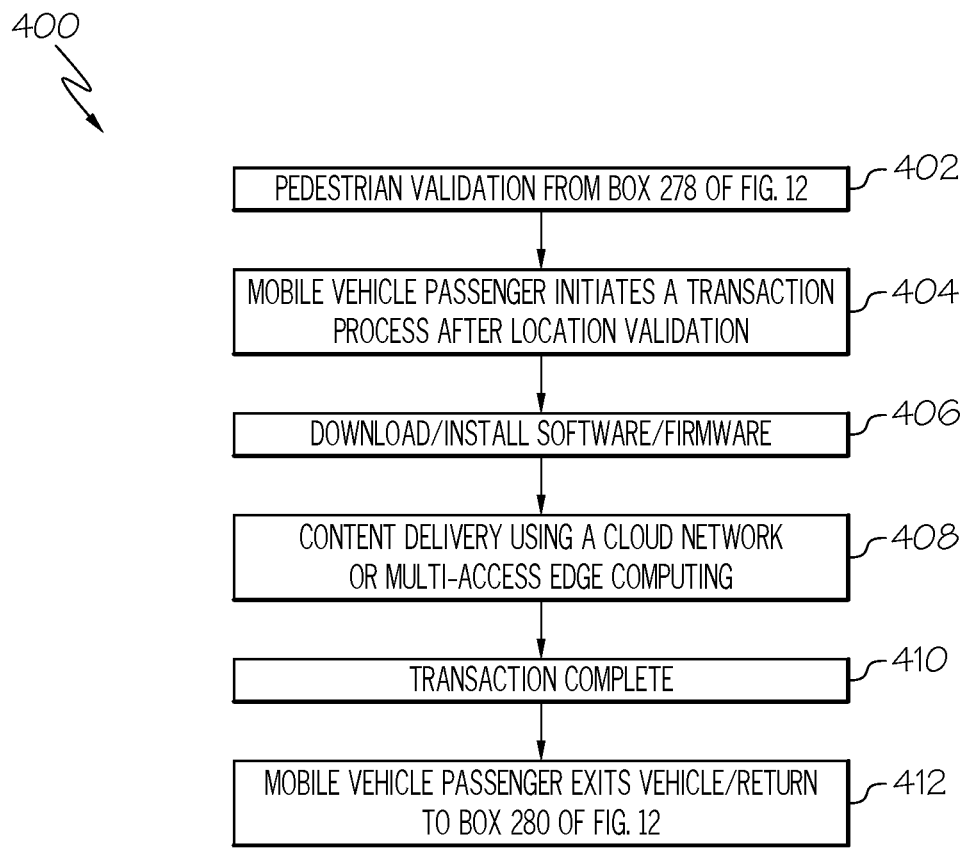
FIG. 24 is a flow diagram of a location validation and content delivery method in accordance with an embodiment of the present invention.

FIG. 24 is a flow diagram 400 of a method for operating a GPS enabled mobile device such as, for example, mobile devices 212 and 214 within P2I sub-system 35 in accordance with a location validation and content delivery embodiment of the present invention. A description of a location validation and content delivery embodiment continues from box 278 of FIG. 22, wherein the location of a pedestrian within a vehicle such as, for example, pedestrian 202 in vehicle 108 of FIG. 18 has been validated (identified by box 402). Thus, the pedestrian enabled mobile device content delivery validation process incorporates end-point location validation as described with reference to FIG. 22 into a content delivery process.

After the location of pedestrian 102 within vehicle 108 has been validated and pedestrian 102 has been reclassified from a VRU to being a mobile vehicle passenger, vehicle 108 carrying pedestrian 102 travels along the intelligent transportation system. The mobile vehicle passenger may decide to download content from a content provider. The content may be video data, audio data, a combination of video data and audio data, data from a database, data from a document, or the like. GPS enabled mobile device 212 establishes a link with, for example, the cloud 40 followed by initiating a transaction process program (identified by box 404).

After the communications link has been established, the server for the content provider may download or install software or firmware onto GPS enabled mobile device 212 to provide additional security for the transaction or to complete the transaction (identified by box 406). The software may include an encryption mechanism such as, for example, asymmetric cryptography to ensure the security of the data being transmitted.

After the content provider has downloaded any security software that may be desired, GPS enabled mobile device 212 and the content provider server in the cloud 40 deliver the desired content using a content delivery mechanism. Alternatively, content provider can use mobile edge computing ("MEC") to deliver the content (identified by box 408).

It should be noted that partial loading of content may also occur. For example, a vehicle or a mobile vehicle passenger may be travelling from a first location to a second location while temporarily stopping close to an inductive loop configured as a near field coupled antenna. The mobile vehicle passenger may begin downloading content such as, for example, a video using a communications device having its own near field coupled antenna that is coupled to the inductive loop that is configured as a near field coupled antenna. The vehicle may continue its journey resulting in the mobile vehicle passenger's communications device being decoupled from the inductive loop. The vehicle may then establish communications with another inductive loop configured as a near field antenna allowing completion of the content delivery.

When the content delivery is complete, GPS enabled mobile device 212 transmits a transaction or content delivery complete signal to the content provider, e.g., a server in the cloud 40 or the content provider transmits a transaction or content delivery complete signal to GPS enabled mobile device 212 (identified by box 410).

When the mobile vehicle passenger decides to exit the vehicle (identified by box 412), the vehicle stops to allow the mobile vehicle passenger to exit the vehicle 108 (identified by box 280 of FIG. 22) so that the GPS enabled mobile device 212 re-inters P2I sub-system 35 (identified by return to box 264 of FIG. 22).

Figure 25:
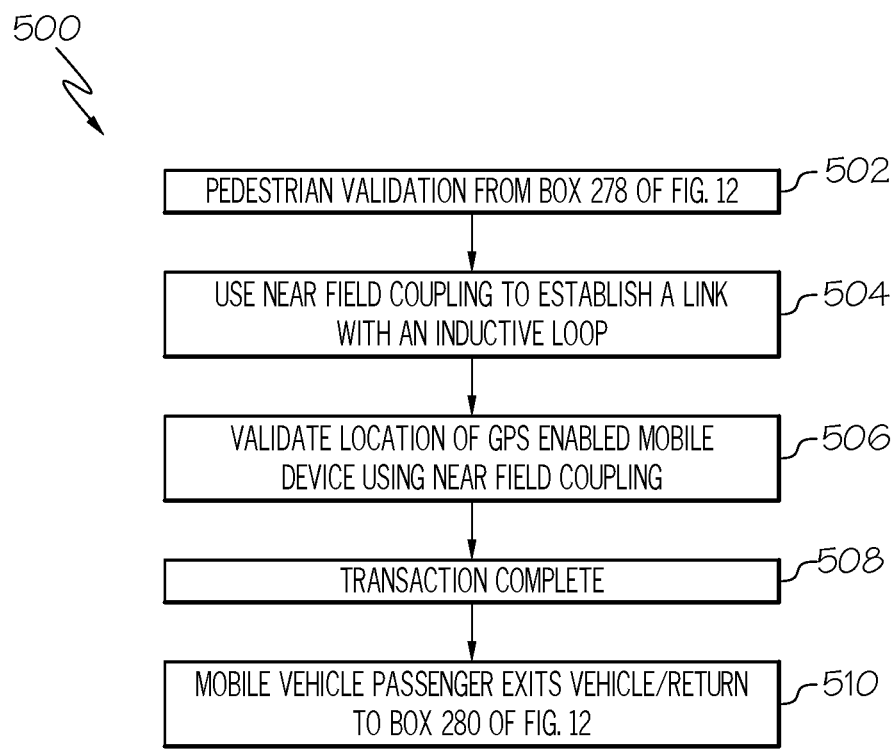
FIG. 25 is a flow diagram of a location validation method in accordance with an embodiment of the present invention.

FIG. 25 is a flow diagram 500 of a method for operating a GPS enabled mobile device such as, for example, mobile devices 212 and 214 within P2I sub-system 35 in accordance with location validation embodiment of the present invention. A description of the location validation embodiment continues from box 278 of FIG. 22, wherein the location of a pedestrian within a vehicle such as, for example, pedestrian 202 in vehicle 108 of FIG. 18 has been validated (identified by box 502). Thus, the location validation process incorporates validation using end-point location validation and near field coupling as described with reference to FIG. 22 into a content delivery process.

After the location of pedestrian 102 within vehicle 108 has been validated and pedestrian 102 has been reclassified from a VRU to being a mobile vehicle passenger, vehicle 108 carrying pedestrian 102 travels along the intelligent transportation system. The GPS enabled mobile device 212 is programmed to include near field coupling as a secondary location validation mechanism. The mobile vehicle passenger within vehicle 108 may want to initiate a secure transaction at, for example, a drive-thru Automatic Teller Machine ("ATM") at a financial institution. The drive-thru lane at the ATM may include an inductive loop that is connected to a server of the financial institution via a data aggregator device 122. In response to vehicle 108 stopping over the inductive loop, GPS enabled mobile device 212 establishes a link with, for example, the inductive loop using near field coupling (identified by box 504).

GPS enabled mobile device 212 communicates either directly or indirectly with the server of the financial institution to validate that mobile device 212 is within vehicle 108 that is coupled to the server through the inductive loop (identified by box 506).

When the transaction is complete, GPS enabled mobile device 212 transmits a signal indicating that the transaction is complete and terminates the process or, alternatively, the financial institution transmits a signal indicating that the transaction is complete and terminates the process (identified by box 508).

When the mobile vehicle passenger decides to exit the vehicle (identified by box 510), the vehicle stops to allow the mobile vehicle passenger to exit the vehicle 108 (identified by box 280 of FIG. 22) so that the GPS enabled mobile device 212 re-inters P2I sub-system 35 (identified by return to box 264 of FIG. 22).

It should be noted that the vehicle may include a communications device having an NFC antenna, which may be used to facilitate a transaction rather than a hand held communications devices having an NFC antenna such that the vehicle acts as a pass thru. Thus, a person inside a vehicle with a handheld mobile communications device may not be able to directly couple with, for example, a gas station's transaction transceiver, however, the vehicle may be able to couple with the gas station's transaction transceiver. Accordingly, the person's handheld mobile communications device may couple to the gas station's transaction transceiver through the vehicles NFC antenna.

It should be further noted that the location validation techniques may be used with self driving or autonomous, wherein the self driving vehicle is configured with a device having a near field coupled antenna that can be used for automatically paying for items such as, for example, tolls, gas, vehicle maintenance, etc.

Figure 26:
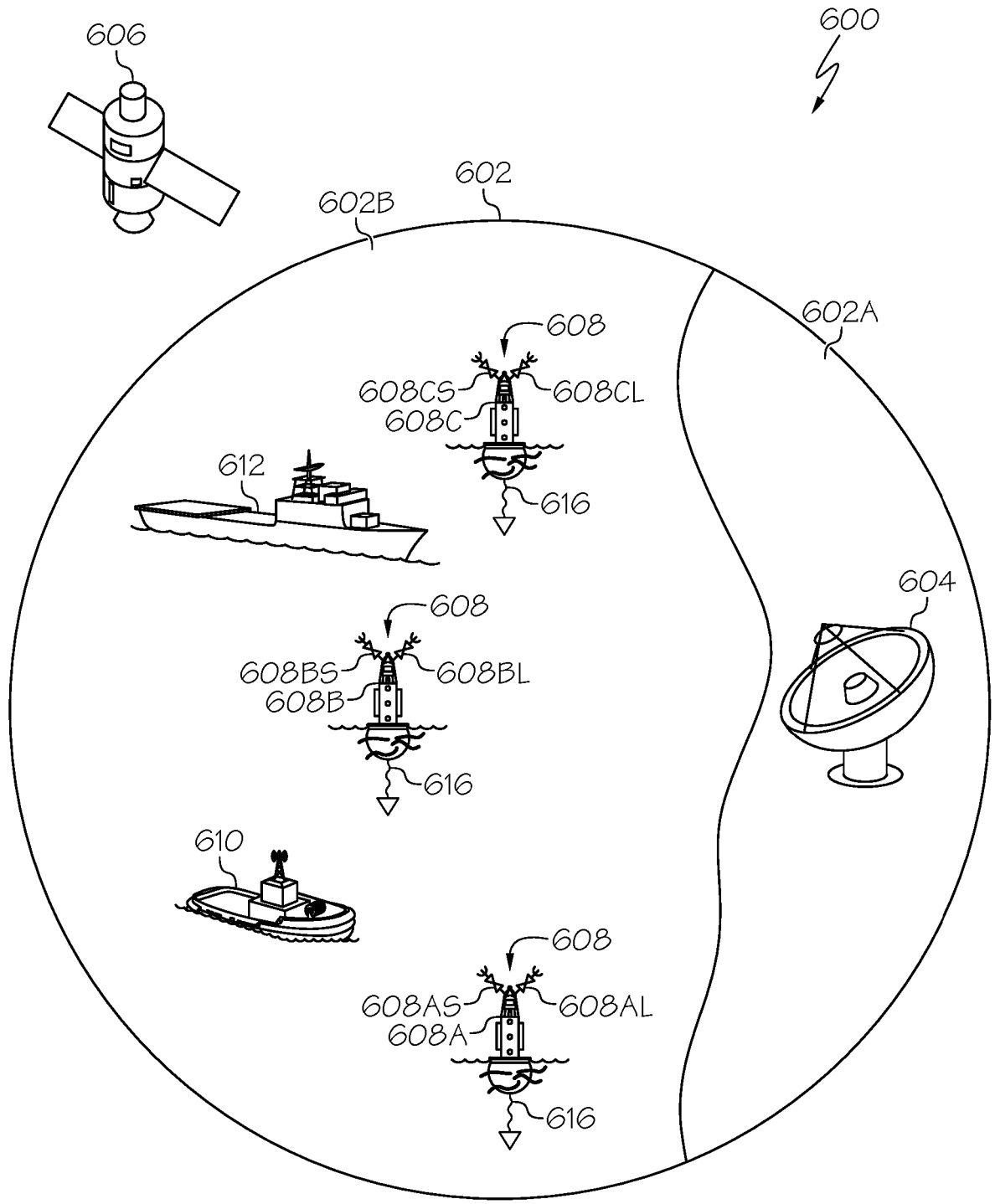
FIG. 26 is a diagram of a traffic control system in accordance with another embodiment of the present invention.

FIG. 26 is an illustration of a maritime traffic monitoring system 600 in accordance with an embodiment of the present invention. What is shown in FIG. 26 is a representation of a planet 602 such as, for example, earth, having a landmass 602A and a body of water 602B. A ground station 604 is positioned on landmass 602A, wherein the location or position, e.g., the coordinates, of ground station 604 is known. Maritime traffic monitoring system 600 includes an information hub 606 configured for communicating with ground station 604 and one or more location indicator devices 608. In accordance with an embodiment, maritime traffic monitoring system 600 is a satellite-based radionavigation system such as, for example, a Global Positioning System ("GPS") comprising a plurality of satellites and at least one GPS receiver. In accordance with the embodiment in which maritime traffic monitoring system 600 is a GPS, information hub 606 is a satellite and ground station 604 is a GPS receiver. It should be appreciated that typically GPS uses at least four satellites to compute four unknown quantities, e.g., for determining three position coordinates and a clock deviation from the satellite time. For the sake of clarity, a single satellite 606 is shown.

FIG. 26 illustrates three location indicator devices identified by reference characters 608A, 608B, and 608C, where an alphabetic character has been appended to numeric character 608 to distinguish the different location indicator devices. In the example shown in FIG. 26, remote location indicator devices 608A, 608B, and 608C are moored buoys that are connected to the ocean floor or ocean bottom by tethers 616. Exemplary tethers include chains, nylon, buoyant polypropylene, or the like. It should be understood that the number of remote location indicator devices and the types of remote location indicator devices are not limitations of the present invention. Accordingly, there may be fewer than three or more than three remote location indicator devices 608. Alternatively, remote location indicator devices 608 may include drifting buoys, light houses, coastal ground stations, surface watercraft, sub-surface watercraft, marine vessels, vehicles within range along coastal areas, combinations thereof, or the like. Remote location indicator device 608A has a short range receiving/long range transmitting antenna 608AS and a long range receiving and transmitting antenna 608AL; remote location indicator device 608B has a short range receiving/long range transmitting antenna 608BS and a long range receiving and transmitting antenna 608BL; and remote location indicator device 608C has a short range receiving/long range transmitting antenna 608CS and a long range receiving and transmitting antenna 608CL. Accordingly, short range receiving/transmitting antennas 608AS, 608BS, and 608CS are configured to receive signals from a signal source and transmit signals to a receiver, e.g., receive signals from and transmit a signals to a boat that is within range of antennas 608AS, 608BS, and 608CS of buoys 608A, 608B, and 608C, respectively. Long range receiving/transmitting antennas 608AL, 608BL, and 608CL are configured to receive signals from a signal source and transmit signals to a receiver, e.g., receive signals from a boat in response to the boat being within range of antennas 608AL, 608BL, and 608CL of buoys 608A, 608B, and 608C, respectively. It should be noted that antennas 608AL, 608BL, and 608CL have longer ranges than antennas 608AS, 608BS, and 608CS, respectively. By way of example, the range of antennas 608AS, 608BS, and 608CS is up to approximately 2,000 meters and the range of antennas 608AL, 608BL, and 608CL is 20,000 meters or more. It should be noted that antennas 608AS, 608BS, and 608CS can be configured to have the same receiving range as each other or have different receiving ranges from each other. Antennas 608AL, 608BL, and 608CL can be configured to have the same transmitting range as each other or have different transmitting ranges from each other. The receiving range of an antenna is the distance a signal can travel from a signal source to the antenna and accurately convey the information carried by the signal and the transmitting range of an antenna is the distance a signal can travel from the antenna to a receiver and accurately convey the information carried by the signal.

In accordance with the embodiment shown in FIG. 26, ground station 604 is configured to determine and validate spatial location in response to data from information hub 606. By way of example, information hub 606 is a satellite. It should be noted that the type of satellite is not a limitation. The satellite can be a geosynchronous satellite, a geostationary satellite, a communications satellite, a remote sensing satellite, a navigation satellite, a geocentric satellite, a global positioning satellite, a drone satellite, a ground satellite, a polar satellite, a Low Earth Orbit Satellite, ("LEOS"), Mid-Earth Orbit Satellite ("MEOS"), a High Earth Orbit Satellite ("HEOS"), a nanosatellite, or the like. By way of example, information hub 606 is a geostationary satellite. It should be noted that information hub 606 is not limited to being an object in an orbit. Other examples of information hub 606 include an aircraft, a drone, surface watercraft, sub-surface watercraft, a land vehicle, or the like.

FIG. 26 further includes vessels 610 and 612 that are traveling over body of water 602B. Vessels 610 and 612 may be referred to as vehicles. By way of example vessel 610 is a tugboat and vessel 612 is a cargo ship. In operation, ground station 604 and satellite 606 communicate location information with each other. For example, ground station 604 transmits its location or coordinates to satellite 606 and satellite 606 transmits its location or coordinates to ground station 604. Moored buoys 608A, 608B, and 608C transmit their locations or coordinates to satellite 606, which satellite 606 transmits the locations or coordinates of buoys 608A, 608B, and 608C to ground station 604. Ground station 604 serves as a fixed reference point. Buoys 608A, 608B, and 608C receive and transmit signals to satellite 606 through their long range antennas 608AL, 608BL, and 608C1, respectively. Ground station 604 determines the location, position, or coordinates of moored buoys 608A, 608B, and 608C relative to itself.

In accordance with an embodiment, tugboat 610 uses moored buoys 608A and 608B to validate its location by taking a bearing to moored buoy 608A via antenna 608AS, a bearing to buoy 608B via antenna 608BS, and transmitting the bearings to satellite 606 via antennas 608AL and 608BL. Alternatively, cargo ship 612 transmits its coordinate to buoy 608A and 608B, which buoys 608A and 608B transmit the coordinates to satellite 606 via antennas 608AL and 608BL. The bearing can be determined using a phased array antenna or a Multiple-input and Multiple output (MIMO) type antenna. Satellite 606 transmits to ground station 604 the bearing or coordinate from tugboat 610 to buoy 608A. Thus, tugboat 610, which is a type of vehicle or vessel, takes a position fix of itself relative to an object, i.e., moored buoy 608A. Ground station 604 calculates the location of tugboat 610 relative to its location using the bearing or coordinate from tugboat 610 to moored buoy 608A, i.e., ground station 604 establishes a first position of tugboat 610 relative to itself, wherein ground station 604 serves as a reference object. In addition, satellite 606 transmits to ground station 604 the bearing or coordinate from tugboat 610 to buoy 608B. Thus, tugboat 610 takes a position fix of itself relative to moored buoy 608B, which moored buoy 608B serves as another object, i.e., ground station 604 establishes a second position of tugboat 610 to moored buoy 608B. Ground station 604 calculates the location of tugboat 610 relative to its location using the bearing or coordinate from tugboat 610 to buoy 608B. If the location determined using the two bearings indicate that tugboat 610 is in the same location or position within an acceptable margin of error, ground station 604 transmits the location or position of tugboat 610 to satellite 606, which re-transmits the location information to tugboat 610. By way of example, the acceptable margin of error of the locations or positions determined using the bearings is within five percent of each other. Thus, ground station 604 compares the location determined using the bearing or coordinate to buoy 608A with the location determined using the location to buoy 608B to generate a comparison result. Ground station 604 uses the comparison result to confirm or verify the location of tugboat 610. If the comparison result confirms the location or position of tugboat 610, ground station 604 sends the location or position and, optionally a validation signal to satellite 606. Satellite 606 re-transmits the location or position and the location validation signal to tugboat 610. Thus, the position fixes are used to verify the location of tugboat 610.

Cargo ship 612 uses moored buoys 608B and 608C to validate its location by taking a bearing to buoy 608B via antenna 608BS, a bearing to buoy 608C via antenna 608CS, and transmitting the bearings to satellite 606 via antennas 608AL and 608BL. Alternatively, cargo ship 612 transmits its coordinate to buoy 608B and 608C. Satellite 606 transmits the bearing or coordinate to ground station 604, which calculates the location of cargo ship 612 relative to ground station 604 using the bearing or coordinate from cargo ship 612 to moored buoy 608B. In addition, satellite 606 transmits the location of cargo ship 612 relative to ground station 604 using the signal strength of the bearing or coordinate from cargo ship 612 to moored buoy 608C. If the location determined using the two bearings or coordinates indicates cargo ship 612 is in the same location within an acceptable margin of error, e.g., five percent, ground station 604 trans-mits the location to satellite 606, which satellite 606 re-transmits the location to cargo ship 612. Thus, ground station 604 compares the location determined using the received signal strength of the bearing or coordinate from cargo ship 612 to buoy 608C with the received signal strength of the location determined using the bearing or coordinate from cargo ship 612 to buoy 608B to generate a comparison result. Ground station 604 uses the signal strength comparison result to confirm or verify the location of cargo ship 612. If the comparison result confirms the location or position of cargo ship 612, ground station 604 sends the location or position and, optionally, a validation signal to satellite 606. Satellite 606 transmits the location or position and the location validation signal to cargo ship 612. Thus, the position fixes are used to verify the location of cargo ship 612.

It should be noted that the validated location can also be transmitted to other locations or entities. In addition, the mismatch or the inability to validate the location of a vessel can be used to trigger an alarm that may be sent to other locations or entities to provide notice that there is some type of anomaly at a particular location so that the locations or entities can be aware of a potential danger.

Figure 27:
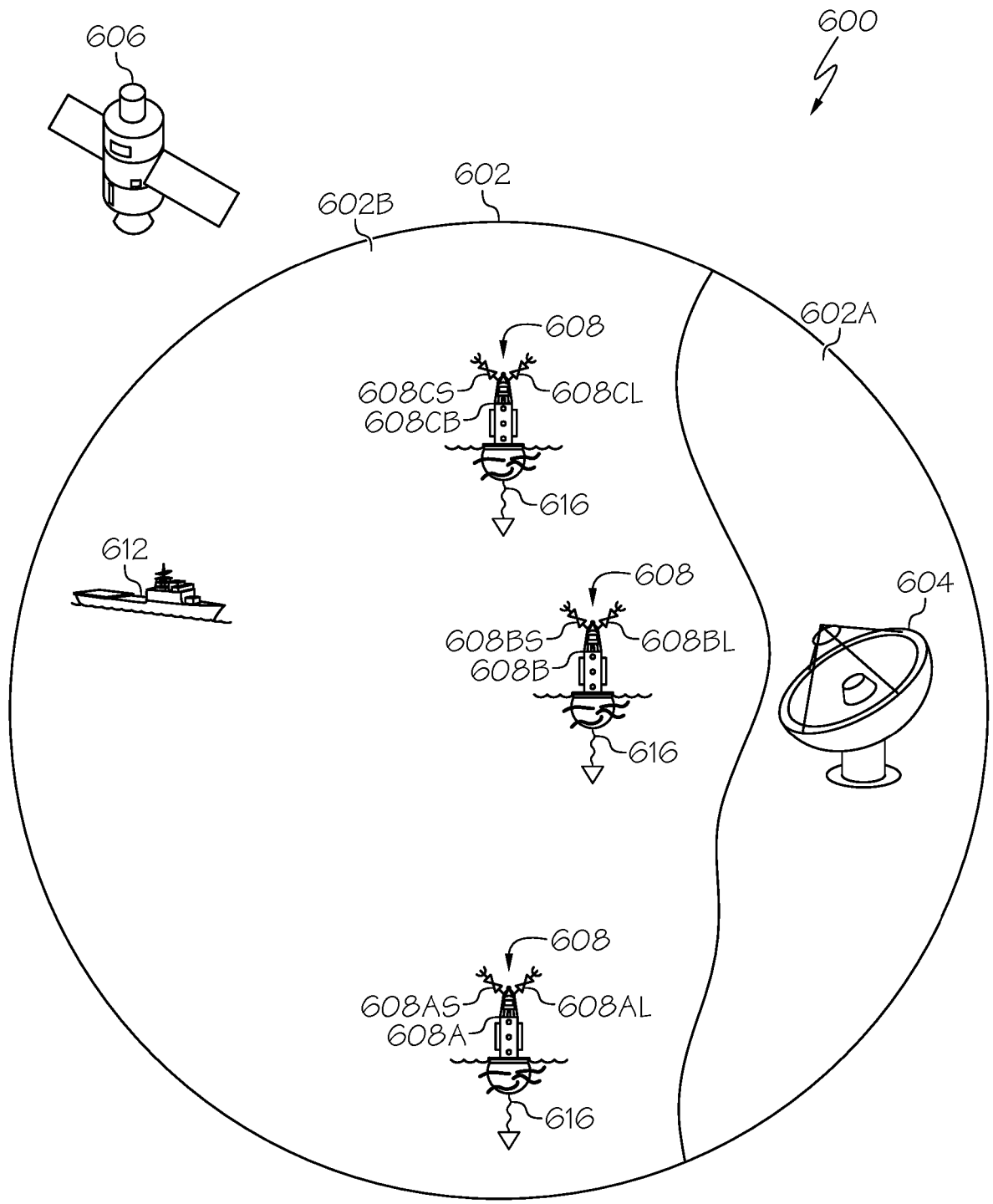
FIG. 27 is a diagram of a traffic control system in accordance with another embodiment of the present invention.

FIG. 27 is a view of maritime traffic monitoring system 600 in accordance with another embodiment of the present invention. In accordance with this embodiment, maritime traffic monitoring system 600 is configured in an alternative method of use of system 600. Cargo ship 612 uses one or more of moored buoys 608A, 608B, and 608C to validate its location. In an example in which maritime traffic monitoring system 600 uses a single buoy, 608C, for location validation, cargo ship 612 transmits an electromagnetic wave that may be, for example, a radio wave to continuously take a bearing to buoy 608C via antenna 608CL. Alternatively, cargo ship 612 continuously transmits its coordinate to buoy 608C. The bearing or coordinate is received by antenna 608CL and transmitted to satellite 606 via antenna 608CL. Satellite 606 transmits the bearing or coordinate to ground station 604.

It should be noted that antenna 608CL is configured to receive electromagnetic waves that are transmitted from a greater distance than antenna 608CS is configured to receive. Thus, antenna 608CL is capable of receiving the electromagnetic waves or signals from cargo ship 612 when it is further away from buoy 608C than antenna 608CS is capable of receiving. As cargo ship 612 gets into range of antenna 608CS of buoy 608C, antennas 608CL and 608CS receive signals from cargo ship 612. The signals transmitted from cargo ship 612 to antennas 608CL and 608CS serve as a broadcast location for cargo ship 612. Antennas 608CL and 608CS transmit the broadcast signals to, for example, satellite 606, which re-transmits the broadcast signals to ground station 604. In response to receiving the broadcast signals, ground station 604 compares the signal from antenna 608CL with the signal from antenna 608CS. The comparison result indicates whether both antennas 608CL and 608CS are transmitting signals in response to a broadcast signal from cargo ship 612 or whether a single antenna 608CL is transmitting a signal in response to the broadcast signal from cargo ship 612. Receipt of signals from both transmitters 608CS and 608CL indicates that cargo ship 612 is near buoy 608C. In response to receiving signal from both antennas 608CS and 608CL, ground station 604 transmits a location validation signal to cargo ship 612 via satellite 206, thereby confirming the location of cargo ship 612.

Figure 28:
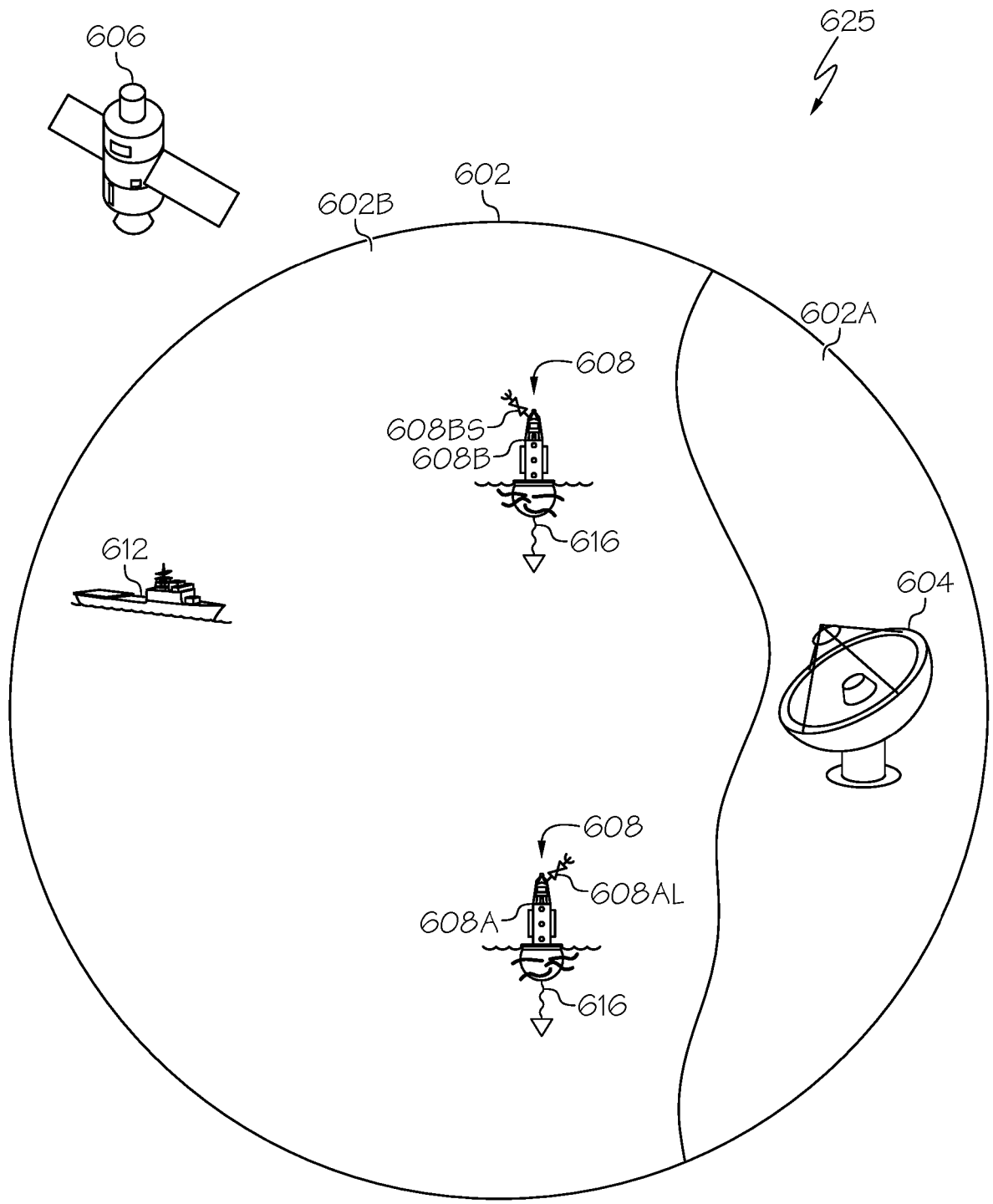
FIG. 28 is a diagram of a traffic control system in accordance with another embodiment of the present invention.

FIG. 28 is a view of maritime traffic monitoring system 625 in accordance with another embodiment of the present invention. Maritime traffic monitoring system 625 is similar to maritime traffic monitoring system 600, except that buoy 608A has a single long range receiving/long range transmitting antenna 608AL and buoy 608B has a single short range receiving/long range transmitting antenna 608BS. Long range receiving/long range transmitting antenna 608AL is configured for receiving electromagnetic radiation that originates from a point that is further away from buoys 608A and 608B than short range receiving/long range transmitting antenna 608BS is configured to receive. Long range receiving/long range transmitting antennas 608AL and 608BS are configured to be able to send signals to satellite 606 and to cargo ship 612. Buoys 608A and 608B are placed close enough together so that the position or location of cargo ship 612 can be verified with a long range receiving/long range transmitting antenna 608AL mounted to buoy 608A and a short range receiving/long range transmitting antenna 608BS mounted to buoy 608B.

In operation, cargo ship 612 transmits an electromagnetic wave that may be, for example, a radio wave that contains the bearing of cargo ship 612 to long range receiving/long range transmitting antenna 608AL. Alternatively, cargo ship 612 transmits its coordinate to long range receiving/short range transmitting antenna 608AL. It should be appreciated that long range receiving/long range transmitting antenna 608AL is configured to receive electromagnetic waves that are transmitted from a greater distance than short range receiving/long range transmitting antenna 608BS is configured to receive. Thus, antenna 608AL is capable of receiving the electromagnetic wave from cargo ship 612 that is further away from buoys 608A and 608B than can short range receiving/transmitting antenna 608B. Accordingly, cargo ship 612 takes a bearing to buoys 608AL and transmits the bearing to buoy 608A via long range receiving/long range transmitting antenna 608AL. Alternatively, cargo ship 612 transmits its coordinate to long range receiving/long range transmitting antenna 608AL. As cargo ship 612 gets into range of long range receiving/long range transmitting antenna 608AL of buoy 608A, long range receiving/long range transmitting antenna 608AL receives the signal containing the bearing or the signal containing the coordinate of cargo ship 612. It should be appreciated that short range receiving/long range transmitting antenna 608BS does not receive the signal because the electromagnetic wave or signal from cargo ship 612 is too attenuated to be recognized by short range receiving/long range transmitting antenna 608BS. The signal transmitted from cargo ship 612 to long range receiving/long range transmitting antenna 608AL and short range receiving/long range transmitting antenna 608BS serve as a broadcast location for cargo ship 612. As cargo ship 612 gets into range of short range receiving/long range transmitting antenna 608BS of buoy 608A, long range receiving/long range transmitting antenna 608AL and short range receiving/long range transmitting antenna 608BS receive signals from cargo ship 612. The signal transmitted from cargo ship 612 to antennas 608AL and 608BS serve as a broadcast location for cargo ship 612. Antennas 608AL and 608BS transmit signals to, for example, satellite 606, which re-transmits the signal to ground station 604. In response to receiving the broadcast signal, ground station 604 compares the signal from long range receiving/long range transmitting antenna 608AL with the signal from short range receiving/long range transmitting antenna 608BS. The comparison result indicates whether both antennas 608AL and 608BS are transmitting signals in response to a broadcast signal from cargo ship 612 or whether the single long range receiving/long range transmitting antenna 608AL is transmitting a signal in response to the broadcast signal from cargo ship 612. Receipt of signals from both transmitters 608AL and 608BS indicates that cargo ship is near buoy 608B. In response to receiving signal from both antennas 608AL and 608BS, ground station 604 transmits a location validation signal to cargo ship 612 via satellite 606, thereby confirming the location of cargo ship 612.

Figure 29:
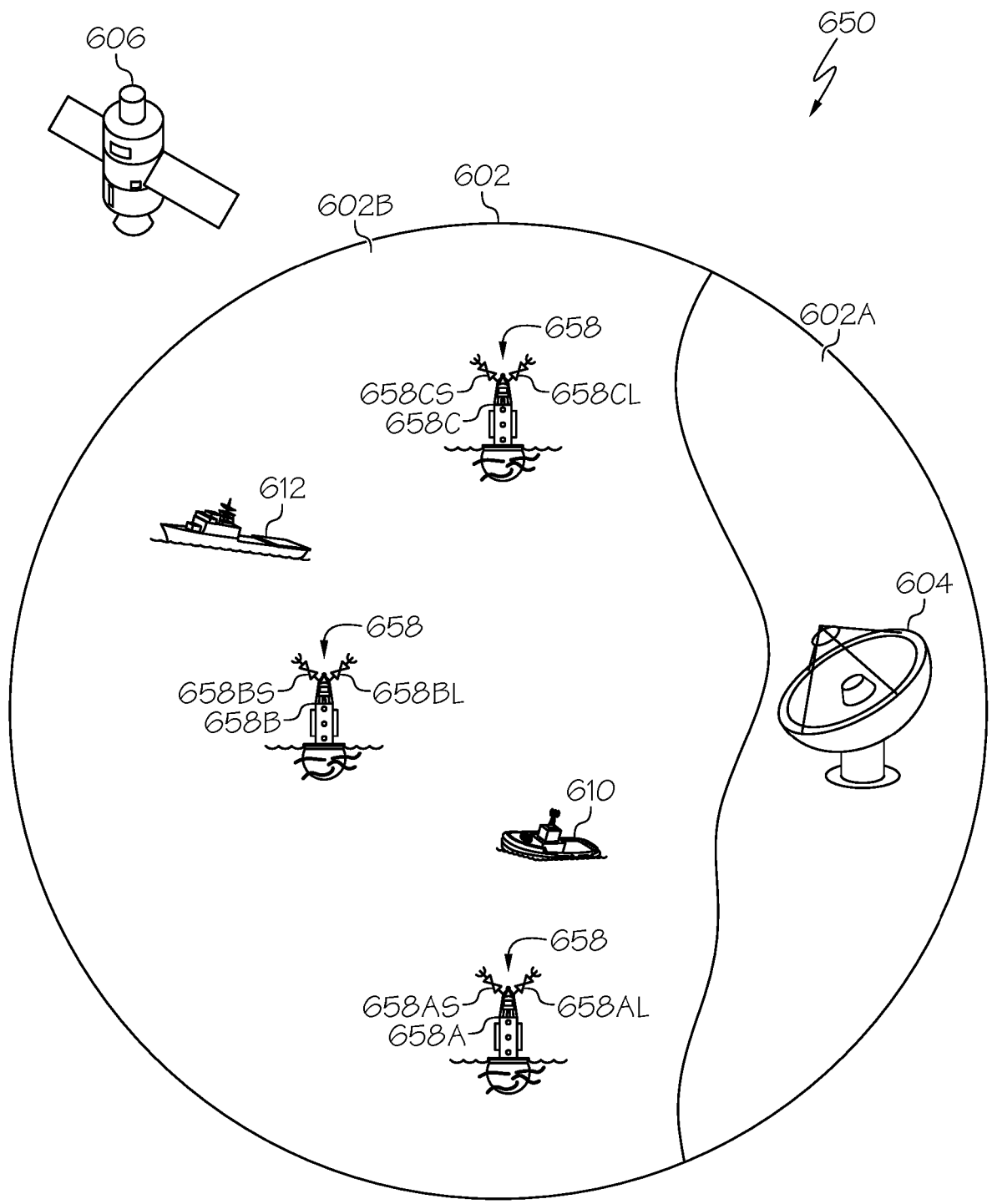
FIG. 29 is a diagram of a traffic control system in accordance with another embodiment of the present invention.

FIG. 29 is a view of a maritime traffic monitoring system 650 in accordance with another embodiment of the present invention. Traffic monitoring system 650 is similar to traffic monitoring system 600 except that the remote location indicator devices are drifting buoys 658. In the embodiment of FIG. 29, drifting buoys are identified by reference characters 658A, 658B, and 658C. It should be understood that the number of remote location indicator devices and the types of remote location indicator devices are not limitations of the present invention. Accordingly, there may be fewer than three or more than three remote location indicator devices 658.

In operation, ground station 604 and satellite 606 communicate location information with each other. For example, ground station 604 transmits its location or coordinates to satellite 606 and satellite 606 transmits its location or coordinates to ground station 604. Drifting buoys 658A, 658B, and 658C transmit their locations or coordinates to satellite 606, which transmits the locations or coordinates of buoys 658A, 658B, and 658C to ground station 604. Ground station 604 serves as a fixed reference point. Ground station 604 determines the location or coordinates of drifting buoys 658A, 658B, and 658C relative to itself.

Remote location indicator device 658A has a short range receiving/long range transmitting antenna 658AS and a long range receiving/long range transmitting antenna 658AL; remote location indicator device 658B has a short range receiving/long range transmitting antenna 658BS and a long range receiving/long range transmitting antenna 658BL; and remote location indicator device 658C has a short range receiving/long range transmitting antenna 658CS and a long range receiving/long range transmitting antenna 658CL. Accordingly, short range receiving/long range transmitting antenna 658AS is configured to receive and transmit a signal from a signal source, e.g., a boat, in response to the boat being close to buoy 658A, i.e., within a distance of approximately 2,000 meters. Long range receiving/long range transmitting antenna 658AL is configured to receive a signal from a signal source, e.g., a boat in response to the boat being further from buoy 658A, i.e., from a distance 20,000 meters or more from buoy 658A. Short range receiving/long range transmitting antenna 658BS is configured to receive and transmit a signal from a signal source, e.g., a boat, in response to the boat being close to buoy 658B, i.e., within a distance of approximately 2,000 meters. Long range receiving/transmitting antenna 658BL is configured to receive a signal from a signal source, e.g., a boat in response to the boat being further from buoy 658B, i.e., from a distance of 20,000 meters or more from buoy 658B. Short range receiving/long range transmitting antenna 658CS is configured to receive and transmit a signal from a signal source, e.g., a boat, in response to the boat being close to buoy 658C, i.e., within a distance of approximately 2,000 meters. Long range receiving/long range transmitting antenna 658CL is configured to receive a signal from a signal source, e.g., a boat in response to the boat being further from buoy 658C, i.e., from a distance of 20,000 meters or more from buoy 658C. It should be noted that the antennas of buoys 658A, 658B, and 658C can be configured to receive signals from the same distance or from different distances and transmit signals the same distance or different distances, i.e., the ranges of the antennas of buoys 658A, 658B, and 658C can be the same as each other or they can be different from each other.

Tugboat 610 uses drifting buoys 658A and 658B to validate its location by taking a bearing to moored buoy 658A, a bearing to buoy 658B, and transmitting the bearings to satellite 606. Alternatively, tugboat 610 can send its coordinate to buoys 658A and 658B, which buoys transmit the coordinate to satellite 606. Satellite 606 transmits to ground station 604 the bearing from tugboat 610 to buoy 658A or the coordinate of tugboat 610. Ground station 604 calculates the location of tugboat 610 relative to its location using the bearing from tugboat 610 to drifting buoy 658A or the coordinate of tugboat 610. In addition, satellite 606 transmits to ground station 604 the bearing from tugboat 610 to buoy 658B or the coordinate of tugboat 610. Ground station 604 calculates the location of tugboat 610 relative to its location using the bearing from tugboat 610 to drifting buoy 658B or from the coordinate of tugboat 610. If the location determined using the two bearings or the coordinate of tugboat 610 indicates that tugboat 610 is in the same location or position within an acceptable margin of error, e.g., five percent, ground station 604 transmits the location or position of tugboat 610 to satellite 606. Thus, ground station 604 compares the location determined using the bearing to buoy 658A or the coordinate of tugboat 610 with the location determined using the location to buoy 658B to generate a comparison result. Ground station 604 uses the comparison result to confirm or verify the location of tugboat 610. If the comparison result confirms the location or position of tugboat 610, ground station 604 transmits the location or position and, optionally a validation signal to satellite 606. Satellite 606 transmits the location or position and the location validation signal to tugboat 610.

Cargo ship 612 uses drifting buoys 658B and 658C to validate its location by taking a bearing to buoy 658B, a bearing to drifting buoy 658C, and transmitting the bearings to satellite 606. Alternatively, cargo ship 612 can send its coordinate to buoys 658B and 658C, which buoys transmit the coordinate to satellite 606. Satellite 606 transmits the bearing to ground station 604 or the coordinate of cargo ship 612, which calculates the location of cargo ship 612 relative to ground station 604 using the bearing from cargo ship 612 to drifting buoy 658B or the coordinate of cargo ship 612. In addition, satellite 606 transmits the location of cargo ship 612 relative to ground station 604 using the bearing from cargo ship 612 to drifting buoy 658C or the coordinate of cargo ship 612. If the location determined using the two bearings or the coordinate of cargo ship 612 indicate cargo ship 612 is in the same location within an acceptable margin of error, e.g., five percent, ground station 604 transmits the location to satellite 606. Thus, ground station 604 compares the location determined using the bearing from cargo ship 612 to buoy 658A with the location determined using the bearing from cargo ship 612 to buoy 658B to generate a comparison result. Alternatively, ground station 604 compares the location determined using the coordinate of cargo ship 612 to buoy 658A with the location determined using the coordinate to cargo ship 612 to generate a comparison result. Ground station 604 uses the comparison result to confirm or verify the location of cargo ship 612. If the comparison result confirms the location or position of cargo ship 612, ground station 604 transmits the location or position and, optionally, a validation signal to satellite 606. Satellite 606 transmits the location or position and the location validation signal to cargo ship 612.

It should be noted that the methods described with reference to FIGS. 27 and 28 can be used with the floating buoy configuration described with reference to FIG. 29.

Figure 30:
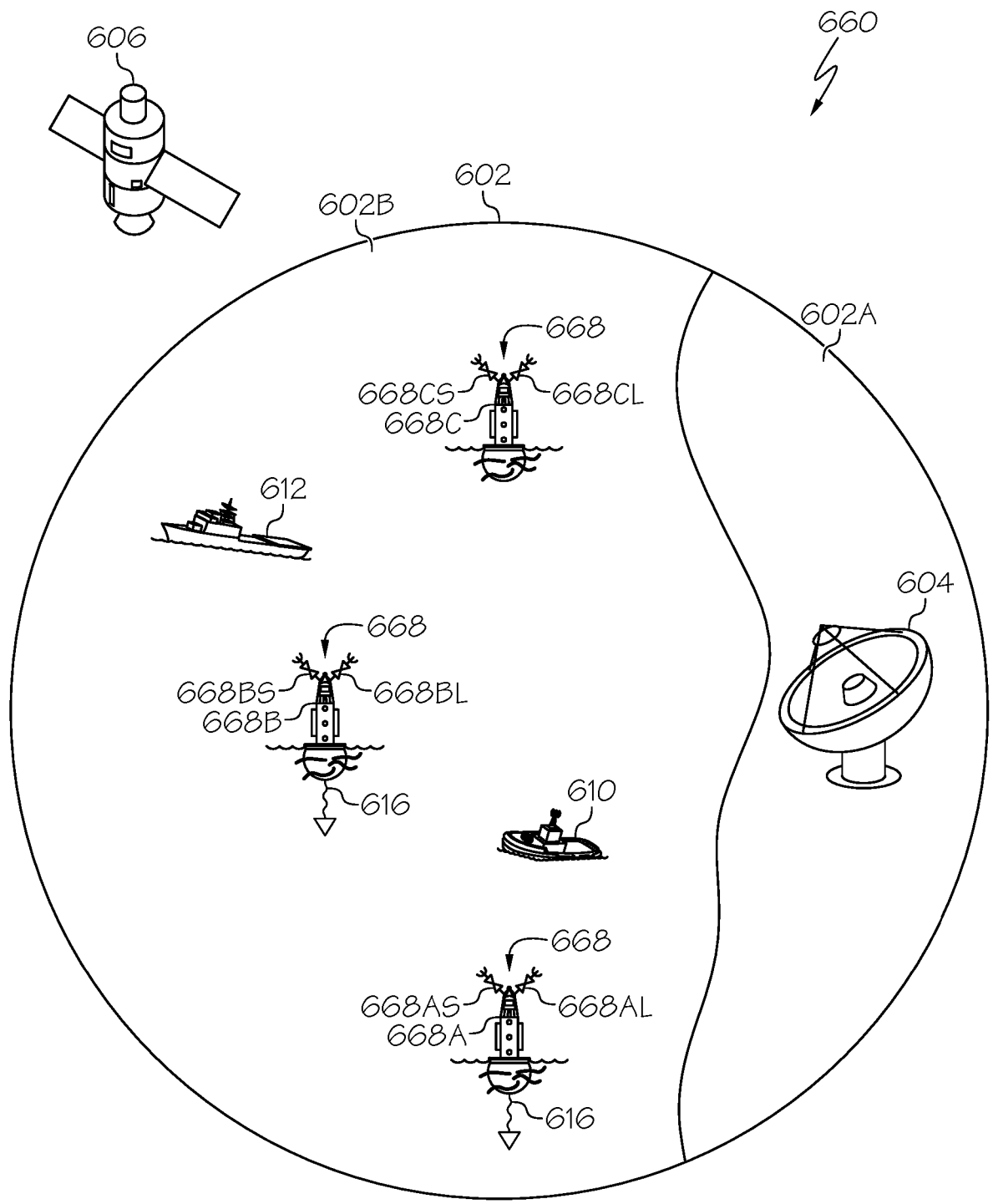
FIG. 30 is a diagram of a traffic control system in accordance with another embodiment of the present invention.

FIG. 30 is a view of a maritime traffic monitoring system 660 in accordance with another embodiment of the present invention. Traffic monitoring system 660 is similar to traffic monitoring system 600 except that the remote location indicator devices 668 are a combination of drifting buoys and moored buoys. In the embodiment of FIG. 30, the moored buoys are identified by reference characters 668A and 668B and the drifting buoy is identified by reference character 668C. It should be noted that unlike moored buoys 668A and 668B, drifting buoy 668C is not tethered to the ocean floor by a tether 616. As discussed above, the number of buoys and the types of buoys, i.e., moored, floating, etc. are not limitations of the present invention. Tugboat 610 uses moored buoy 668B and drifting buoy 668C to validate its location by taking a bearing to moored buoy 668B, a bearing to drifting buoy 668C, and transmitting the bearings to satellite 606. Alternatively, tugboat 610 also receives the signal strength of the transmission from buoys 668B and 668C, and buoys 668B and 668C transmit the coordinate from the vessel, i.e., tugboat 610. Satellite 606 transmits to ground station 604 the bearing from tugboat 610 to drifting buoy 668C or the coordinate from tugboat 610. Ground station 604 calculates the location of tugboat 610 relative to its location using the bearing from tugboat 610 to drifting buoy 668C or ground station 604 calculates the location of tugboat 610 relative to its location using the coordinate of tugboat 610. In addition, satellite 606 transmits to ground station 604 the bearing from tugboat 610 to moored buoy 668B or the coordinate of tugboat 610. Ground station 604 calculates the location of tugboat 610 relative to its location using the bearing from tugboat 610 to moored buoy 668B or ground station 604 calculates the location of tugboat 610 relative to its location using the coordinate of tugboat 610. If the location determined using the two bearings or the coordinates indicate that tugboat 610 is in the same location or position within an acceptable margin of error, e.g., five percent, ground station 604 transmits the location or position of tugboat 610 to satellite 606. Thus, ground station 604 compares the location determined using the bearing to buoy 668A or the coordinate of tugboat 610 with the location determined using the location to buoy 668B to generate a comparison result. Ground station 604 uses the comparison result to confirm or verify the location of tugboat 610. If the comparison result confirms the location or position of tugboat 610, ground station 604 transmits the location or position and, optionally, a validation signal to satellite 606. Satellite 606 transmits the location or position and the location validation signal to tugboat 610. Thus, ground station 604 uses comparative analytics to validate the location of tugboat 610.

Cargo ship 612 uses moored buoys 668A and 668B to validate its location as described with reference to FIG. 29 using two sets of bearing data or the coordinates of cargo ship 612 to validate the location or position of cargo ship 612. Thus, ground station 604 uses comparative analytics to validate the location of cargo 612.

Figure 31:
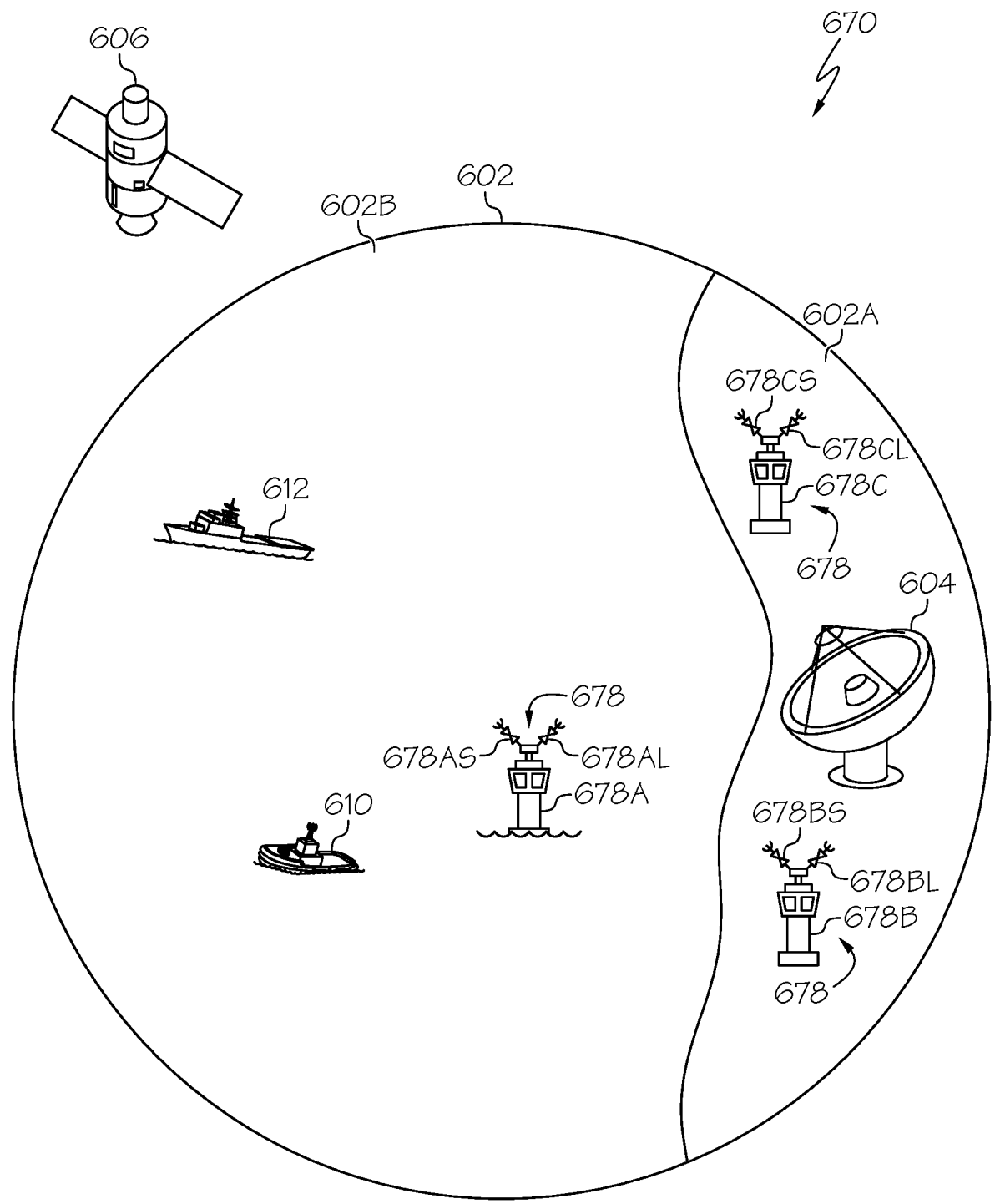
FIG. 31 is a diagram of a traffic control system in accordance with another embodiment of the present invention.

FIG. 31 is a view of a maritime traffic monitoring system 670 in accordance with another embodiment of the present invention. Traffic monitoring system 670 is similar to traffic monitoring system 600 except that the remote location indicator devices are light houses 678. In the embodiment of FIG. 31, individual light houses are identified by reference characters 678A, 678B, and 678C. Remote location indicator device 678A has a short range receiving/long range transmitting antenna 678AS and a long range receiving/long range transmitting antenna 678AL; remote location indicator device 678B has a short range receiving/long range transmitting antenna 678BS and a long range receiving/long range transmitting antenna 678BL; and remote location indicator device 678C has a short range receiving/long range transmitting antenna 678CS and a long range receiving/long range transmitting antenna 678CL. Accordingly, short range receiving/long range transmitting antenna 678AS is configured to receive and transmit a signal from a signal source, e.g., a boat, in response to the boat being close to buoy 678A, i.e., within a distance of approximately 2,000 meters. Long range receiving/long range transmitting antenna 678AL is configured to receive a signal from a signal source, e.g., a boat in response to the boat being further from buoy 678A, i.e., from a distance of 20,000 meters or more from buoy 678A. Short range receiving/long range transmitting antenna 678BS is configured to receive and transmit a signal from a signal source, e.g., a boat, in response to the boat being close to buoy 678B, i.e., within a distance of approximately 2,000 meters. Long range receiving/long range transmitting antenna 678BL is configured to receive a signal from a signal source, e.g., a boat in response to the boat being further from buoy 678B, i.e., from a distance of 20,000 meters or more from buoy 678B. Short range receiving/long range transmitting antenna 678CS is configured to receive and transmit a signal from a signal source, e.g., a boat, in response to the boat being close to buoy 678C, i.e., within a distance of approximately 2,000 meters. Long range receiving/long range transmitting antenna 678CL is configured to receive a signal from a signal source, e.g., a boat in response to the boat being further from buoy 678C, i.e., from a distance of 20,000 meters or more from buoy 678C. It should be noted that antennas 678A, 678B, and 678C can be configured to receive signals from the same distance or from different distances and transmit signals the same distance or different distances, i.e., the ranges of the antennas of buoys 678A, 678B, and 678C can be the same as each other or they can be different from each other.

In operation, ground station 604 and satellite 606 communicate location information with each other. For example, ground station 604 transmits its location or coordinates to satellite 606 and satellite 606 transmits its location or coordinates to ground station 604. Light houses 678A, 678B, and 678C transmit their locations to satellite 606, which transmits their locations to ground station 604, which serves as a fixed reference point. Ground station 604 determines the location or coordinates of light houses 678A, 678B, and 678C relative to ground station 604.

Tugboat 610 uses light houses 678A and 678B to validate its location by taking a bearing to light house 678A, a bearing to light house 678B, and transmitting the bearings to satellite 606. Alternatively, tugboat 610 can send its coordinate to buoys 678A and 678B, which buoys transmit the coordinate to satellite 606. Satellite 606 transmits to ground station 604 the bearing from tugboat 610 to light house 678A or the coordinate of tugboat 610 to light house 678A. Ground station 604 calculates the location of tugboat 610 relative to its location using the bearing from tugboat 610 to light house 678A. In addition, satellite 606 transmits to ground station 604 the bearing from tugboat 610 to light house 678B. Ground station 604 calculates the location of tugboat 610 relative to its location using the bearing from tugboat 610 to light house 678B. Alternatively, ground station 604 calculates the location of tugboat 610 relative to light house 678A using the coordinate of tugboat 610, where ground station 604 calculates the location of tugboat 610 relative to light house 678B using the coordinate of tugboat 610. If the location determined using the two bearings or the coordinates of tugboat 610 indicate that tugboat 610 is in the same location or position within an acceptable margin of error, e.g., five percent, ground station 604 transmits the location or position of tugboat 610 to satellite 606. Thus, ground station 604 compares the location determined using the bearing to light house 678A with the location determined using the location to light house 678B to generate a comparison result. Alternatively, ground station 604 generates a comparison result by comparing the calculation of the location of tugboat 610 relative to light house 678A and the location of tugboat 610 relative to light house 678B. Ground station 604 uses the comparison result to confirm or verify the location of tugboat 610. If the comparison result confirms the location or position of tugboat 610, ground station 604 transmits the location or position and, optionally, a validation signal to satellite 606. Satellite 606 transmits the location or position and the location validation signal to tugboat 610.

Cargo ship 612 uses light houses 678B and 678C to validate its location by taking a bearing to buoy 678B, a bearing to buoy 678C, and transmitting the bearings to satellite 606. Alternatively, cargo ship 612 can send its coordinate to buoys 678B and 678C, which buoys transmit the coordinate to satellite 606. Satellite 606 transmits the bearing or the coordinate to ground station 604, which calculates the location of cargo ship 612 relative to ground station 604 using the bearing from cargo ship 612 to light house 678B. In addition, satellite 606 transmits the location of cargo ship 612 relative to ground station 604 using the bearing from cargo ship 612 to light house 678C. Alternatively, ground station 604 generates a comparison result by comparing the calculation of the location of cargo ship 612 relative to light house 678B and the location of cargo ship 612 relative to light house 678C. If the location determined using the two bearings or the location using the coordinates indicates that cargo ship 612 is in the same location within an acceptable margin of error, e.g., five percent, ground station 604 transmits the location to satellite 606. Thus, ground station 604 compares the location determined using the bearing from cargo ship 612 to light house 678B with the location determined using the bearing from cargo ship 612 to light house 678C to generate a comparison result. Alternatively, ground station 604 compares the location determined using the coordinate of cargo ship 612 and the location of light house 678B with the location using the coordinate of light house 678C to generate the comparison result. Ground station 604 uses the comparison result to confirm or verify the location of cargo ship 612. If the comparison result confirms the location or position of cargo ship 612, ground station 604 sends the location or position and, optionally, a validation signal to satellite 606. Satellite 606 transmits the location or position and the location validation signal to cargo ship 612.

Figure 32:
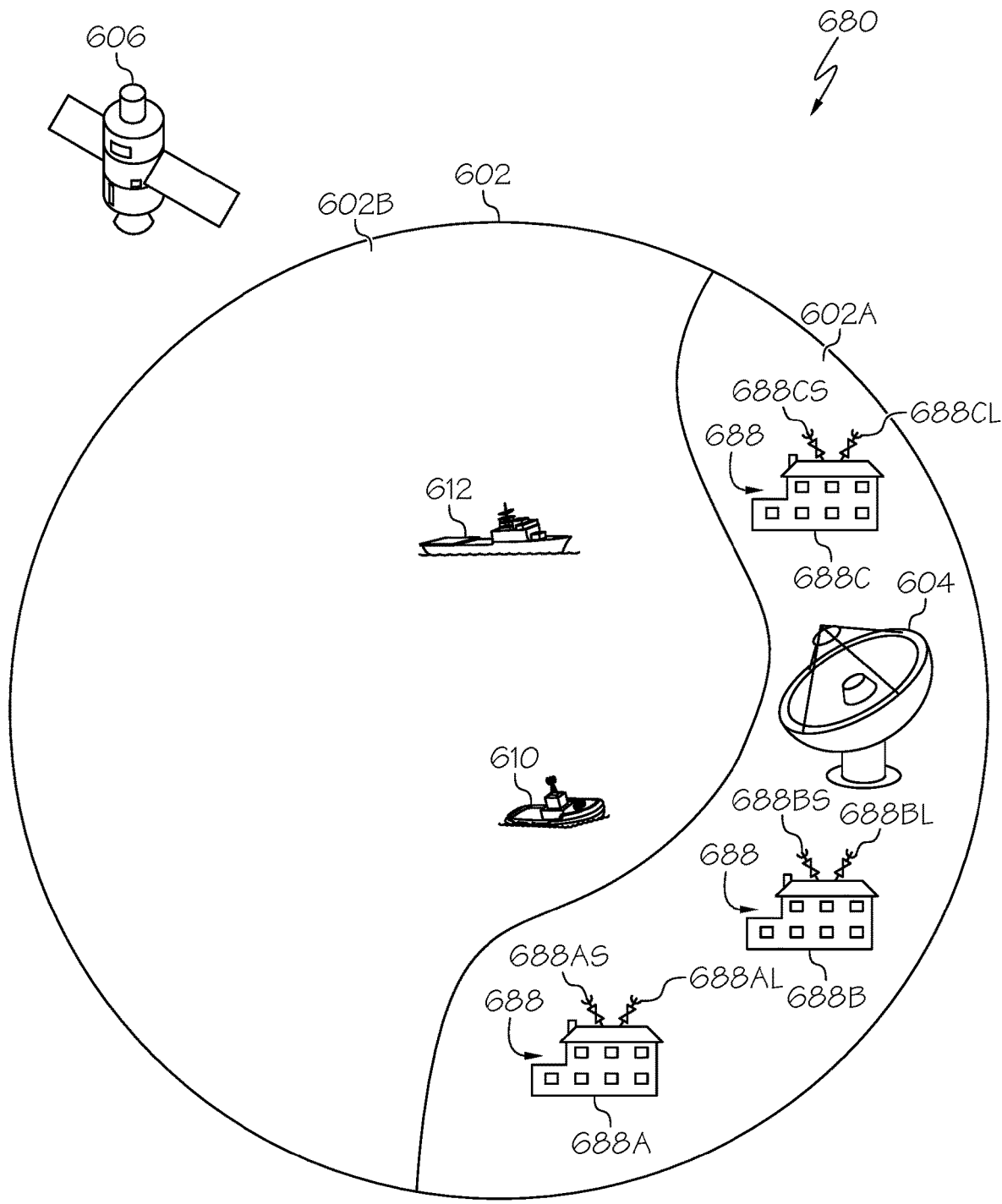
FIG. 32 is a diagram of a traffic control system in accordance with another embodiment of the present invention.

FIG. 32 is a view of a maritime traffic monitoring system 680 in accordance with another embodiment of the present invention. Maritime traffic monitoring system 680 is similar to traffic monitoring system 600 except that the remote location indicator devices are ground stations 688. In the embodiment of FIG. 32, the ground stations are identified by reference characters 688A, 688B, and 688C. Remote location indicator device 688A has a short range receiving/long range transmitting antenna 688AS and a long range receiving/long range transmitting antenna 688AL; remote location indicator device 688B has a short range receiving/long range transmitting antenna 688BS and a long range receiving/long range transmitting antenna 688BL; and remote location indicator device 688C has a short range receiving/long range transmitting antenna 688CS and a long range receiving/long range transmitting antenna 688CL. Accordingly, short range receiving/long range transmitting antenna 688AS is configured to receive and transmit a signal from a signal source, e.g., a boat, in response to the boat being close to ground station 688A, i.e., within a distance of approximately 2,000 meters. Long range receiving/long range transmitting antenna 688AL is configured to receive a signal from a signal source, e.g., a boat in response to the boat being further from light house 688A, i.e., from a distance of 20,000 meters or more from light house 688A. Short range receiving/long range transmitting antenna 688BS is configured to receive and transmit a signal from a signal source, e.g., a boat, in response to the boat being close to light house 688B, i.e., within a distance of approximately 2,000 meters. Long range receiving/long range transmitting antenna 688BL is configured to receive a signal from a signal source, e.g., a boat in response to the boat being further from light house 688B, i.e., from a distance up of 20,000 meters or more from light house 688B. Short range receiving/long range transmitting antenna 688CS is configured to receive and transmit a signal from a signal source, e.g., a boat, in response to the boat being close to light house 688C, i.e., within a distance of approximately 2,000 meters. Long range receiving/long range transmitting antenna 688CL is configured to receive a signal from a signal source, e.g., a boat in response to the boat being further from light house 688C, i.e., from a distance up of 20,000 meters or more from light house 688C. It should be noted that antennas 688AS, 688BS, and 688CS can be configured to have the same receiving range as each other or have different receiving ranges from each other. Antennas 688AL, 688BL, and 688CL can be configured to have the same transmitting range as each other or have different transmitting ranges from each other.

In operation, ground station 604 and satellite 606 communicate location information with each other. For example, ground station 604 transmits its location or coordinates to satellite 606 and satellite 606 transmits its location or coordinates to ground station 604. Ground stations 688A, 688B, and 688C transmit their locations or coordinates to satellite 606, which transmits the locations or coordinates of ground stations 688A, 688B, and 688C to ground station 604. Ground station 604 serves as a fixed reference point. Ground station 604 determines the location or coordinates of ground stations 688A, 688B, and 688C relative to itself.

Tugboat 610 uses ground stations 688A and 688B to validate its location by taking a bearing to ground station 688A, a bearing to ground station 688B, and transmitting the bearings to satellite 606. Satellite 606 transmits to ground station 604 the bearing from tugboat 610 to ground station 688A. Ground station 604 calculates the location of tugboat 610 relative to its location using the bearing from tugboat 610 to ground station 688A. In addition, satellite 606 transmits to ground station 604 the bearing from tugboat 610 to ground station 688B. Ground station 604 calculates the location of tugboat 610 relative to its location using the bearing from tugboat 610 to ground station 688B. If the location determined using the two bearings indicate that tugboat 610 is in the same location or position within an acceptable margin of error, e.g., five percent, ground station 604 transmits the location or position of tugboat 610 to satellite 606. Thus, ground station 604 compares the location determined using the bearing to ground station 688A with the location determined using the location to ground station 688B to generate a comparison result. Ground station 604 uses the comparison result to confirm or verify the location of tugboat 610. If the comparison result confirms the location or position of tugboat 610, ground station 604 transmits the location or position and, optionally, a validation signal to satellite 606. Satellite 606 transmits the location or position and the location validation signal to tugboat 610.

Cargo ship 612 uses ground stations 688B and 688C to validate its location by taking a bearing to ground station 688B, a bearing to ground station 688C, and transmitting the bearings to satellite 606. Satellite 606 transmits the bearings to ground station 604, which calculates the location of cargo ship 612 relative to ground station 604 using the bearing from cargo ship 612 to ground station 688B. In addition, satellite 606 transmits the location of cargo ship 612 relative to ground station 604 using the bearing from cargo ship 612 to ground station 688C. If the location determined using the two bearings indicate cargo ship 612 is the same location within an acceptable margin of error, e.g., five percent, ground station 604 transmits the location to satellite 606. Thus, ground station 604 compares the location determined using the bearing from cargo ship 612 to ground station 688A with the location determined using the bearing from cargo ship 612 to ground station 688B to generate a comparison result. Ground station 604 uses the comparison result to confirm or verify the location of cargo ship 612. If the comparison result confirms the location or position of cargo ship 612, ground station 604 transmits the location or position and, optionally, a validation signal to satellite 606. Satellite 606 transmits the location or position and the location validation signal to cargo ship 612.

Figure 33:
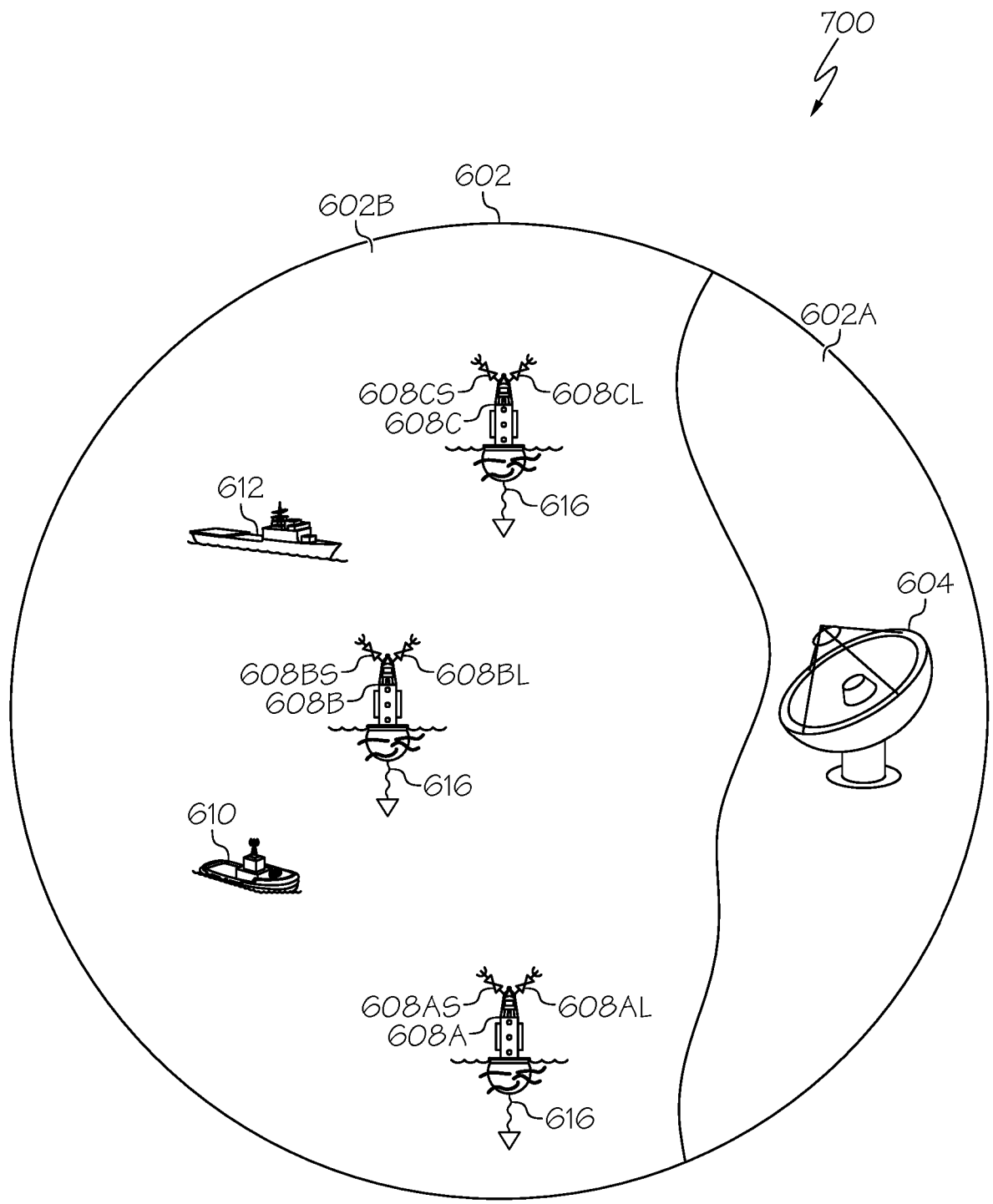
FIG. 33 is a diagram of a traffic control system in accordance with another embodiment of the present invention.

FIG. 33 is a view of a maritime traffic monitoring system 700 in accordance with another embodiment of the present invention. Maritime traffic monitoring system 700 is similar to traffic monitoring system 600 except that information hub 606 is absent from maritime traffic monitoring system 700 and location indicator devices 608A, 608B, and 608C communicate directly with ground station 604. In accordance with the embodiment shown in FIG. 33, ground station 604 is configured to determine spatial location in response to data buoys 608A, 608B, and 608C.

FIG. 33 further includes vessels 610 and 612 that are traveling over body of water 602B. Vessels 610 and 612 may be referred to as marine vessels or vehicles. By way of example vessel 610 is a tugboat and vessel 612 is a cargo ship. In operation, ground station 604 transmits its location or coordinates to buoys 608A, 608B, and 608C, and buoys 608A, 608B, and 608C transmit their locations or coordinates to ground station 604. Ground station 604 serves as a fixed reference point. Buoys 608A, 608B, and 608C receive and transmit signals to ground station 604 through their long range antennas 608AL, 608BL, and 608CL, respectively. Ground station 604 determines the location, position, or coordinates of moored buoys 608A, 608B, and 608C relative to itself.

In accordance with an embodiment, tugboat 610 uses moored buoys 608A and 608B to validate its location by taking a bearing to moored buoy 608A via antenna 608AS, a bearing to moored buoy 608B via antenna 608BS, and transmitting the bearings to moored buoys 608A and 608B. Tugboat 610 also transmits its coordinate to buoys 608A and 608B. Buoys 608A and 608B transmit the bearings and the coordinate of tugboat 610 to ground station 604 via antennas 608AL and 608BL. Thus, tugboat 610, which is a type of vehicle or vessel, takes a position fix of itself relative to an object, i.e., moored buoy 608A. Ground station 604 calculates the location of tugboat 610 relative to its location using the its coordinate and the bearing from tugboat 610 to moored buoy 608A, i.e., ground station 604 establishes a first position of tugboat 610 relative to itself, wherein ground station 604 serves as a reference object. In addition, ground station 604 calculates the location of tugboat 610 relative to its location using the its coordinate and the bearing from tugboat 610 to moored buoy 608B, i.e., ground station 604 establishes a second position of tugboat 610 relative to itself, wherein ground station 604 serves as another reference object. Ground station 604 calculates the location of tugboat 610 relative to its location using the bearing from tugboat 610 to buoy 608B. If the location determined using the two bearings indicate that tugboat 610 is in the same location or position within an acceptable margin of error, ground station 604 transmits the location or position of tugboat 610 to tugboat 610. By way of example, the acceptable margin of error of the locations or positions determined using the bearings is within five percent of each other. Thus, ground station 604 compares the location determined using the bearing to buoy 608A with the location determined using the location to buoy 608B to generate a comparison result. Ground station 604 uses the comparison result to confirm or verify the location of tugboat 610. If the comparison result confirms the location or position of tugboat 610, ground station 604 sends the location or position and, optionally, a validation signal to tugboat 610. Thus, the position fixes are used to verify the location of tugboat 610.

Cargo ship 612 uses moored buoys 608B and 608C to validate its location by taking a bearing to buoy 608B via antenna 608BS, a bearing to buoy 608C via antenna 608CS, and transmitting the bearings to ground station 604, which calculates the location of cargo ship 612 relative to ground station 604 using the bearing from cargo ship 612 to moored buoy 608B. In addition, moored buoy 608C transmits the location of cargo ship 612 relative to ground station 604 using the bearing from cargo ship 612 to moored buoy 608C. If the location determined using the two bearings indicates cargo ship 612 is in the same location within an acceptable margin of error, e.g., five percent, ground station 604 transmits the location to satellite 606, which re-transmits the location to cargo ship 612. Thus, ground station 604 compares the location determined using the bearing from cargo ship 612 to buoy 608C with the location determined using the bearing from cargo ship 612 to buoy 608B to generate a comparison result. Ground station 604 uses the comparison result to confirm or verify the location of cargo ship 612. If the comparison result confirms the location or position of cargo ship 612, ground station 604 sends the location or position and, optionally, a validation signal to cargo ship 612. Thus, the position fixes are used to verify the location of cargo ship 612.

By now it should be appreciated that a method and structure have been provided to securely deliver digital certificates to a vehicle in conjunction with location validation of the entity to which a certificate is being delivered. In accordance with embodiments, a near field antenna or an inductive loop communicate with a traffic control system to deliver the digital certificates. To increase security, the communication can be encrypted using quantum encryption techniques, blockchain techniques, a combination of quantum encryption techniques and blockchain techniques, or the like. The method and structure include using multi-way authentication techniques to ensure the vehicle is correctly located, positioned, and identified. The multi-way authentication techniques can include location validation, facial recognition, gesture recognition, signal recognition, use of comparative analytics for a cell phone associated with the vehicle or other elements associated with the vehicle, etc.

It should be further understood that the techniques for providing digital certificates applies to fixed or mobile applications, to maritime applications, aviation applications, vehicular traffic applications, space traffic application, or the like.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A location validation system, comprising:
a vehicle detection device, wherein the vehicle detection devices is positioned at a desired corner of an intersection of a roadway, the vehicle detection devices monitoring the desired corner and transmits data to the traffic control unit on a current occupancy status at the desired corner being monitored by the vehicle detection device;
a vehicle location indicator device, wherein the vehicle location indicator devices monitors the desired corner and transmits data to the traffic control unit of a current occupancy status at the desired corner being monitored by the vehicle location indicator device; and
a data aggregator located in the traffic control unit, the data aggregator receiving and comparing the data from the vehicle detection device and the data from the vehicle location indicator device, the data aggregator generating an error signal when the data from the vehicle detection device and the data from the vehicle location device indicator mismatches and indicates a presence of a vehicle in the desire corner when the data from the vehicle detection device and the data from the vehicle location device indicator matches.

2. The location validation system of claim 1, wherein the vehicle detection device is an inductive loop formed in a roadway of the predefined location.

3. The location validation system of claim 1, wherein the vehicle detection device is a geofence outlining the predefined location.

4. The location validation system of claim 1, wherein the vehicle detection device is a video camera monitoring the predefined location.

5. The location validation system of claim 1, comprising a Pedestrian-to-Infrastructure in communication with the traffic control unit indicating a presence of a pedestrian in the predefined location.

6. The location validation system of claim 5, comprising a cellular phone in communication with the Pedestrian-to-Infrastructure.

7. A location validation system, comprising:
a plurality of vehicle detection devices, wherein each of the plurality of vehicle detection devices is positioned at different corners of an intersection of a roadway, each of the plurality of vehicle detection devices monitoring a corresponding corner and transmits data to the traffic control unit on a current occupancy status at the corresponding corner being monitored;
a plurality of vehicle location indicator devices, wherein each of the plurality of vehicle location indicator devices is associated with a corresponding vehicle detection device and monitors the corresponding corner of the corresponding vehicle detection device and transmits data to the traffic control unit of a current occupancy status at the corresponding corner being monitored; and a data aggregator located in the traffic control unit, the data aggregator receiving and comparing the data from each of the plurality of vehicle detection device and data from each of the plurality of vehicle location indicator device, the data aggregator generating an error signal when data from a corresponding vehicle detection device and a corresponding vehicle location device indicator mismatches and indicates a presence of a vehicle when the data from the corresponding vehicle detection device and the corresponding vehicle location device indicator matches.

* * * * *